United States Patent
Yoshida

(10) Patent No.: US 7,419,238 B2
(45) Date of Patent: Sep. 2, 2008

(54) PRINTING METHOD, PRINTING APPARATUS, PRINTING SYSTEM, AND PRINTED MEDIUM

(75) Inventor: Masahiko Yoshida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 407 days.

(21) Appl. No.: 11/052,956

(22) Filed: Feb. 9, 2005

(65) Prior Publication Data

US 2005/0206919 A1    Sep. 22, 2005

(30) Foreign Application Priority Data

Feb. 10, 2004  (JP)  ............................. 2004-033303
Feb. 10, 2004  (JP)  ............................. 2004-033304

(51) Int. Cl.
    *B41J 29/393*    (2006.01)
(52) U.S. Cl. ................ 347/19; 347/14; 347/15
(58) Field of Classification Search .................. 347/14, 347/15, 19, 5, 9, 41, 42
    See application file for complete search history.

(56) References Cited

U.S. PATENT DOCUMENTS 6,076,915 A * 6/2000 Gast et al. ................. 347/19
6,565,180 B2 * 5/2003 Yu et al. .................... 347/19

FOREIGN PATENT DOCUMENTS

JP    6-166247 A    6/1994

* cited by examiner

*Primary Examiner*—Lam Son Nguyen
(74) *Attorney, Agent, or Firm*—Sughrue Mion, PLLC

(57) ABSTRACT

The number of correction values used when carrying out a darkness correction line by line is decreased, thereby making it possible to reduce the storage capacity of a storage section storing those correction values. At least one set of correction values determined based on darkness measurement values of lines of a correction pattern printed using a given processing mode is stored, wherein an integer multiple of the number of lines formed in one period is taken as one set, and a darkness correction is carried out through repetitive, sequential correlation with each correction value of said at least one set when printing an image using that processing mode.

19 Claims, 51 Drawing Sheets

|   |   |   |    |
|---|---|---|----|
| 1 | 9 | 3 | 11 |
| 13| 5 |15 | 7  |
| 4 |12 | 2 | 10 |
| 16| 8 |14 | 6  |

TM

|   |   |   |    |
|---|---|---|----|
| 16| 8 |14 | 6  |
| 4 |12 | 2 | 10 |
| 13| 5 |15 | 7  |
| 1 | 9 | 3 | 11 |

UM

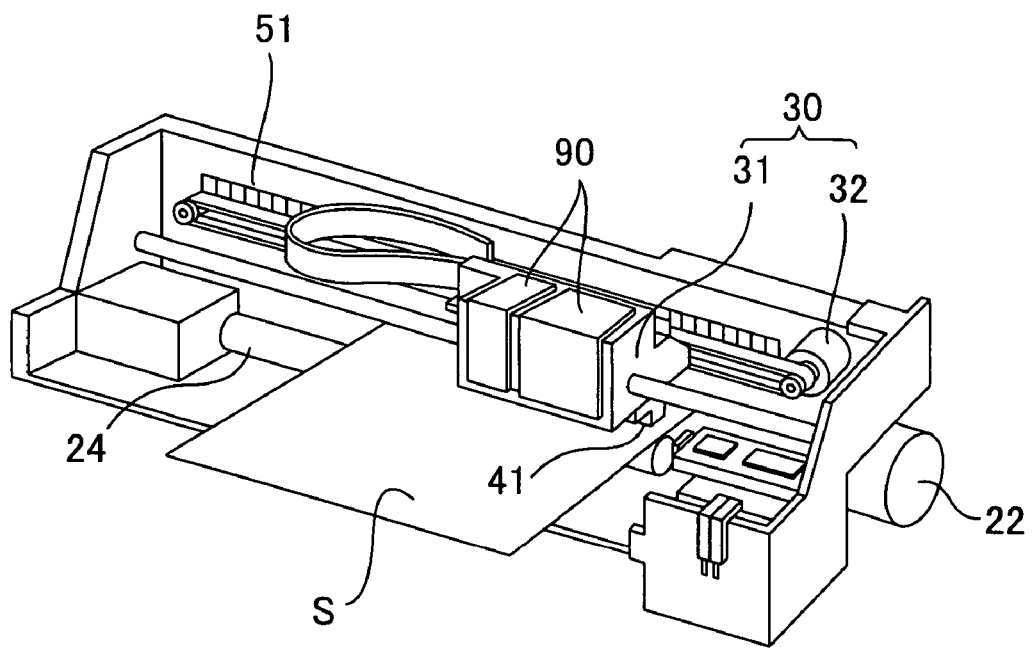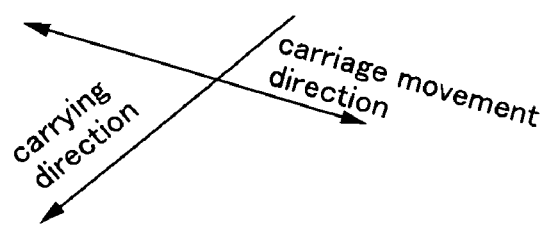
Fig.9

| margin format mode | image quality mode | print mode |
|---|---|---|
| borderless | fine | first print mode |
| borderless | normal | third print mode |
| bordered | fine | second print mode |
| bordered | normal | fourth print mode |

Fig.19

| print mode | processing mode |
|---|---|
| first print mode | first upper edge processing mode, first intermediate processing mode, first lower edge processing mode |
| second print mode | first intermediate processing mode |
| third print mode | second upper edge processing mode, second intermediate processing mode, second lower edge processing mode |
| fourth print mode | second intermediate processing mode |

Fig.20

Fig.32 recording table for
first upper edge processing mode

| record number | measurement value |
|---|---|
| 1 | * * * |
| 2 | * * * |
| 3 | * * * |
| 4 | * * * |
| 5 | * * * |
| 6 | * * * |
| 7 | * * * |
| 8 | * * * |
| 9 | * * * |
| 10 | * * * |
| 11 | * * * |
| 12 | * * * |
| 13 | * * * |
| 14 | * * * |
| 15 | * * * |
| 16 | * * * |
| 17 | * * * |
| 18 | * * * |
| 19 | * * * |
| 20 | * * * |
| 21 | * * * |
| 22 | * * * |
| 23 | * * * |
| 24 | * * * |
| 25 | * * * |
| 26 | * * * |
| 27 | * * * |
| 28 | * * * |
| 29 | * * * |
| 30 | * * * |
| 31 | * * * |
| 32 | * * * |
| 33 | * * * |
| 34 | * * * |
| 35 | * * * |
| 36 | * * * |
| 37 | * * * |
| 38 | * * * |
| 39 | * * * |
| 40 | * * * |
| 41 | |
| 42 | |
| 43 | |
| 44 | |
| 45 | |
| 46 | |
| ... | ... |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| 80 | |
| 81 | |
| 82 | |
| 83 | |
| 84 | |
| 85 | |
| 86 | |
| 87 | |
| 88 | |
| 89 | |
| 90 | |

Fig.33A recording table for first
intermediate processing mode

| record number | measurement value |
|---|---|
| 1 | * * * |
| 2 | * * * |
| 3 | * * * |
| 4 | * * * |
| 5 | * * * |
| 6 | * * * |
| 7 | * * * |
| 8 | * * * |
| 9 | * * * |
| 10 | * * * |
| 11 | * * * |
| 12 | * * * |
| 13 | * * * |
| 14 | * * * |
| 15 | * * * |
| 16 | * * * |
| 17 | * * * |
| 18 | * * * |
| 19 | * * * |
| 20 | * * * |
| 21 | * * * |
| 22 | * * * |
| 23 | * * * |
| 24 | * * * |
| 25 | * * * |
| 26 | * * * |
| 27 | * * * |
| 28 | * * * |
| 29 | * * * |
| 30 | * * * |
| 31 | * * * |
| 32 | * * * |
| 33 | * * * |
| 34 | * * * |
| 35 | * * * |
| 36 | * * * |
| 37 | * * * |
| 38 | * * * |
| 39 | * * * |
| 40 | * * * |
| 41 | * * * |
| 42 | * * * |
| 43 | * * * |
| 44 | * * * |
| 45 | * * * |
| 46 | |
| ... | ... |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| 80 | |
| 81 | |
| 82 | |
| 83 | |
| 84 | |
| 85 | |
| 86 | |
| 87 | |
| 88 | |
| 89 | |
| 90 | |

Fig.33B recording table for first
lower edge processing mode

| record number | measurement value |
|---|---|
| 1 | * * * |
| 2 | * * * |
| 3 | * * * |
| 4 | * * * |
| 5 | * * * |
| 6 | * * * |
| 7 | * * * |
| 8 | * * * |
| 9 | * * * |
| 10 | * * * |
| 11 | * * * |
| 12 | * * * |
| 13 | * * * |
| 14 | * * * |
| 15 | * * * |
| 16 | * * * |
| 17 | * * * |
| 18 | * * * |
| 19 | * * * |
| 20 | * * * |
| 21 | * * * |
| 22 | * * * |
| 23 | * * * |
| 24 | * * * |
| 25 | * * * |
| 26 | * * * |
| 27 | * * * |
| 28 | * * * |
| 29 | * * * |
| 30 | * * * |
| 31 | * * * |
| 32 | * * * |
| 33 | * * * |
| 34 | * * * |
| 35 | * * * |
| 36 | * * * |
| 37 | |
| 38 | |
| 39 | |
| 40 | |
| 41 | |
| 42 | |
| 43 | |
| 44 | |
| 45 | |
| 46 | |
| ... | ... |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| 80 | |
| 81 | |
| 82 | |
| 83 | |
| 84 | |
| 85 | |
| 86 | |
| 87 | |
| 88 | |
| 89 | |
| 90 | |

| correction value table for first upper edge processing mode | |
|---|---|
| record number | correction value |
| 1 | * * * |
| 2 | * * * |
| 3 | * * * |
| 4 | * * * |
| 5 | * * * |
| 6 | * * * |
| 7 | * * * |
| 8 | * * * |
| 9 | * * * |
| 10 | * * * |
| 11 | * * * |
| 12 | * * * |
| 13 | * * * |
| 14 | * * * |
| 15 | * * * |
| 16 | * * * |
| 17 | * * * |
| 18 | * * * |
| 19 | * * * |
| 20 | * * * |
| 21 | * * * |
| 22 | * * * |
| 23 | * * * |
| 24 | * * * |
| 25 | * * * |
| 26 | * * * |
| 27 | * * * |
| 28 | * * * |
| 29 | * * * |
| 30 | * * * |
| 31 | * * * |
| 32 | * * * |
| 33 | * * * |
| 34 | * * * |
| 35 | * * * |
| 36 | * * * |
| 37 | * * * |
| 38 | * * * |
| 39 | * * * |
| 40 | * * * |
| 41 | |
| 42 | |
| 43 | |
| 44 | |
| 45 | |
| 46 | |
| ⋮ | ⋮ |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| 80 | |
| 81 | |
| 82 | |
| 83 | |
| 84 | |
| 85 | |
| 86 | |
| 87 | |
| 88 | |
| 89 | |
| 90 | |

Fig.35A

| correction value table for first intermediate processing mode | |
|---|---|
| record number | correction value |
| 1 | * * * |
| 2 | * * * |
| 3 | * * * |
| 4 | * * * |
| 5 | * * * |
| 6 | * * * |
| 7 | * * * |
| 8 | * * * |
| 9 | * * * |
| 10 | * * * |
| 11 | * * * |
| 12 | * * * |
| 13 | * * * |
| 14 | * * * |
| 15 | * * * |
| 16 | * * * |
| 17 | * * * |
| 18 | * * * |
| 19 | * * * |
| 20 | * * * |
| 21 | * * * |
| 22 | * * * |
| 23 | * * * |
| 24 | * * * |
| 25 | * * * |
| 26 | * * * |
| 27 | * * * |
| 28 | * * * |
| 29 | * * * |
| 30 | * * * |
| 31 | * * * |
| 32 | * * * |
| 33 | * * * |
| 34 | * * * |
| 35 | * * * |
| 36 | * * * |
| 37 | * * * |
| 38 | * * * |
| 39 | * * * |
| 40 | * * * |
| 41 | * * * |
| 42 | * * * |
| 43 | * * * |
| 44 | * * * |
| 45 | * * * |
| 46 | |
| ⋮ | ⋮ |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| 80 | |
| 81 | |
| 82 | |
| 83 | |
| 84 | |
| 85 | |
| 86 | |
| 87 | |
| 88 | |
| 89 | |
| 90 | |

Fig.35B

| correction value table for first lower edge processing mode | |
|---|---|
| record number | correction value |
| 1 | * * * |
| 2 | * * * |
| 3 | * * * |
| 4 | * * * |
| 5 | * * * |
| 6 | * * * |
| 7 | * * * |
| 8 | * * * |
| 9 | * * * |
| 10 | * * * |
| 11 | * * * |
| 12 | * * * |
| 13 | * * * |
| 14 | * * * |
| 15 | * * * |
| 16 | * * * |
| 17 | * * * |
| 18 | * * * |
| 19 | * * * |
| 20 | * * * |
| 21 | * * * |
| 22 | * * * |
| 23 | * * * |
| 24 | * * * |
| 25 | * * * |
| 26 | * * * |
| 27 | * * * |
| 28 | * * * |
| 29 | * * * |
| 30 | * * * |
| 31 | * * * |
| 32 | * * * |
| 33 | * * * |
| 34 | * * * |
| 35 | * * * |
| 36 | * * * |
| 37 | |
| 38 | |
| 39 | |
| 40 | |
| 41 | |
| 42 | |
| 43 | |
| 44 | |
| 45 | |
| 46 | |
| ⋮ | ⋮ |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| 80 | |
| 81 | |
| 82 | |
| 83 | |
| 84 | |
| 85 | |
| 86 | |
| 87 | |
| 88 | |
| 89 | |
| 90 | |

Fig.35C

| correction value table for first upper edge processing mode | |
|---|---|
| record number | correction value |
| 1 | * * * |
| 2 | * * * |
| 3 | * * * |
| 4 | * * * |
| 5 | * * * |
| 6 | * * * |
| 7 | * * * |
| 8 | * * * |
| 9 | * * * |
| 10 | * * * |
| 11 | * * * |
| 12 | * * * |
| 13 | * * * |
| 14 | * * * |
| 15 | * * * |
| 16 | * * * |
| 17 | * * * |
| 18 | * * * |
| 19 | * * * |
| 20 | * * * |
| 21 | * * * |
| 22 | * * * |
| 23 | * * * |
| 24 | * * * |
| 25 | * * * |
| 26 | * * * |
| 27 | * * * |
| 28 | * * * |
| 29 | * * * |
| 30 | * * * |
| 31 | * * * |
| 32 | * * * |
| 33 | * * * |
| 34 | * * * |
| 35 | * * * |
| 36 | * * * |
| 37 | * * * |
| 38 | * * * |
| 39 | * * * |
| 40 | * * * |
| 41 | |
| 42 | |
| 43 | |
| 44 | |
| 45 | |
| 46 | |
| ⋮ | ⋮ |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| 80 | |
| 81 | |
| 82 | |
| 83 | |
| 84 | |
| 85 | |
| 86 | |
| 87 | |
| 88 | |
| 89 | |
| 90 | |

Fig.39A

| correction value table for first intermediate processing mode | | |
|---|---|---|
| record number | correction value | |
| 1 | * * * | ↑ |
| 2 | * * * | |
| 3 | * * * | one set (one period) |
| 4 | * * * | |
| 5 | * * * | |
| 6 | * * * | |
| 7 | * * * | ↓ |
| 8 | | |
| 9 | | |
| 10 | | |
| 11 | | |
| 12 | | |
| 13 | | |
| 14 | | |
| 15 | | |
| 16 | | |
| 17 | | |
| 18 | | |
| 19 | | |
| 20 | | |
| 21 | | |
| 22 | | |
| 23 | | |
| 24 | | |
| 25 | | |
| 26 | | |
| 27 | | |
| 28 | | |
| 29 | | |
| 30 | | |
| 31 | | |
| 32 | | |
| 33 | | |
| 34 | | |
| 35 | | |
| 36 | | |
| 37 | | |
| 38 | | |
| 39 | | |
| 40 | | |
| 41 | | |
| 42 | | |
| 43 | | |
| 44 | | |
| 45 | | |
| 46 | | |
| ⋮ | ⋮ | |
| 56 | | |
| 57 | | |
| 58 | | |
| 59 | | |
| 60 | | |
| 61 | | |
| 62 | | |
| 63 | | |
| 64 | | |
| 65 | | |
| 66 | | |
| 67 | | |
| 68 | | |
| 69 | | |
| 70 | | |
| 71 | | |
| 72 | | |
| 73 | | |
| 74 | | |
| 75 | | |
| 76 | | |
| 77 | | |
| 78 | | |
| 79 | | |
| 80 | | |
| 81 | | |
| 82 | | |
| 83 | | |
| 84 | | |
| 85 | | |
| 86 | | |
| 87 | | |
| 88 | | |
| 89 | | |
| 90 | | |

Fig.39B

| correction value table for first lower edge processing mode | |
|---|---|
| record number | correction value |
| 1 | * * * |
| 2 | * * * |
| 3 | * * * |
| 4 | * * * |
| 5 | * * * |
| 6 | * * * |
| 7 | * * * |
| 8 | * * * |
| 9 | * * * |
| 10 | * * * |
| 11 | * * * |
| 12 | * * * |
| 13 | * * * |
| 14 | * * * |
| 15 | * * * |
| 16 | * * * |
| 17 | * * * |
| 18 | * * * |
| 19 | * * * |
| 20 | * * * |
| 21 | * * * |
| 22 | * * * |
| 23 | * * * |
| 24 | * * * |
| 25 | * * * |
| 26 | * * * |
| 27 | * * * |
| 28 | * * * |
| 29 | * * * |
| 30 | * * * |
| 31 | * * * |
| 32 | * * * |
| 33 | * * * |
| 34 | * * * |
| 35 | * * * |
| 36 | * * * |
| 37 | |
| 38 | |
| 39 | |
| 40 | |
| 41 | |
| 42 | |
| 43 | |
| 44 | |
| 45 | |
| 46 | |
| ⋮ | ⋮ |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| 80 | |
| 81 | |
| 82 | |
| 83 | |
| 84 | |
| 85 | |
| 86 | |
| 87 | |
| 88 | |
| 89 | |
| 90 | |

Fig.39C

Fig.42A correction value table for
first upper edge processing mode

| record number | correction value |
|---|---|
| 1 | * * * |
| 2 | * * * |
| 3 | * * * |
| 4 | * * * |
| 5 | * * * |
| 6 | * * * |
| 7 | * * * |
| 8 | * * * |
| 9 | * * * |
| 10 | * * * |
| 11 | * * * |
| 12 | * * * |
| 13 | * * * |
| 14 | * * * |
| 15 | * * * |
| 16 | * * * |
| 17 | * * * |
| 18 | * * * |
| 19 | * * * |
| 20 | * * * |
| 21 | * * * |
| 22 | * * * |
| 23 | * * * |
| 24 | * * * |
| 25 | * * * |
| 26 | * * * |
| 27 | * * * |
| 28 | * * * |
| 29 | * * * |
| 30 | * * * |
| 31 | * * * |
| 32 | * * * |
| 33 | * * * |
| 34 | * * * |
| 35 | * * * |
| 36 | * * * |
| 37 | * * * |
| 38 | * * * |
| 39 | * * * |
| 40 | * * * |
| 41 | |
| 42 | |
| 43 | |
| 44 | |
| 45 | |
| 46 | |
| ... | |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| 80 | |
| 81 | |
| 82 | |
| 83 | |
| 84 | |
| 85 | |
| 86 | |
| 87 | |
| 88 | |
| 89 | |
| 90 | |

Fig.42B correction value table for first
intermediate processing mode

| record number | correction value | |
|---|---|---|
| 1 | * * * | |
| 2 | * * * | |
| 3 | * * * | |
| 4 | * * * | first period |
| 5 | * * * | |
| 6 | * * * | |
| 7 | * * * | one set |
| 8 | * * * | |
| 9 | * * * | |
| 10 | * * * | second period |
| 11 | * * * | |
| 12 | * * * | |
| 13 | * * * | |
| 14 | * * * | |
| 15 | | |
| 16 | | |
| 17 | | |
| 18 | | |
| 19 | | |
| 20 | | |
| 21 | | |
| 22 | | |
| 23 | | |
| 24 | | |
| 25 | | |
| 26 | | |
| 27 | | |
| 28 | | |
| 29 | | |
| 30 | | |
| 31 | | |
| 32 | | |
| 33 | | |
| 34 | | |
| 35 | | |
| 36 | | |
| 37 | | |
| 38 | | |
| 39 | | |
| 40 | | |
| 41 | | |
| 42 | | |
| 43 | | |
| 44 | | |
| 45 | | |
| 46 | | |
| ... | | |
| 56 | | |
| 57 | | |
| 58 | | |
| 59 | | |
| 60 | | |
| 61 | | |
| 62 | | |
| 63 | | |
| 64 | | |
| 65 | | |
| 66 | | |
| 67 | | |
| 68 | | |
| 69 | | |
| 70 | | |
| 71 | | |
| 72 | | |
| 73 | | |
| 74 | | |
| 75 | | |
| 76 | | |
| 77 | | |
| 78 | | |
| 79 | | |
| 80 | | |
| 81 | | |
| 82 | | |
| 83 | | |
| 84 | | |
| 85 | | |
| 86 | | |
| 87 | | |
| 88 | | |
| 89 | | |
| 90 | | |

Fig.42C correction value table for first
lower edge processing mode

| record number | correction value |
|---|---|
| 1 | * * * |
| 2 | * * * |
| 3 | * * * |
| 4 | * * * |
| 5 | * * * |
| 6 | * * * |
| 7 | * * * |
| 8 | * * * |
| 9 | * * * |
| 10 | * * * |
| 11 | * * * |
| 12 | * * * |
| 13 | * * * |
| 14 | * * * |
| 15 | * * * |
| 16 | * * * |
| 17 | * * * |
| 18 | * * * |
| 19 | * * * |
| 20 | * * * |
| 21 | * * * |
| 22 | * * * |
| 23 | * * * |
| 24 | * * * |
| 25 | * * * |
| 26 | * * * |
| 27 | * * * |
| 28 | * * * |
| 29 | * * * |
| 30 | * * * |
| 31 | * * * |
| 32 | * * * |
| 33 | * * * |
| 34 | * * * |
| 35 | * * * |
| 36 | * * * |
| 37 | |
| 38 | |
| 39 | |
| 40 | |
| 41 | |
| 42 | |
| 43 | |
| 44 | |
| 45 | |
| 46 | |
| ... | |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| 80 | |
| 81 | |
| 82 | |
| 83 | |
| 84 | |
| 85 | |
| 86 | |
| 87 | |
| 88 | |
| 89 | |
| 90 | |

PRINTING METHOD, PRINTING APPARATUS, PRINTING SYSTEM, AND PRINTED MEDIUM

CROSS-REFERENCE TO RELATED APPLICATIONS

The present application claims priority upon Japanese Patent Application No. 2004-33303 and Japanese Patent Application No. 2004-33304 filed on Feb. 10, 2004, which are herein incorporated by reference.

BACKGROUND OF THE INVENTION

1. Field of the Invention

The present invention relates to printing methods, printing apparatuses, printing systems, and correction patterns for inhibiting darkness non-uniformities in an image.

2. Description of the Related Art

Inkjet printers that form dots by ejecting ink onto paper serving as a medium are known as printing apparatuses for printing images. Such inkjet printers repeat a dot formation operation of forming dots on the paper by ejecting ink from a plurality of nozzles, which move in a predetermined movement direction, and a carrying operation of carrying the paper in an intersecting direction that intersects with the movement direction (hereinafter, referred to as the "carrying direction") with a carry unit. Thus, a plurality of raster lines each made of a plurality of dots extending in the movement direction are formed in the carrying direction, thus printing an image.

Now, with such a printer, darkness non-uniformities extending parallel to the movement direction can be occasionally observed in such images made of a multitude of raster lines. That is to say, there may be raster lines that macroscopically look darker and raster lines that macroscopically look lighter.

Such darkness non-uniformities are mainly caused by the manufacturing precision of the nozzles, and more specifically the following two causes can be given. A first case is that there are variations in the ink ejection amount among the nozzles. A second case is that the positions at which dots are formed on paper by ejecting ink from the nozzles (referred to as "dot formation positions" in the following) deviate in the carrying direction from the target positions.

The following is a conventional method for inhibiting darkness non-uniformities in the first case: First, a correction pattern is printed with the printer for which darkness non-uniformities are to be inhibited, the darkness of the correction pattern is measured with a darkness measurement device and a correction value with which a target darkness is attained is calculated for each nozzle, and the correction values for the nozzles are stored in a storage section of the printer. Then, when the user carries out actual printing of an image, the printer corrects the ink ejection amount using the correction values correlated with the nozzles, thus inhibiting the darkness non-uniformities.

However, the darkness non-uniformities of the second case are caused by the spacings between the raster lines R periodically becoming wider and narrower, as shown in FIG. 25. That is to say, adjacent raster lines R with a wide spacing between them macroscopically appear light, whereas raster lines R with a narrow spacing between them macroscopically appear dark. Thus, the state of the spacing depends on the combination of nozzles forming the adjacent raster lines. Consequently, in order to inhibit the darkness non-uniformities of the second case, it would appear to be possible to correct the darkness non-uniformities caused by the state of the spacings more directly by storing a correction value in correlation with each of the raster lines rather than storing a correction value in correlation with each of the nozzles in the storage section.

However, the number of raster lines constituting the image is extremely large, and a storage section of an enormous capacity would be necessary in order to store correction values for all of the raster lines, which would entail higher costs for the printer.

Moreover, as a method for obtaining the correction values, it is conceivable to form a large number of raster lines over the entire paper in the carrying direction as a correction pattern, and to determine the correction values by measuring the darkness thereof raster line by raster line. However, depending on the processing mode, which determines the dot formation operation and the carrying operation, there are also cases in which it is possible to obtain the correction values that are minimally necessary for correction by forming raster lines not over the entire region but only a portion thereof. In such a case, it is possible to achieve savings in the ink amount that is consumed during printing of the correction pattern.

SUMMARY OF THE INVENTION

In view of the above-described circumstances, it is an object of the present invention to realize a printing method, a printing apparatus and a printing system with which the storage capacity of the storage section storing the correction values can be reduced by diminishing the number of correction values that are used for performing the darkness correction for each line. It is a further object of the present invention to realize a correction pattern that is suitable for reducing the ink amount of the correction pattern used to determine the correction values used to carry out the darkness correction for each line.

A main aspect of the present invention is a printing method as follows:

A printing method for printing an image by repeating a dot formation operation of forming dots on a medium by ejecting ink from a plurality of nozzles moving in a predetermined movement direction and a carrying operation of carrying the medium in an intersecting direction that intersects with the movement direction, thus forming in the intersecting direction a plurality of lines each being made of a plurality of dots lined up in the movement direction, comprises:

a step of printing a correction pattern using a processing mode in which an image is printed such that the nozzles forming the lines change periodically with respect to the intersecting direction;

a step of measuring a darkness of the correction pattern, line by line, for at least one set of lines, wherein an integer multiple of the number of lines formed in a single period is taken as one set;

a step of generating correction values for the at least one set of lines based on measurement values obtained by measuring the darkness line by line, and storing the correction values; and a step of carrying out darkness correction through repetitive, sequential correlation of each of the correction values in the at least one set when printing an image using the processing mode.

Another main aspect of the present invention is a printing apparatus as follows:

A printing apparatus comprises:

nozzles for ejecting ink;

a carry unit for carrying a medium; and a controller for printing an image by repeating a dot formation operation of forming dots on the medium by ejecting ink from a plurality of the nozzles moving in a predetermined movement direction and a carrying operation of carrying with the carry unit the medium in an intersecting direction that intersects with the movement direction, thus forming in the intersecting direction a plurality of lines each being made of a plurality of dots lined up in the movement direction;

wherein the controller is provided with a processing mode in which an image is printed such that the nozzles forming the lines change periodically with respect to the intersecting direction, and carries out darkness correction for each line in accordance with darkness correction values when printing an image using the processing mode;

wherein the controller stores at least one set of correction values that have been determined based on measurement values obtained by measuring the darkness of lines of a correction pattern printed using the processing mode, wherein an integer multiple of the number of lines formed in a single period is taken as one set; and wherein the controller carries out the darkness correction through repetitive, sequential correlation of each of the correction values in the at least one set when printing an image using the processing mode.

Yet another main aspect of the present invention is a printing system as follows:

A printing system comprises:

a computer; and a printing apparatus communicably connected to the computer;

wherein the printing apparatus is provided with nozzles for ejecting ink and a carry unit for carrying a medium, prints an image by repeating a dot formation operation of forming dots on the medium by ejecting ink from a plurality of the nozzles moving in a predetermined movement direction and a carrying operation of carrying with the carry unit the medium in an intersecting direction that intersects with the movement direction to thus form in the intersecting direction a plurality of lines each being made of a plurality of dots lined up in the movement direction, and is provided with a processing mode in which an image is printed such that the nozzles forming the lines change with a predetermined period with respect to the intersecting direction;

wherein the computer carries out darkness correction for each line in accordance with darkness correction values when printing an image using the processing mode;

wherein the printing apparatus stores at least one set of correction values that have been determined based on measurement values obtained by measuring the darkness of lines of a correction pattern printed using the processing mode, wherein an integer multiple of the number of lines formed in a single period is taken as one set; and wherein the computer carries out the darkness correction through repetitive, sequential correlation of each of the correction values in the at least one set.

Yet another main aspect of the present invention is a correction pattern as follows:

A printed medium comprises:

a correction pattern for determining correction values used for a line-by-line darkness correction performed when printing an image based on a predetermined processing mode, wherein the correction pattern is printed by repeating a dot formation operation of forming dots on the medium by ejecting ink from a plurality of nozzles moving in a predetermined movement direction and a carrying operation of carrying the medium in an intersecting direction that intersects with the movement direction to thus form in the intersecting direction a plurality of lines each being made of a plurality of dots lined up in the movement direction, wherein the correction pattern for the processing mode, in which printing is performed such that the nozzles forming lines of an image to be printed change periodically with respect to the intersecting direction, includes lines for at least a single period in which the nozzles change; and a blank region arranged adjacent to the correction pattern in the intersecting direction.

Other features of the present invention will become clear through the accompanying drawings and the following description.

BRIEF DESCRIPTION OF THE DRAWINGS

For a more complete understanding of the present invention and the advantages thereof, reference is now made to the following description taken in conjunction with the accompanying drawings.

FIG. 9 is a schematic diagram of the overall configuration of the printer.

FIG. 19 is a first reference table showing the print modes corresponding to the various combinations between the margin format mode and the image quality mode.

FIG. 20 is a second reference table showing the processing modes corresponding to the various print modes.

FIG. 32 is a conceptual diagram of a recording table.

FIG. 33A shows a recording table for the first upper edge processing mode.

FIG. 33B shows a recording table for the first intermediate processing mode.

FIG. 33C shows a recording table for the first lower edge processing mode.

FIG. 34 is a conceptual diagram of a correction value table.

FIG. 35A shows a correction value table for the first upper edge processing mode.

FIG. 35B shows a correction value table for the first intermediate processing mode.

FIG. 35C shows a correction value table for the first lower edge processing mode.

FIG. 39A shows a correction value table for the first upper edge processing mode according to a first embodiment.

FIG. 39B shows a correction value table for the first intermediate processing mode according to the first embodiment.

FIG. 39C shows a correction value table for the first lower edge processing mode according to the first embodiment.

FIG. 42A shows a correction value table for the first upper edge processing mode according to a second embodiment.

FIG. 42B shows a correction value table for the first intermediate processing mode according to the second embodiment.

FIG. 42C shows a correction value table for the first lower edge processing mode according to the second embodiment.

DETAILED DESCRIPTION OF PREFERRED EMBODIMENTS

Figure 1:
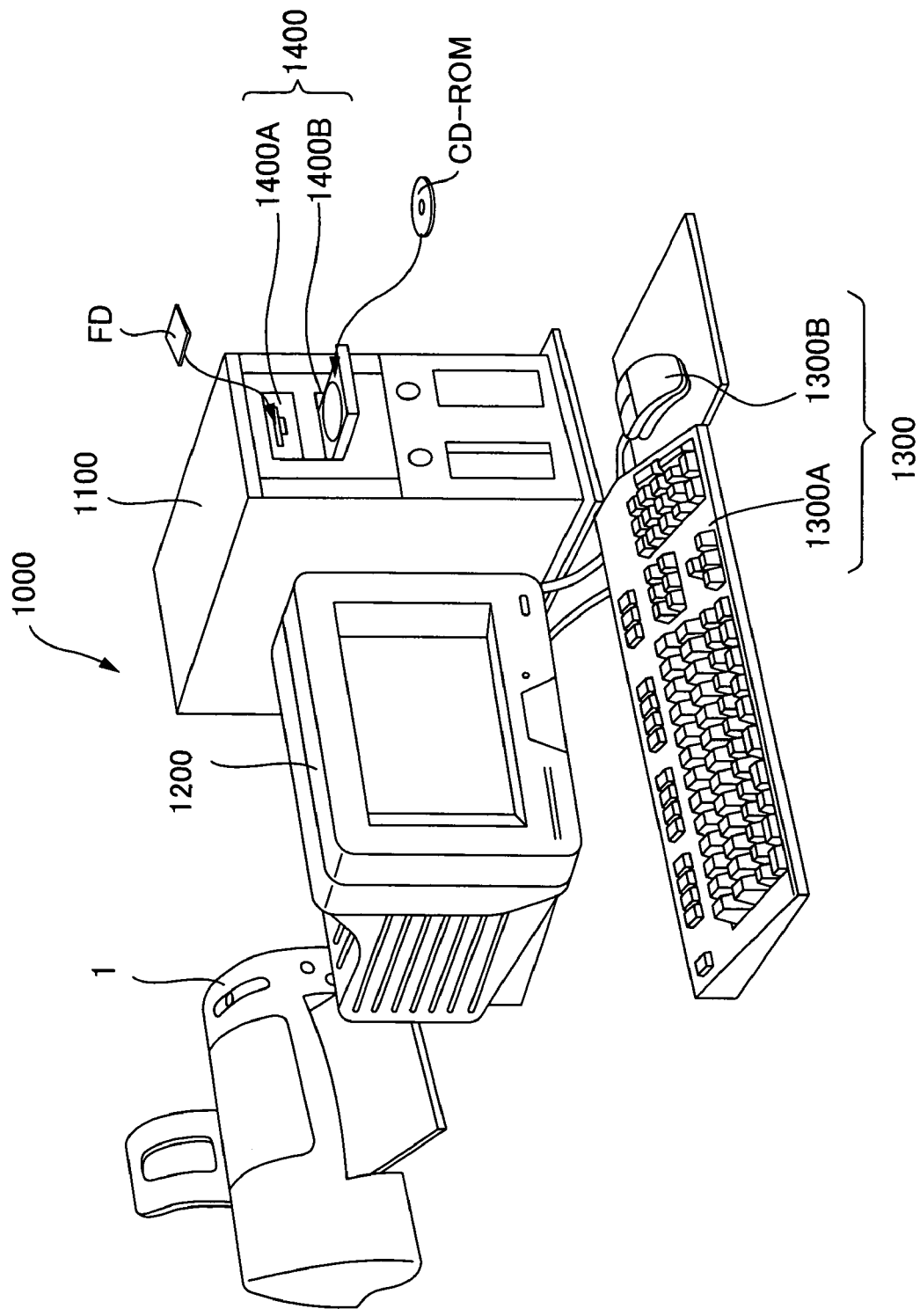
FIG. 1 is an explanatory diagram of the overall configuration of a printing system.

At least the following matters will be made clear by the present specification and the accompanying drawings.

A printing method for printing an image by repeating a dot formation operation of forming dots on a medium by ejecting ink from a plurality of nozzles moving in a predetermined movement direction and a carrying operation of carrying the medium in an intersecting direction that intersects with the movement direction, thus forming in the intersecting direction a plurality of lines each being made of a plurality of dots lined up in the movement direction, comprises:

a step of printing a correction pattern using a processing mode in which an image is printed such that the nozzles forming the lines change periodically with respect to the intersecting direction;

a step of measuring a darkness of the correction pattern, line by line, for at least one set of lines, wherein an integer multiple of the number of lines formed in a single period is taken as one set;

a step of generating correction values for the at least one set of lines based on measurement values obtained by measuring the darkness line by line, and storing the correction values; and a step of carrying out darkness correction through repetitive, sequential correlation of each of the correction values in the at least one set when printing an image using the processing mode.

With this printing method, it is possible to carry out the darkness correction if at least one set of correction values, that is, if a number corresponding to an integer multiple of one period in which the nozzles change periodically, is stored.

Consequently, it is not necessary to store correction values for all lines constituting the image to be printed, and thus, it is possible to reduce the storage capacity of the storage section for storing the correction values.

Further, when printing the image using the processing mode, the darkness correction may be carried out through repetitive, sequential correlation of each of the correction values in the at least one set for all lines constituting that image.

With this printing method, it is possible to carry out the darkness correction if at least the one set of correction values, that is, if a number corresponding to an integer multiple of one period in which the nozzles change periodically, is stored. Consequently, it is not necessary to store correction values for all lines constituting the image to be printed, and thus, it is possible to reduce the storage capacity of the storage section for storing the correction values.

Further, when using a processing mode in which an image is printed by carrying out the dot formation operation in both a forward movement and a return movement in the movement direction, the darkness correction may be carried out using correction values of at least one set, wherein twice the number of lines in the single period is taken as one set.

With this printing method, it is possible to handle so-called bidirectional printing in which the dot formation operation forms dots while moving back and forth in the movement direction. That is to say, in bidirectional printing, there is the possibility that even for lines formed by the same nozzle, the formation position of those lines in the intersecting direction differs between the forward pass and the return pass of the dot formation operation. In this case, correction values for a number of lines corresponding to one period are required for the forward pass, and moreover correction values for a number of lines corresponding to one period are required for the return pass. With this printing method, a number of lines corresponding to twice the number of a single period is taken as one set, and the correction values of at least one set are used to carry out darkness correction, so that darkness non-uniformities that may become conspicuous during bidirectional printing can be handled as well.

Further, lines for at least a plurality of sets may be printed as the correction pattern; and the correction value of lines that are formed by the same nozzle may be obtained by averaging among the plurality of sets.

With this printing method, the correction values for lines formed by the same nozzles are determined by averaging, so that it is possible to improve the accuracy of the correction values and to inhibit darkness non-uniformities in the image more reliably.

Further, the plurality of nozzles may be lined up in the intersecting direction, constituting a nozzle row.

With this printing method, the nozzles are lined up in the intersecting direction, so that the range over which dots are formed in a single dot formation operation is broadened, thus shortening the printing time.

Further, the nozzle row may be provided for each color of ink; and the correction values may be provided for each color.

With this printing method, at least one of the nozzle rows is provided for each color of ink, so that multi-color printing becomes possible. Moreover, the darkness of the image is corrected color by color, based on the correction values of each color, so that darkness non-uniformities in an image printed by multi-color printing can be inhibited effectively.

Further, the processing mode may be a processing mode for printing an image in a section between an edge on an upstream side and an edge on a downstream side of the medium in the intersecting direction.

With this printing method, darkness non-uniformities occurring in the portion between an upstream edge and a downstream edge of the medium can be inhibited effectively.

Further, a guide line extending in the movement direction may be formed in correspondence with one of the two lines at either end in the intersecting direction of each set in the correction pattern.

With this printing method, the position of the lines of each set can be accurately recognized by using the guide lines, which serve as markers indicating the borders of the sets. That is to say, the position in the intersecting direction in which the darkness is to be measured can be accurately recognized, and thus the darkness of the lines can be measured accurately.

Further, image data for printing the image may be provided;

the image data may include gradation values of the darkness, each gradation value being provided for each formation unit corresponding to each dot formed on the medium;

if the correction value is not correlated with the formation unit, then a creation ratio corresponding to the gradation value of the formation unit may be read from a creation ratio table in which the gradation values are correlated with the dot creation ratios, and a dot may be formed in the formation unit on the medium in accordance with the creation ratio that has been read; and if the correction value is correlated with the formation unit, then when reading the creation ratio corresponding to the gradation value from the creation ratio table, a creation ratio corresponding to a value that is obtained by changing the gradation value by the correction value may be read, and a dot may be formed in the formation unit on the medium in accordance with the creation ratio that has been read.

With this printing method, an image can be printed by forming dots in each of the formation units on the medium, based on the image data. Furthermore, the image data correlated with the correction values and the image data not correlated with the correction values share the same creation ratio table, so that the configuration can be simplified.

Further, image data for printing the image may be provided;

the image data may include gradation values of the darkness, each gradation value being provided for each formation unit corresponding to each dot formed on the medium;

if the correction value is not correlated with the formation unit, then a creation ratio corresponding to the gradation value of the formation unit may be read from a creation ratio table in which the gradation values are correlated with the dot creation ratios, and a dot may be formed in the formation unit on the medium in accordance with the creation ratio that has been read; and if the correction value is correlated with the formation unit, then a dot creation ratio corresponding to the gradation value of the formation unit may be read from a creation ratio table in which the creation ratio in the creation ratio table has been changed by the correction value, and a dot may be formed in the formation unit on the medium in accordance with the creation ratio that has been read.

With this printing method, an image can be printed by forming dots in each of the formation units on the medium, based on the image data. Furthermore, a creation ratio table for image data correlated with correction values and a creation ratio table for image data not correlated with correction values are provided separately. Accordingly, when converting the gradation values of the image data into creation ratios, it is only necessary to read out the creation ratio corresponding to that gradation value in the creation ratio table, and thus this process can be realized in a shorter time.

Further, assuming that dots are formed in a region provided with a predetermined number of the formation units having the same gradation value, the dot creation ratio may represent a ratio of the number of dots formed in the region to the predetermined number.

With this printing method, the image darkness can represent the number of dots formed within that region.

Further, all lines of the correction pattern may be printed in accordance with the same gradation value.

With this printing method, all lines are printed with the same gradation value, that is, lines that are adjacent in the intersecting direction are printed with the same gradation value. Consequently, darkness non-uniformities formed at adjacent lines, for example darkness non-uniformities that becomes conspicuous due to changes in the spacing between those lines can be accurately evaluated with this correction pattern.

Further, an average value, among all lines, of the measurement values obtained by measuring the darkness line by line may be taken as a target darkness value, and a correction ratio obtained by dividing the deviation of the measurement value of the darkness of each line from the target value by the target value may be taken as the correction value.

With this printing method, darkness variations between lines can be effectively decreased.

Further, the nozzles may be configured to form dots of a plurality of sizes, and the creation ratio table may define the relation between the gradation values and the creation ratios for each of the sizes.

With this printing method, darkness can be expressed by dots of a plurality of sizes, so that more detailed images become possible.

Furthermore, a printing apparatus such as the following can be realized.

A printing apparatus comprises:

nozzles for ejecting ink;

a carry unit for carrying a medium; and a controller for printing an image by repeating a dot formation operation of forming dots on the medium by ejecting ink from a plurality of the nozzles moving in a predetermined movement direction and a carrying operation of carrying with the carry unit the medium in an intersecting direction that intersects with the movement direction, thus forming in the intersecting direction a plurality of lines each being made of a plurality of dots lined up in the movement direction;

wherein the controller is provided with a processing mode in which an image is printed such that the nozzles forming the lines change periodically with respect to the intersecting direction, and carries out darkness correction for each line in accordance with darkness correction values when printing an image using the processing mode;

wherein the controller stores at least one set of correction values that have been determined based on measurement values obtained by measuring the darkness of lines of a correction pattern printed using the processing mode, wherein an integer multiple of the number of lines formed in a single period is taken as one set; and wherein the controller carries out the darkness correction through repetitive, sequential correlation of each of the correction values in the at least one set when printing an image using the processing mode.

Furthermore, a printing system such as the following can be realized.

A printing system comprises:

a computer; and a printing apparatus communicably connected to the computer;

wherein the printing apparatus is provided with nozzles for ejecting ink and a carry unit for carrying a medium, prints an image by repeating a dot formation operation of forming dots on the medium by ejecting ink from a plurality of the nozzles moving in a predetermined movement direction and a carrying operation of carrying with the carry unit the medium in an intersecting direction that intersects with the movement direction to thus form in the intersecting direction a plurality of lines each being made of a plurality of dots lined up in the movement direction, and is provided with a processing mode in which an image is printed such that the nozzles forming the lines change with a predetermined period with respect to the intersecting direction;

wherein the computer carries out darkness correction for each line in accordance with darkness correction values when printing an image using the processing mode;

wherein the printing apparatus stores at least one set of correction values that have been determined based on measurement values obtained by measuring the darkness of lines of a correction pattern printed using the processing mode, wherein an integer multiple of the number of lines formed in a single period is taken as one set; and wherein the computer carries out the darkness correction through repetitive, sequential correlation of each of the correction values in the at least one set.

Furthermore, a correction pattern such as the following can be realized.

A printed medium comprises:

a correction pattern for determining correction values used for a line-by-line darkness correction performed when printing an image based on a predetermined processing mode, wherein the correction pattern is printed by repeating a dot formation operation of forming dots on the medium by ejecting ink from a plurality of nozzles moving in a predetermined movement direction and a carrying operation of carrying the medium in an intersecting direction that intersects with the movement direction to thus form in the intersecting direction a plurality of lines each being made of a plurality of dots lined up in the movement direction, wherein the correction pattern for the processing mode, in which printing is performed such that the nozzles forming lines of an image to be printed change periodically with respect to the intersecting direction, includes lines for at least a single period in which the nozzles change; and a blank region arranged adjacent to the correction pattern in the intersecting direction.

Such a correction pattern has lines for at least one period in which the nozzles change. Consequently, with respect to the processing mode in which printing is performed such that the nozzles forming the lines of the image to be printed change periodically with regard to the intersecting direction, the darkness correction values of the lines used when printing can be determined based on the correction pattern, and as a result, the darkness correction can be performed line by line when printing in that processing mode.

Here, the correction pattern is printed such that a blank region extending in the intersecting direction is left on the medium, and the correction pattern includes lines for at least one period in which the nozzles change. Consequently, the correction pattern does not have to be printed over the entire region of the medium, and the amount of ink consumed can be reduced, so that ink savings can be accomplished.

Further, a correction pattern for a processing mode in which an image is printed by carrying out the dot formation operation in both a forward movement and a return movement in the movement direction may include at least one set of lines, wherein twice the number of lines in the single period is taken as one set.

With this correction pattern, it is possible to handle so-called bidirectional printing, in which the dot formation operation is carried out during both the forward and the return movement in the movement direction. That is to say, in the case of bidirectional printing, even when lines are formed by the same nozzle, there is the possibility that the formation positions of the lines in the intersecting direction differ between the forward pass and the return pass of the dot formation operation. Consequently, for one period of change of the nozzles, the periodicity is determined by the combination of the forward pass and return pass, that is, the correction values for the lines of at least two periods become necessary.

Here, the above-described correction pattern includes at least one set of lines, taking twice the number of lines for one period as one set, that is, the correction pattern includes the lines for at least two periods. Consequently, the darkness correction is performed with the correction values for two periods, based on the lines of these two periods, so that it is also possible to correct darkness non-uniformities that may become conspicuous in bidirectional printing.

Further, the correction pattern may include a plurality of sets of lines.

Such a correction pattern includes a plurality of sets of lines. Consequently, the correction values for lines formed by the same nozzles can be determined by averaging across a plurality of sets. Thus, it is possible to reduce any error in the correction values and to inhibit darkness non-uniformities in the image more reliably.

Further, a guide line extending in the movement direction may be formed in correspondence with one of the two lines at either end in the intersecting direction of each set in the correction pattern.

With such a correction pattern, the position of the lines of each set can be accurately recognized by using the guide lines, which serve as markers indicating the borders of the sets. That is to say, the position in the intersecting direction at which the darkness is to be measured can be accurately recognized, and thus the darkness of the lines can be measured accurately.

Further, the darkness of the correction pattern may be measured line by line, and the correction value of each line may be determined based on the measurement value obtained by measuring the darkness.

With such a correction pattern, the correction value of each line is determined based on the measurement value of the darkness that is measured for each line, so that an appropriate correction value can be obtained for each line.

Further, the plurality of nozzles may constitute a nozzle row arranged along the intersecting direction.

With such a correction pattern, printing is performed with a plurality of nozzles arranged in the intersecting direction, so that the range over which dots are formed in a single dot formation operation is broadened, thus shortening the printing time of the correction pattern as well as the image.

Further, a plurality of the correction patterns may be printed on a medium for respective colors of ink that can be ejected from the plurality of nozzles, the correction patterns being lined up in the movement direction.

In such a correction pattern, the correction pattern is printed for each ink color separately, so that the correction values can be determined for each ink color individually. Consequently, it is possible to correct the image's darkness for each ink color individually, based on the correction values that have been determined for each ink color individually, so that darkness non-uniformities in an image printed by multi-color printing can be effectively inhibited.

Further, the processing mode in which printing is performed such that the nozzles forming the lines of the image to be printed change periodically with respect to the intersecting direction may be an intermediate processing mode for printing an image in a section between an edge on an upstream side and an edge on a downstream side of the medium; and the correction pattern for this processing mode may be printed in the section between the edge on the upstream side and the edge on the downstream side of the medium in the intersecting direction.

With such a correction pattern, the correction pattern of the intermediate processing mode is actually printed in the middle portion of the medium. Consequently, the printed state when actually printing on the medium can be faithfully reproduced on the correction pattern, and thus it is possible to obtain effective correction values with high correction accuracy.

Further, the predetermined processing mode may include a downstream edge processing mode for printing an image at the edge on the downstream side of the medium in the intersecting direction and an upstream edge processing mode for printing an image at the edge on the upstream side of the medium in the intersecting direction;

a correction pattern for the downstream edge processing mode may be printed at the edge on the downstream side of paper;

a correction pattern for the upstream edge processing mode may be printed at the edge on the upstream side; and a correction pattern for the intermediate processing mode may be printed in a section between these two correction patterns, while leaving a blank region between the correction pattern for the intermediate processing mode and at least one of the other two correction patterns.

With such a correction pattern, the correction pattern of the downstream edge processing mode is actually printed at the downstream edge of the medium, whereas the correction pattern of the upstream edge processing mode is actually printed at the upstream edge of the medium, and the correction pattern of the intermediate processing mode is actually printed in the middle between these two edges of the medium. Consequently, the printed state when actually printing with these processing modes on the medium can be reproduced faithfully on the correction pattern, and thus it is possible to obtain effective correction values with high correction accuracy.

Further, all lines of the correction pattern may be printed in accordance with a gradation value for the same darkness.

With such a correction pattern, all lines are printed with the same gradation value, that is, lines that are adjacent in the intersecting direction are printed with the same gradation value. Consequently, darkness non-uniformities that are formed in adjacent lines, that is, for example, darkness non-uniformities that become conspicuous due to changes in the spacings between these lines, can be accurately evaluated.

Further, an average value, among all lines, of the measurement values obtained by measuring the darkness line by line may be taken as a target darkness value, and a correction ratio obtained by dividing the deviation of the measurement value of the darkness of each line from the target value by the target value may be taken as the correction value.

With such a correction pattern, variations in the darkness between the lines can be effectively reduced.

=== Configuration of Printing System ===

An embodiment of a printing system is described next with reference to the drawings.

FIG. 1 is an explanatory diagram showing the external structure of a printing system. A printing system 1000 is provided with a printer 1, a computer 1100, a display device 1200, input devices 1300, and record/play devices 1400. The printer 1 is a printing apparatus for printing images on a medium such as paper, cloth, or film. The computer 1100 is communicably connected to the printer 1, and outputs print data corresponding to an image to be printed to the printer 1 in order to print the image with the printer 1. The display device 1200 has a display, and displays a user interface such as an application program or a printer driver 1110 (see FIG. 2). The input devices 1300 are for example a keyboard 1300A and a mouse 1300B, and are used to operate the application program or adjust the settings of the printer driver 1110, for example, through the user interface that is displayed on the display device 1200. A flexible disk drive 1400A and a CD-ROM drive 1400B can be employed as the record/play devices 1400, for example.

The printer driver 1110 is installed on the computer 1100. The printer driver 1110 is a program for achieving the function of displaying the user interface on the display device 1200, and the function of converting image data that has been output from the application program into print data. The printer driver 1110 is recorded on a storage medium (computer-readable storage medium) such as a flexible disk FD or a CD-ROM. The printer driver 1110 can also be downloaded onto the computer 1100 via the Internet. It should be noted that this program is made of codes for achieving various functions.

It should be noted that "printing apparatus" in a narrow sense means the printer 1, but in a broader sense it means the system constituted by the printer 1 and the computer 1100.

=== Printer Driver ===

<Regarding the Printer Driver>

Figure 2:
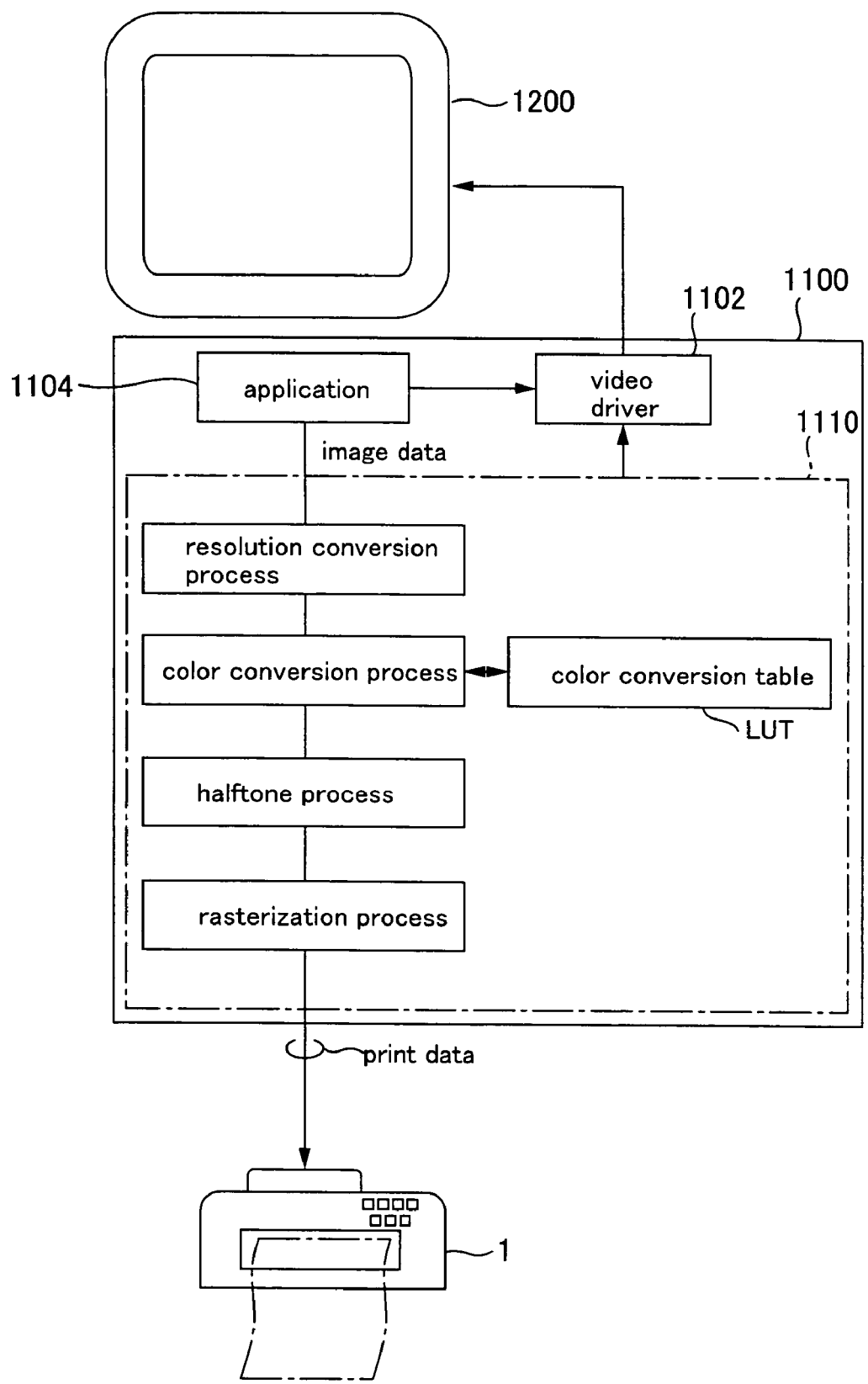
FIG. 2 is an explanatory diagram of processes carried out by a printer driver.

FIG. 2 is a schematic explanatory diagram of the basic processes carried out by the printer driver 1110. Structural elements that have already been described are assigned identical reference numerals and thus their further description is omitted.

On the computer 1100, computer programs such as a video driver 1102, an application program 1104, and a printer driver 1110 operate under an operating system installed on the computer. The video driver 1102 has the function of displaying, for example, the user interface on the display device 1200 in accordance with display commands from the application program 1104 or the printer driver 1110. The application program 1104, for example, has a function for image editing or the like and creates data related to an image (image data). A user can give an instruction to print an image edited in the application program 1104 via the user interface of the application program 1104. Upon receiving the print command, the application program 1104 outputs the image data to the printer driver 1110.

The printer driver 1110 receives the image data from the application program 1104, converts the image data into print data, and outputs the print data to the printer 1. The image data has pixel data as the data for the pixels of the image to be printed. The gradation values etc. of the pixel data are then converted in accordance with the later-described processing stages, and are ultimately converted at the print data stage into data for the dots to be formed on the paper (data such as the color and the size of the dots). It should be noted that "pixels" are square boxes virtually set on the paper that define the positions onto which the ink lands to form dots. The pixels correspond to the "dot formation units" in the claims.

Print data is data in a format that can be interpreted by the printer 1, and includes the pixel data and various command data. Here, "command data" refers to data for instructing the printer 1 to carry out a specific operation, and is data indicating the carry amount, for example.

In order to convert the image data that is output from the application program 1104 into print data, the printer driver 1110 carries out such processes as resolution conversion, color conversion, halftoning, and rasterization. The following is a description of the processes carried out by the printer driver 1110.

Resolution conversion is a process for converting image data (text data, image data, etc.) output from the application program 1104 to the resolution for printing an image on paper (the interval between dots when printing; also referred to as "print resolution")). For example, when the print resolution has been specified as 720×720 dpi, then the image data obtained from the application program 1104 is converted into image data having a resolution of 720×720 dpi.

In this conversion method, if the resolution of the image data is lower than the designated print resolution, then new pixel data is generated between adjacent pixel data by linear interpolation etc., whereas if the resolution is higher than the designated print resolution, then pixel data is thinned at a constant ratio, for example, thus adjusting the resolution of the image data to the print resolution.

Also, in this resolution conversion process, the size of the print region, which is the region onto which ink is actually ejected, is adjusted based on the image data. This size adjustment is performed by trimming, for example, the pixel data that correspond to the edges of the paper in the image data, in accordance with the margin format mode, the image quality mode, and the paper size mode, which are described later.

It should be noted that the pixel data in the image data has gradation values of many levels (for example, 256 levels) expressed in RGB color space. The pixel data having such RGB gradation values is hereinafter referred to as "RGB pixel data," and the image data made of these RGB pixel data is referred to as "RGB image data."

Color conversion processing is processing for converting the RGB pixel data of the RGB image data into data having gradation values of many levels (for example, 256 levels) expressed in CMYK color space. C, M, Y and K are the ink colors of the printer 1. Hereinafter, the pixel data having CMYK gradation values is referred to as "CMYK pixel data", and the image data made of this CMYK pixel data is referred to as "CMYK image data". Color conversion processing is carried out by the printer driver 1110 referencing a table (color conversion lookup table LUT) that correlates RGB gradation values and CMYK gradation values.

Halftone processing is processing for converting CMYK pixel data having many gradation values into CMYK pixel data having few gradation values, which can be expressed by the printer 1. For example, through halftone processing, CMYK pixel data representing 256 gradation values is converted into 2-bit CMYK pixel data representing four gradation values. The 2-bit CMYK pixel data indicates, for example, "no dot formation," "small dot formation," "medium dot formation," and "large dot formation" for each color.

Dithering or the like is used for such a halftone processing to create 2-bit CMYK pixel data with which the printer 1 can form dispersed dots. Halftone processing through dithering is described later. It should be noted that the method used for halftone processing is not limited to dithering, and it is also possible to use gamma-correction or error diffusion or the like.

Rasterization is processing for changing the CMYK image data that has been subjected to halftone processing into the data order in which it is to be transferred to the printer 1. Data that has been rasterized is output to the printer 1 as print data.

<Halftone Processing Through Dithering>

Figure 3:
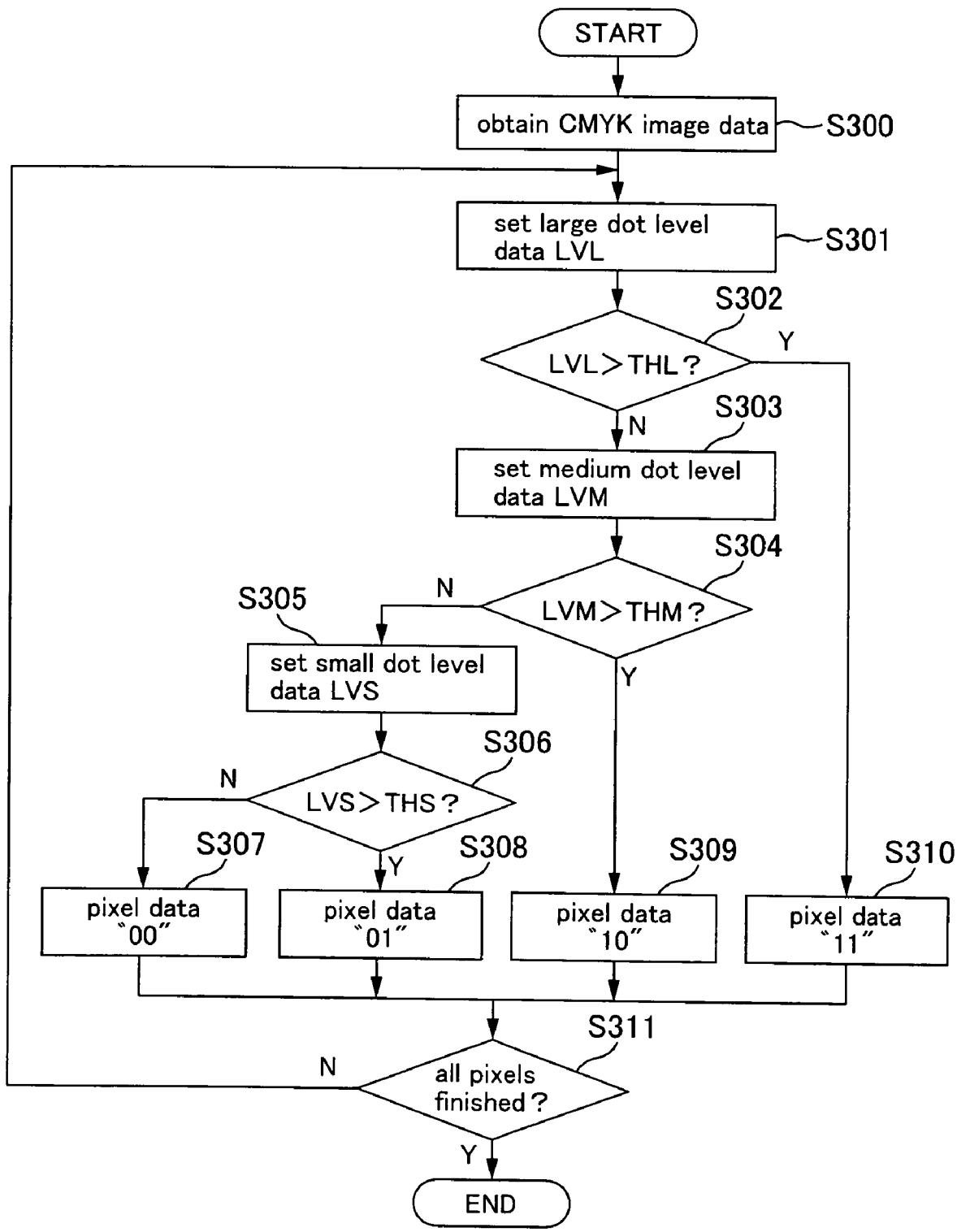
FIG. 3 is a flowchart of halftone processing through dithering.

Here, halftone processing through dithering is described in more detail. FIG. 3 is a flowchart of halftone processing through dithering. The following steps are executed in accordance with this flowchart.

First, in Step S300, the printer driver 1110 obtains the CMYK image data. The CMYK image data is made of image data expressed by 256 gradation values for each ink color C, M, Y, and K. In other words, the CMYK image data includes C image data for cyan (C), M image data for magenta (M), Y image data for yellow (Y), and K image data for black (K). This C, M, Y, and K image data is respectively made of C, M, Y, and K pixel data indicating the gradation values of that ink color.

It should be noted that the following description can be applied to any of the C, M, Y, and K image data, and thus the K image data is described as a representative example.

The printer driver 1110 performs the processing of the steps S301 to S311 for all of the K pixel data in the K image data while successively changing the K pixel data to be processed, and converts the K pixel data into 2-bit data representing one of "no dot formation," "small dot formation," "medium dot formation" and "large dot formation" mentioned above.

Figure 4:
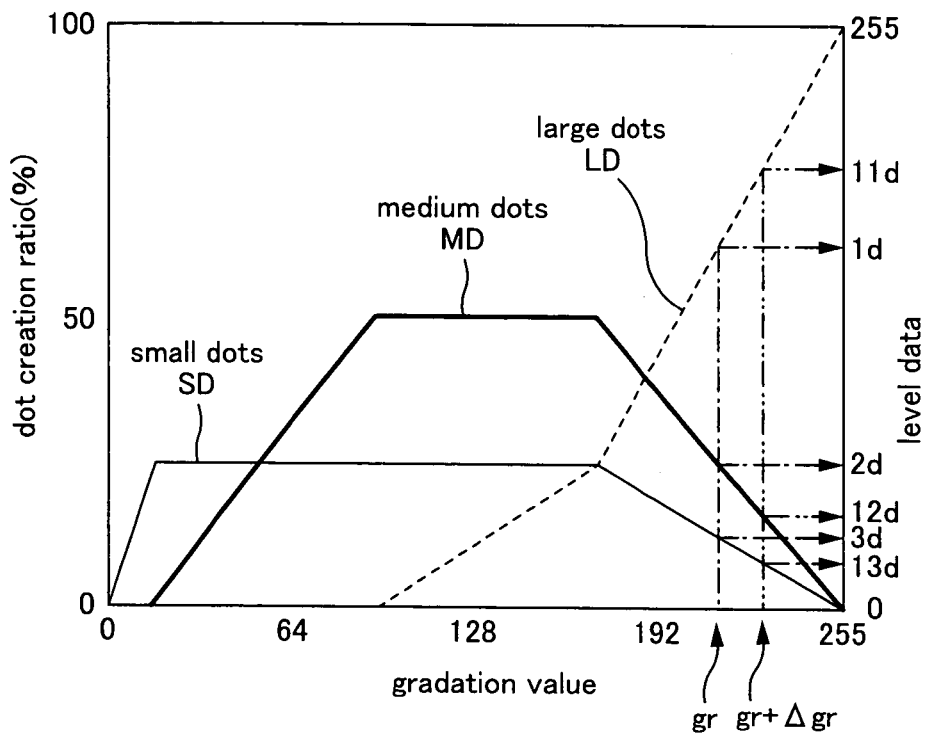
FIG. 4 is a diagram showing a dot creation ratio table.

More specifically, first, in Step S301, the large dot level data LVL is set as follows, in accordance with the gradation value of the K pixel data being processed. FIG. 4 is a diagram showing a creation ratio table that is used for setting the level data for large, medium, and small dots. The horizontal axis in this diagram is the gradation value (0-255), the vertical axis on the left is the dot creation ratio (%), and the vertical axis on right is the level data (0-255). Here, the "dot creation ratio" means the proportion of pixels in which dots are formed among all the pixels in a uniform region when assuming that this region is reproduced at a certain gradation value. The profile SD shown by the thin solid line in FIG. 4 indicates the creation ratio of small dots, the profile MD shown by the thick solid line indicates the creation ratio of medium dots, and the profile LD shown by the dashed line indicates the creation ratio of large dots. Moreover, "level data" refers to data that is obtained by converting the dot creation ratio into 256 gradation values ranging from 0 to 255.

That is to say, in Step S301, the level data LVL corresponding to the gradation value is read from the profile LD for large dots. For example, as shown in FIG. 4, if the gradation value of the K pixel data to be processed is gr, then the level data LVL is determined to be 1d using the profile LD. In practice, the profile LD is stored in form of a one-dimensional table in a memory (not shown) such as a ROM-within the computer 1100, and the printer driver 1110 determines the level data by referencing this table.

Next, in Step S302, it is then determined whether or not the level data LVL that has been set like this is larger than a threshold value THL. Here, determination of whether the dots are on or of f is performed using dithering. The threshold value THL is set to a different value for each pixel block of a so-called dither matrix. This embodiment uses a matrix in which the values from 0 to 254 appear in the fields of a 16×16 square pixel block.

Figure 5:
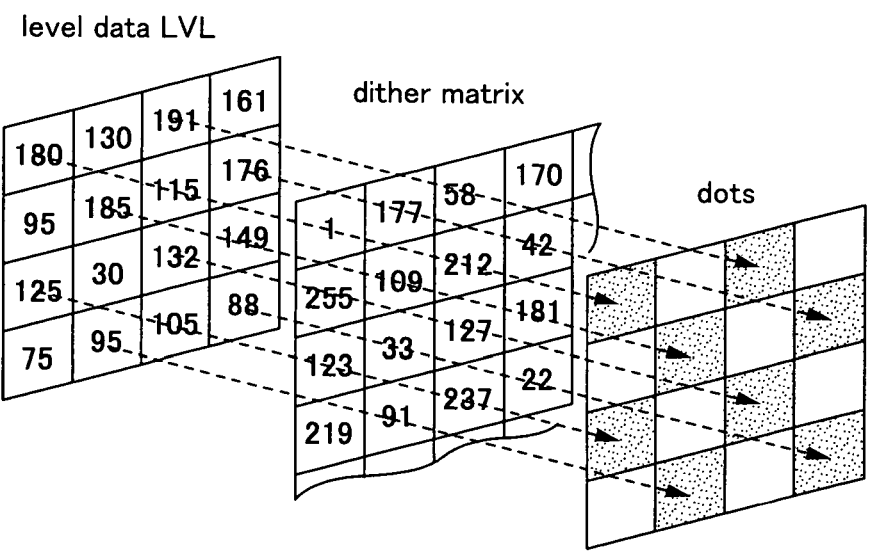
FIG. 5 is a diagram that shows how dots are to be determined on or off according to dithering.

FIG. 5 is a diagram that shows how dots are to be determined on or off according to dithering. For the sake of illustration, FIG. 5 shows only some of the K pixel data. First, as shown in the figure, the level data LVL of the K pixel data is compared with the threshold value THL of the pixel block on the dither matrix that corresponds to that K pixel data.

Then, if the level data LVL is larger than the threshold value THL, the dot is set to on, and if the level data LVL is smaller, the dot is set to off. The hatched pixel data in the figure indicate K pixel data in which the dot is set to on. In other words, in Step S302, if the level data LVL is larger than the threshold value THL, then the procedure advances to Step S310, and otherwise the procedure advances to Step S303. Here, if the procedure advances to Step S310, then the printer driver 1110 assigns the binary value of "11" indicating that the pixel data represents a large dot to the K pixel data being processed and stores this value, and then the procedure advances to Step S311. Then, in Step S311, it is determined whether or not all of the K pixel data has been processed. If the processing is finished, then the halftone processing is ended, and if processing is not finished, then the processing shifts to the K pixel data that has not yet been processed, and the procedure returns to Step S301.

On the other hand, if the procedure advances to Step S303, then the printer driver 1110 sets the level data LVM for medium dots. The level data LVM for medium dots is set by the creation ratio table noted above, based on the gradation value. The setting method is the same as for setting the level data LVL of large dots. That is to say, in the example shown in FIG. 4, the level data LVM is determined to be 2d.

Then, in Step S304, it is determined whether the medium dots are on or off by comparing the level data LVM of the medium dots with the threshold value THM. The method for determining whether the dots are on or off is the same as that for the large dots; however, as shown next, the threshold values THM that are used in the determination are values that are different from the threshold values THL used in the case of the large dots. That is, if the dots are determined to be on or off using the same dither matrix for the large dots and the medium dots, then the pixel blocks where the dots are likely to be on will be the same in both cases. That is, there is a high possibility that when a large dot is off, the medium dot will also be off. As a result, there is a possibility that the creation ratio of medium dots will be lower than the desired creation ratio. In order to avert this problem, in the present embodiment, different dither matrixes are used for the two. That is, by changing the pixel blocks that tend to be on for the large dots and the medium dots, it is possible to ensure that the large dots and the medium dots are formed appropriately.

Figures 6A, 6B, 7:
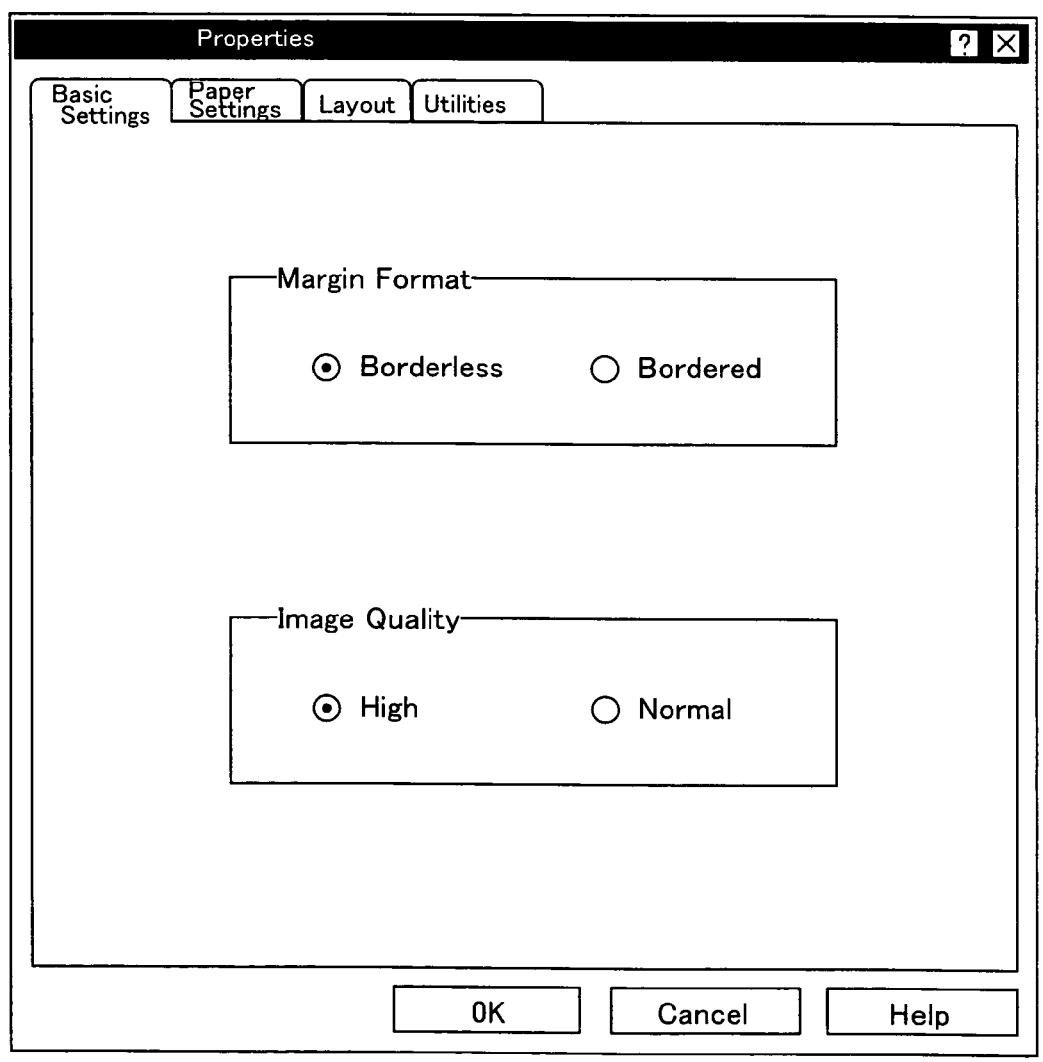
FIG. 6A shows a dither matrix that is used for the determination of large dots.
FIG. 6B shows a dither matrix that is used for the determination of medium dots.
FIG. 7 is an explanatory diagram of a user interface of the printer driver.

FIG. 6A and FIG. 6B are diagrams showing the relationship between the dither matrix that is used for assessing large dots and the dither matrix that is used for assessing medium dots. In this embodiment, a first dither matrix TM as shown in FIG. 6A is used for the large dots, and a second dither matrix UM as shown in FIG. 6B, which is obtained by mirroring these threshold values symmetrically at the center in the carrying direction, is used for the medium dots. As explained previously, the present embodiment uses a 16×16 matrix, but for sake of illustration, FIG. 6 shows a 4×4 matrix. It should be noted that it is also possible to use large dot dither matrixes and medium dot dither matrixes that are completely different.

Then, in Step S304, if the medium dot level data LVM is larger than the medium dot threshold value THM, then it is determined that the medium dot should be on, and the procedure advances to Step S309, and otherwise the procedure advances to Step S305. Here, if the procedure advances to Step S309, then the printer driver 1110 assigns the binary value of "10" indicating that the pixel data represents a medium dot to the K pixel data being processed and stores this value, and then the procedure advances to Step S311. Then, in Step S311, it is determined whether or not all of the K pixel data has been processed. If the processing is finished, then the halftone processing is ended, and if processing is not finished, then the processing shifts to the K pixel data that has not yet been processed, and the procedure returns to Step S301.

On the other hand, if the procedure advances to Step S305, then the small dot level data LVS is set in the same way that the level data of the large dots and the medium dots is set. The dither matrix for the small dots is preferably different from those for the medium dots and the large dots, in order to prevent a drop in the creation ratio of small dots as discussed above.

In Step S306, if the level data LVS is larger than the threshold value THS for small dots, then the printer driver 1110 advances to Step S308, and otherwise it advances to Step S307. Here, if the procedure advances to Step S308, then a binary value of "01" for pixel data that indicates a small dot is assigned to the K pixel data being processed and this value is stored, and then the procedure advances to Step S311. Then, in Step S311, it is determined whether or not all of the K pixel data has been processed. If processing is not finished, then the processing shifts to the K pixel data that has not yet been processed, and the procedure returns to Step S301. On the other hand, if processing is finished, then halftone processing for the K image data is ended, and halftone processing is performed in the same manner for the image data of the other colors.

If, on the other hand, the procedure has advanced to Step S307, then the printer driver 1110 assigns a binary value of "00" indicating the absence of a dot to the K pixel data being processed and stores this value. Then the procedure advances to Step S311. Then, in Step S311, it is determined whether or not all of the K pixel data has been processed. If processing is not finished, then the processing shifts to the K pixel data that has not yet been processed, and the procedure returns to Step S301. On the other hand, if processing is finished, then halftone processing for the K image data is ended, and halftone processing is performed in the same way for the image data of the other colors.

<Regarding the Settings of the Printer Driver>

FIG. 7 is an explanatory diagram of the user interface of the printer driver 1110. The user interface of the printer driver 1110 is displayed on a display device via the video driver 1102. The user can use the input device 1300 to change the various settings of the printer driver 1110. The settings for margin format mode and image quality mode are prearranged as the basic settings, and settings such as paper size mode are prearranged as the paper settings. These modes are described later.

=== Configuration of the Printer ===

<Regarding the Configuration of the Inkjet Printer>

Figure 8:
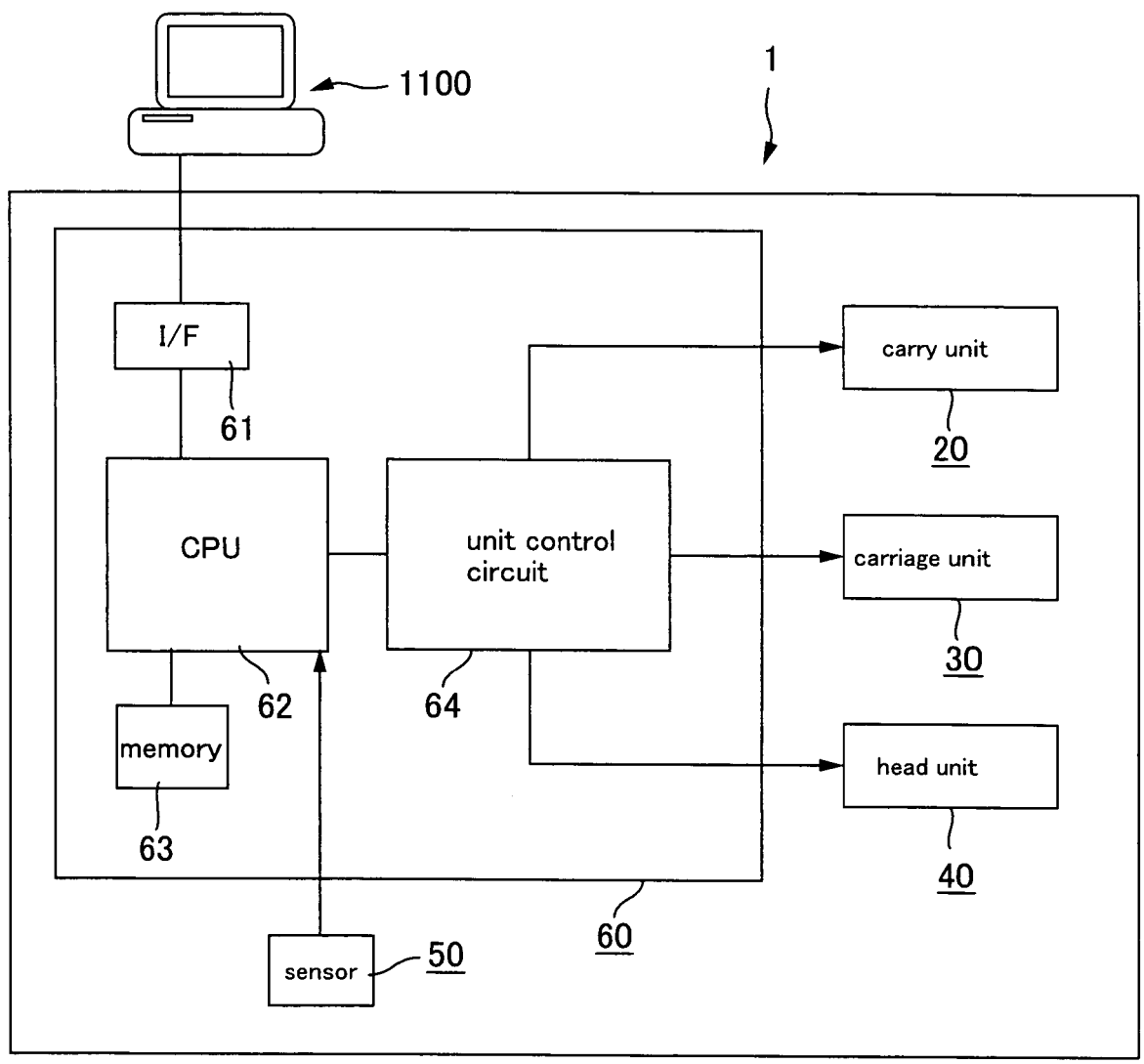
FIG. 8 is a block diagram of the overall configuration of the printer.
Figure 10:
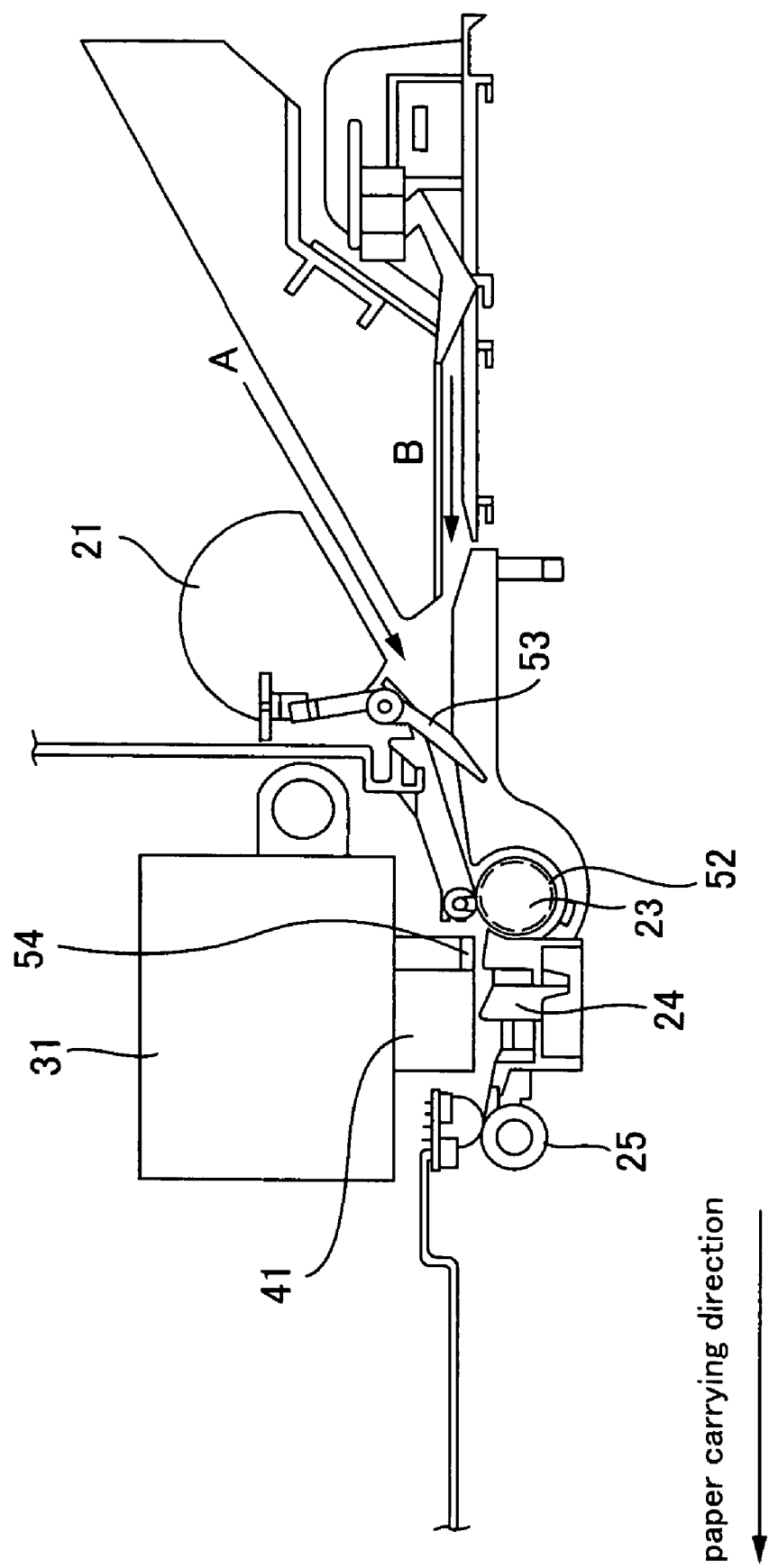
FIG. 10 is a transverse sectional view of the overall configuration of the printer.

FIG. 8 is a block diagram of the overall configuration of the printer of this embodiment. Also, FIG. 9 is a schematic diagram of the overall configuration of the printer of this embodiment. FIG. 10 is lateral sectional view of the overall configuration of the printer of this embodiment. The basic structure of the printer according to the present embodiment is described below.

The inkjet printer 1 of this embodiment has a carry unit 20, a carriage unit 30, a head unit 40, a sensor 50, and a controller 60. The printer 1 that has received print data from the computer 1100, which is an external device, controls the various units (the carry unit 20, the carriage unit 30, and the head unit 40) using the controller 60. The controller 60 controls the units in accordance with the print data that is received from the computer 1100 to form an image on a paper. The sensor 50 monitors the conditions within the printer 1, and outputs the results of this detection to the controller 60. The controller receives the detection results from the sensor, and controls the units based on these detection results.

The carry unit 20 is for feeding a medium (for example, paper S) into a printable position and carrying the paper in a predetermined direction (hereinafter, referred to as the carrying direction) by a predetermined carry amount during printing. The carry unit 20 has a paper supply roller 21, a carry motor 22 (hereinafter, referred to as PF motor), a carry roller 23, a platen 24, and a paper discharge roller 25. The paper supply roller 21 is a roller for automatically supplying paper that has been inserted into a paper insert opening into the printer 1. The paper supply roller 21 has a cross-sectional shape in the shape of the letter D, and the length of its circumference section is set longer than the carrying distance to the carry roller 23, so that the paper can be carried up to the carry roller 23 using this circumference section. The carry motor 22 is a motor for carrying paper in the carrying direction, and is constituted by a DC motor. The carry roller 23 is a roller for carrying the paper S that has been supplied by the paper supply roller 21 up to a printable region, and is driven by the carry motor 22. The platen 24 supports the paper S during printing. The paper discharge roller 25 is a roller for discharging the paper S, on which printing has finished, from the printer 1. The paper discharge roller 25 is rotated in synchronization with the carry roller 23.

The carriage unit 30 is provided with a carriage 31 and a carriage motor 32 (hereinafter, also referred to as "CR motor"). The carriage motor 32 is a motor for moving the carriage 31 back and forth in a predetermined direction (hereinafter, this is also referred to as the "carriage movement direction"), and is constituted by a DC motor. A later-described head 41 is held by the carriage 31. Thus, also this head 41 can be moved back and forth in the carriage movement direction by moving the carriage 31 back and forth. The carriage 31 detachably retains an ink cartridge containing ink. Note that the carriage movement direction corresponds to the "movement direction" in the claims.

The head unit 40 is for ejecting ink onto paper. The head unit 40 has the above-mentioned head 41, which includes a plurality of nozzles, and ejects ink intermittently from these nozzles. When the head 41 is moved in the carriage movement direction by moving the carriage 31, raster lines each made of dots extending in the carriage movement direction are formed on the paper by intermittently ejecting ink while moving. Note that these raster lines correspond to the "lines" in the claims.

The sensor 50 includes a linear encoder 51, a rotary encoder 52, a paper detection sensor 53, and a paper width sensor 54, for example. The linear encoder 51 is for detecting the position of the carriage 31 in the carriage movement direction. The rotary encoder 52 is for detecting the amount of rotation of the carry roller 23. The paper detection sensor 53 is for detecting the position of the front edge of the paper to be printed. The paper detection sensor 53 is provided in a position where it can detect the position of the front edge of the paper as the paper is being supplied toward the carry roller 23 by the paper supply roller 21. It should be noted that the paper detection sensor 53 is a mechanical sensor that detects the front edge of the paper through a mechanical mechanism.

More specifically, the paper detection sensor 53 has a lever that can be rotated in the paper carrying direction, and this lever is arranged so that it protrudes into the path over which the paper is carried. In this way, the front edge of the paper comes into contact with the lever and the lever is rotated, and thus the paper detection sensor 53 detects the position of the front edge of the paper by detecting the movement of the lever. The paper width sensor 54 is attached to the carriage 31. The paper width sensor 54 is an optical sensor and detects whether or not paper is present by its light-receiving section detecting reflected light of the light that has been irradiated onto the paper from the light-emitting section. The paper width sensor 54 detects the positions of the edges of the paper while being moved by the carriage 41, so as to detect the width of the paper.

The controller 60 is a control unit for carrying out control of the printer 1. The controller 60 has an interface section 61, a CPU 62, a memory 63, and a unit control circuit 64. The interface section 61 is for exchanging data between the computer 1100, which is an external device, and the printer 1. The CPU 62 is an arithmetic processing device for carrying out overall control of the printer 1. The memory 63 is for ensuring a working region and a region for storing the programs for the CPU 62, for instance, and includes storage means such as a RAM, an EEPROM, or a ROM. The CPU 62 controls the various units via the unit control circuit 64 in accordance with programs stored in the memory 63.

<Regarding the Printing Operation>

Figure 11:
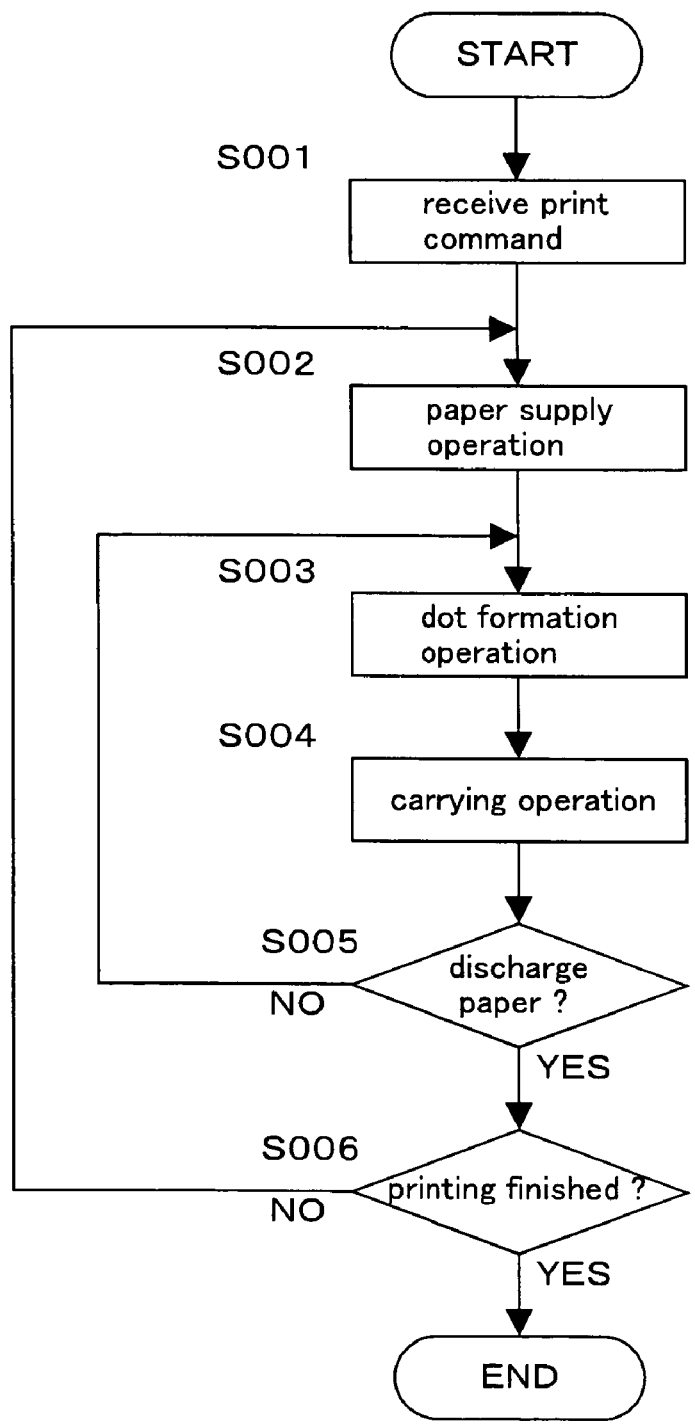
FIG. 11 is a flowchart of the processing during the printing operation.

FIG. 11 is a flowchart of the operation during printing. The various operations that are described below are achieved by the controller 60 controlling the various units in accordance with a program stored in the memory 63. This program includes codes for executing the various processes.

Receive Print Command (S001): The controller 60 receives a print command via the interface section 61 from the computer 1100. This print command is included in the header of the print data transmitted from the computer 1100. The controller 60 then analyzes the content of the various commands included in the print data that are received and uses the various units to perform the following paper supply operation, carrying operation, and dot formation operation, for example.

Paper Supply Operation (S002): Next, the controller 60 performs the paper supply operation. The paper supply operation is a process for supplying paper to be printed into the printer 1 and positioning the paper at a print start position (also referred to as the "indexed position"). The controller 60 rotates the paper supply roller 21 to feed the paper to be printed up to the carry roller 23. The controller 60 rotates the carry roller 23 to position the paper that has been fed from the paper supply roller 21 at the print start position. When the paper has been positioned at the print start position, at least some of the nozzles of the head 41 are in opposition to the paper.

Dot Formation Operation (S003): Next, the controller 60 performs the dot formation operation. The dot formation operation is an operation of intermittently ejecting ink from the head 41 moving in the carriage movement direction, so as to form dots on the paper. The controller 60 drives the carriage motor 32 to move the carriage 31 in the carriage movement direction. Then, the controller 60 causes ink to be ejected from the head 41 in accordance with the print data while the carriage 31 is moving. Dots are formed on the paper when ink ejected from the head 41 lands on the paper.

Carrying Operation (S004): Next, the controller 60 performs the carrying operation. The carrying operation is a process for moving the paper relative to the head 41 in the carrying direction. The controller 60 drives the carry motor to rotate the carry roller and thereby carry the paper in the carrying direction. Through this carrying operation, the head 41 becomes able to form dots at positions that are different from the positions of the dots formed in the preceding dot formation operation.

Paper Discharge Determination (S005): Next, the controller 60 determines whether or not to discharge the paper that is being printed. The paper is not discharged if there is still data for printing the paper that is being printed. In this case, the controller 60 repeats in alternation the dot formation operation and the carrying operation until there is no longer any data for printing, gradually printing an image made of dots on the paper. When there is no longer any data for printing the paper that is being printed, the controller 60 discharges that paper. The controller 60 discharges the printed paper to the outside by rotating the paper discharge roller. It should be noted that whether or not to discharge the paper can also be determined based on a paper discharge command included in the print data.

Determination Whether Printing is Finished (S006): Next, the controller 60 determines whether or not to continue printing. If the next sheet of paper is to be printed, then printing is continued and the paper feed operation for the next sheet of paper is started. If the next sheet of paper is not to be printed, then the printing operation is ended.

<Regarding the Configuration of the Head>

Figure 12:
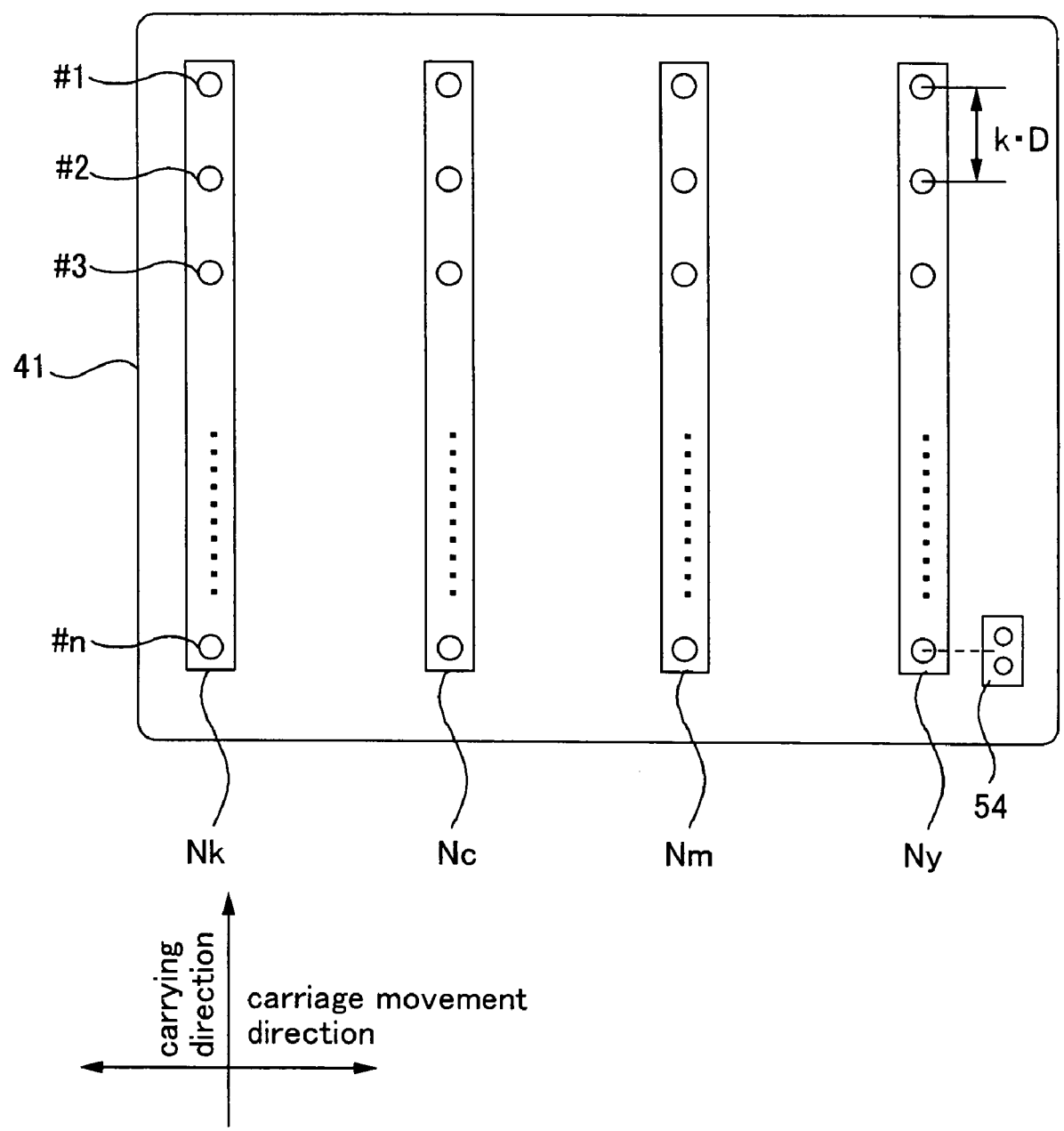
FIG. 12 is an explanatory diagram showing the arrangement of the nozzles.

FIG. 12 is an explanatory diagram showing the arrangement of the nozzles in the lower surface of the head 41. A black ink nozzle row Nk, a cyan ink nozzle row Nc, a magenta ink nozzle row Nm, and a yellow ink nozzle row Ny are formed in the lower surface of the head 41. Each nozzle row is provided with n (for example, n=180) nozzles, which are ejection openings for ejecting the inks of various colors.

The plurality of nozzles of the nozzle rows are arranged in a row at a constant spacing (nozzle pitch: k·D) in the carrying direction. Here, D is the minimum dot pitch in the carrying direction (that is, the interval of the dots formed on the paper S at the highest resolution). Also, k is an integer of 1 or more. For example, if the nozzle pitch is 180 dpi ($\frac{1}{180}$ inch), and the dot pitch in the carrying direction is 720 dpi ($\frac{1}{720}$), then k=4.

The nozzles of the nozzle rows are each assigned a number (#1 to #n) that becomes smaller the more downstream the nozzle is located. That is, the nozzle #1 is positioned more downstream in the carrying direction than the nozzle #n. Each nozzle is provided with a piezo element (not shown) as a drive element for driving the nozzle and letting it eject ink droplets.

<Regarding the Driving of the Head>

Figure 13:
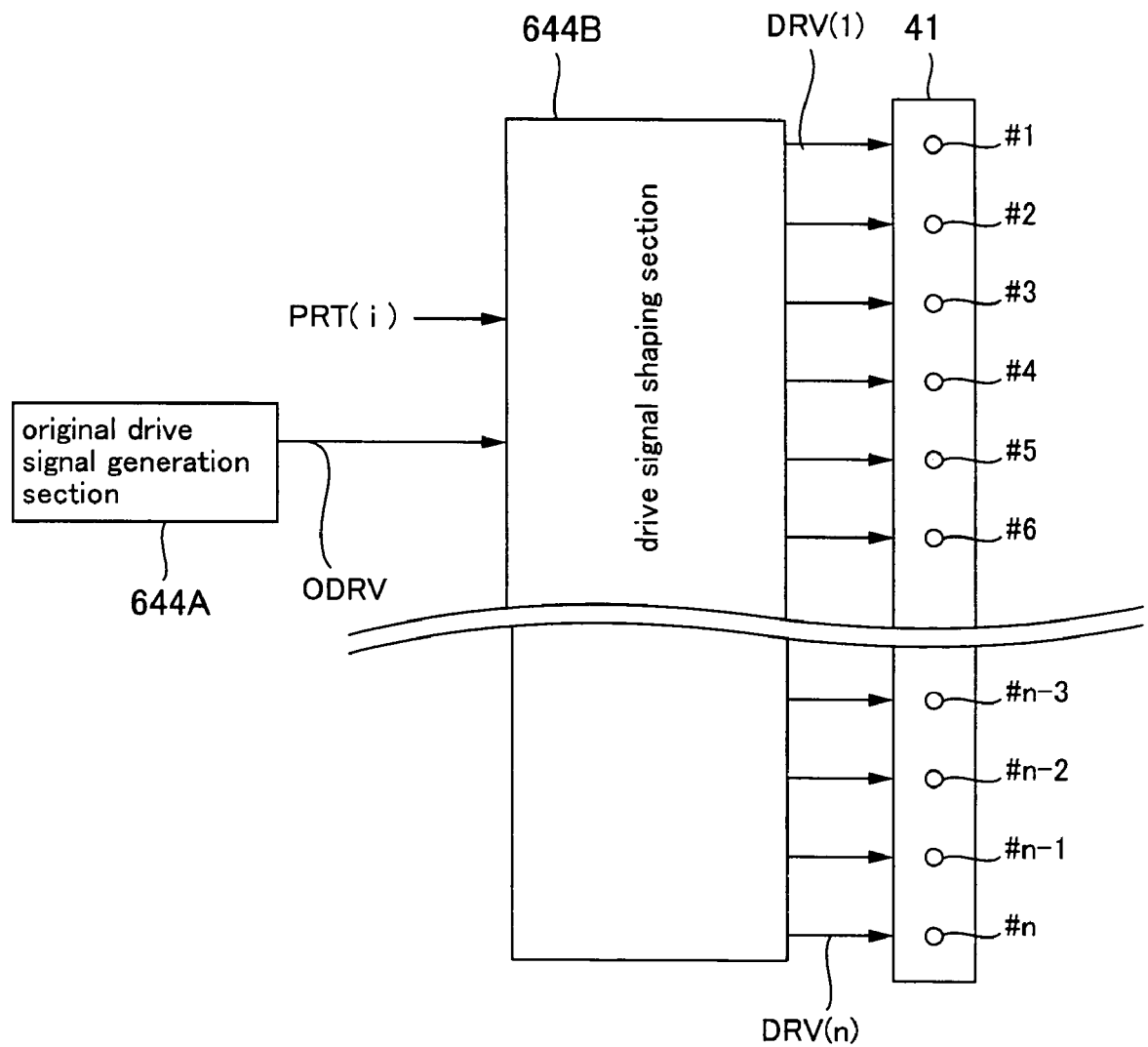
FIG. 13 is an explanatory diagram of the drive circuit of the head unit.

FIG. 13 is an explanatory diagram of the drive circuit of the head unit 40. This drive circuit is provided within the unit control circuit 64 mentioned earlier, and as shown in the drawing, it is provided with an original drive signal generation section 644A and a drive signal shaping section 644B. In this embodiment, a drive circuit for these nozzles #1 to #n is provided for each nozzle row, that is, for each nozzle row of the colors black (K), cyan (C), magenta (M), and yellow (Y), such that the piezo elements are driven individually for each nozzle row. The number in parentheses at the end of the name of each of the signals in the diagram indicates the number of the nozzle to which that signal is supplied.

When a voltage of a predetermined duration is applied between electrodes provided at both ends of a piezo element, the piezo element expands for the duration of voltage application and deforms a lateral wall of the ink channel. As a result, the volume of the ink channel shrinks in accordance with the expansion of the piezo element, and an amount of ink that corresponds to this shrinkage is ejected from the various color nozzles #1 to #n as ink droplets.

The original drive signal generation section 644A generates an original signal ODRV that is shared by the nozzles #1 to #n. The original signal ODRV is a signal that includes a plurality of pulses during the time in which the carriage 31 moves across the length of a single pixel.

The drive signal shaping section 644B receives a print signal PRT(i) together with an original signal ODRV that is output from the original signal generation section 644A. The drive signal shaping section 644B shapes the original signal ODRV in correspondence with the level of the print signal PRT(i) and outputs it to the piezo elements of the nozzles #1 to #n as a drive signal DRV(i). The piezo elements of the nozzles #1 to #n are driven in accordance with the drive signal DRV from the drive signal shaping section 644B.

<Regarding the Drive Signals of the Head>

Figure 14:
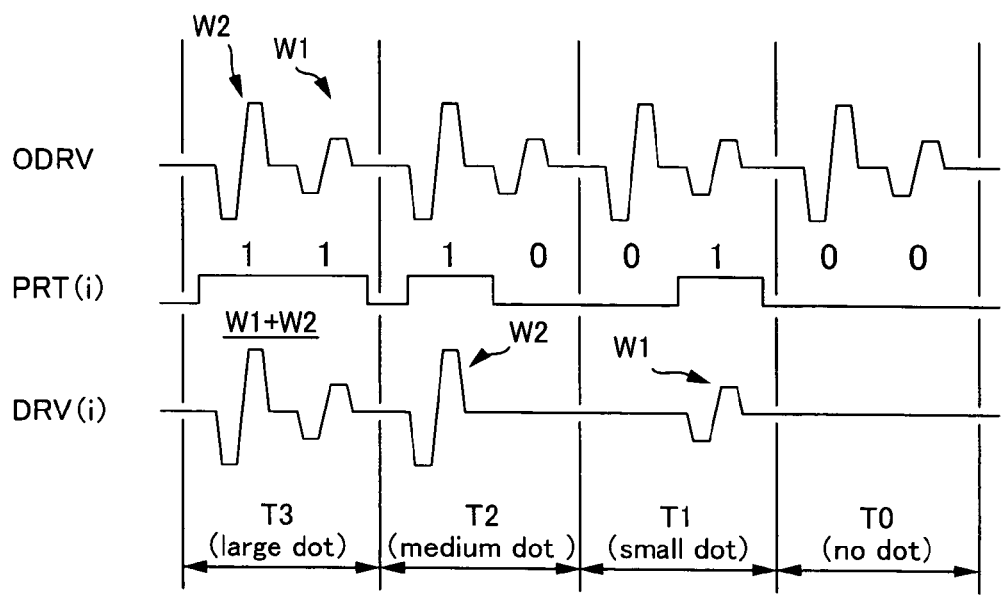
FIG. 14 is a timing chart for explaining the various signals.

FIG. 14 is a timing chart for explaining the various signals. That is, this figure shows a timing chart for the various signals, namely the original signal ODRV, the print signal PRT(i), and the drive signal DRV(i).

The original signal ODRV is a signal that is supplied from the original signal generation section 644A and shared by the nozzles #1 to #n. In this embodiment, the original signal ODRV includes two pulses, namely a first pulse W1 and a second pulse W2, within the period during which the carriage 31 moves across the length of a single pixel. It should be noted that the original signal ODRV is output from the original signal generation section 644A to the drive signal shaping section 644B.

The print signal PRT is a signal corresponding to the pixel data for a single pixel. That is, the print signal PRT is a signal corresponding to the pixel data included in the print data. In this embodiment, the print signals PRT(i) are signals having two bits of information per pixel. The drive signal shaping section 644B shapes the original signal ODRV in correspondence with the signal level of the print signal PRT and outputs the drive signal DRV.

The drive signal DRV is a signal that is obtained by blocking the original signal ODRV in correspondence with the level of the print signal PRT. That is, when the level of the print signal PRT is "1", then the drive signal shaping section 644B allows the drive pulse for the original signal ODRV to pass unchanged and sets it as the drive signal DRV. On the other hand, when the level of the print signal PRT is "0", the drive signal shaping section 644B blocks the pulse of the original signal ODRV. It should be noted that the drive signal shaping section 644B outputs the drive signal DRV to the piezo elements that are provided nozzle by nozzle. The piezo elements are then driven in accordance with the drive signal DRV.

When the print signal PRT(i) corresponds to the two bits of data "01" then only the first pulse W1 is output in the first half of the pixel period. Accordingly, a small ink droplet is ejected from the nozzle, forming a small-sized dot (small dot) on the paper. When the print signal PRT(i) corresponds to the two bits of data "10" then only the second pulse W2 is output in the second half of a single pixel interval. Accordingly, a medium-sized ink droplet is ejected from the nozzle, forming a medium-sized dot (medium dot) on the paper. When the print signal PRT(i) corresponds to the two bits of data "11" then both the first pulse W1 and the second pulse W2 are output during a single pixel interval. Accordingly, a small ink droplet and a medium droplet are ejected from the nozzle, forming a large-sized dot (large dot) on the paper. When the print signal PRT(i) corresponds to the two bits of data "00" then neither the first pulse W1 or the second pulse W2 are output during the pixel period. In this case, no ink droplet of any size is ejected from the nozzle, and no dot is formed on the paper.

As described above, the drive signal DRV(i) in a single pixel period is shaped so that it may have four different waveforms corresponding to the four different values of the print signal PRT(i).

=== Regarding the Print Modes ===

Here, the print modes that can be executed by the printer 1 of the present embodiment are described using FIG. 15A, FIG. 15B, FIG. 16A and FIG. 16B. Typical examples of print modes are the interlaced mode and the overlap mode. By using either of those print modes, individual differences among the nozzles such as in the nozzle pitch and the ink ejection properties are lessened by spreading them out over the image to be printed, and thus an improvement in image quality can be attained.

It should be noted that to facilitate explanations, in the printer 1 according to the present embodiment, it is presumed that the interlaced mode can be performed, but needless to say, it is also possible to apply the overlap mode, and both print modes are outlined below.

<Regarding the Interlaced Mode>

Figure 15A:
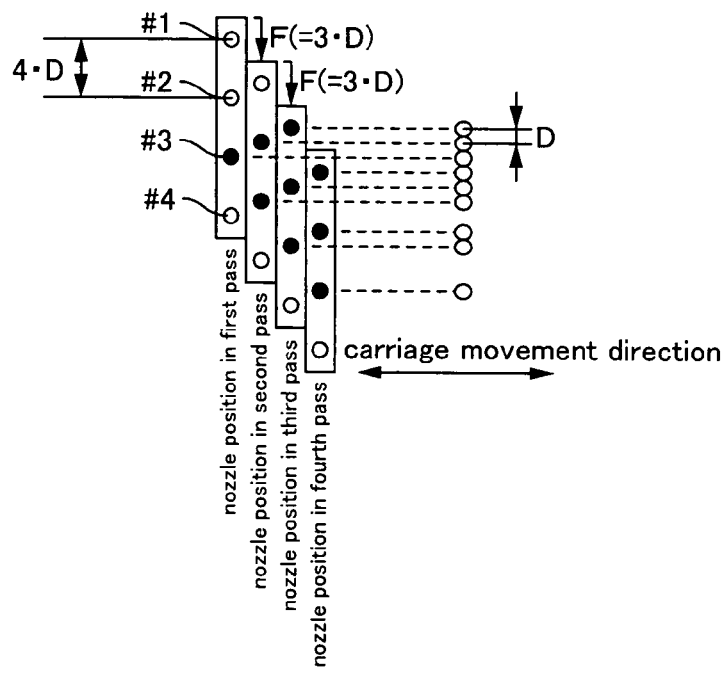
FIG. 15A is an explanatory diagram of the interlaced mode.
Figure 15B:
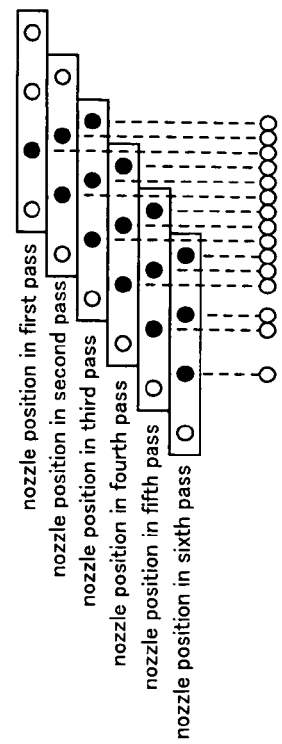
FIG. 15B is an explanatory diagram of the interlaced mode.

FIGS. 15A and 15B are explanatory diagrams of the interlaced mode. For the sake of simplifying the description, the nozzle rows shown in place of the head 41 are illustrated to be moving with respect to the paper S, but it should be noted that the diagrams show the relative positional relationship between the nozzle rows and the paper S, and in fact it is the paper S that moves in the carrying direction. In the diagrams, the nozzles represented by black circles are the nozzles that actually eject ink, and the nozzles represented by white circles are nozzles that do not eject ink. FIG. 15A shows the nozzle positions in the first through fourth passes and how the dots are formed by those nozzles. FIG. 15B shows the nozzle positions in the first through sixth passes and how the dots are formed.

Here, "interlaced mode" refers to a print mode in which k is at least 2 and a raster line that is not recorded is sandwiched between the raster lines that are recorded in a single pass. Also, "pass" refers to a single movement of the nozzle rows in the carriage movement direction. A "raster line" is a row of dots lined up in the carriage movement direction.

With the interlaced mode illustrated in FIG. 15A and FIG. 15B, each time the paper S is carried in the carrying direction by a constant carry amount F, the nozzles record a raster line immediately above the raster line that was recorded in the pass immediately before. In order to record the raster lines in this way using a constant carry amount, the number N (which is an integer) of nozzles that actually eject ink is coprime to k, and the carry amount F is set to N·D.

In the figures, the nozzle row has four nozzles arranged in the carrying direction. However, since the nozzle pitch k of the nozzle row is 4, not all the nozzles can be used in order to satisfy the condition for the interlaced mode, that is, "N and k are coprime". Accordingly, only three of the four nozzles are used in this interlaced mode. Furthermore, because three nozzles are used, the paper S is carried by a carry amount 3·D. As a result, for example a nozzle row with a nozzle pitch of 180 dpi (4·D) is used to form dots on the paper S at a dot pitch of 720 dpi (=D).

The figures show the manner in which consecutive raster lines are formed, with the first raster line being formed by the nozzle #1 of the third pass, the second raster line being formed by the nozzle #2 of the second pass, the third raster line being formed by the nozzle #3 of the first pass, and the fourth raster line being formed by the nozzle #1 of the fourth pass. It should be noted that ink is ejected only from nozzle #3 in the first pass, and ink is ejected only from nozzle #2 and nozzle #3 in the second pass. The reason for this is that if ink were ejected from all of the nozzles in the first and second passes, it would not be possible to form consecutive raster lines on the paper S. It should be noted that from the third pass on, three nozzles (#1 to #3) eject ink and the paper S is carried by a constant carry amount F (=3·D), forming consecutive raster lines at the dot pitch D.

<Regarding the Overlap Mode>

Figure 16A:
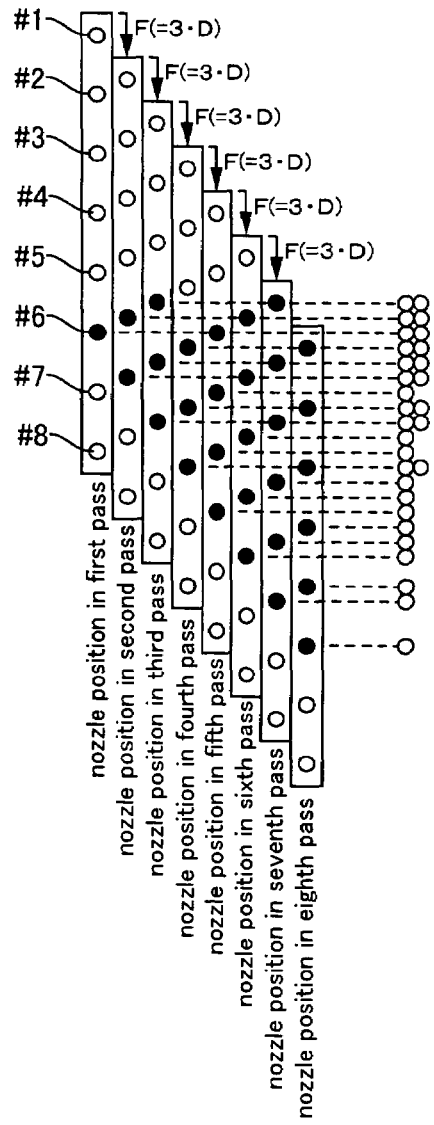
FIG. 16A is an explanatory diagram of the overlap mode.
Figure 16B:
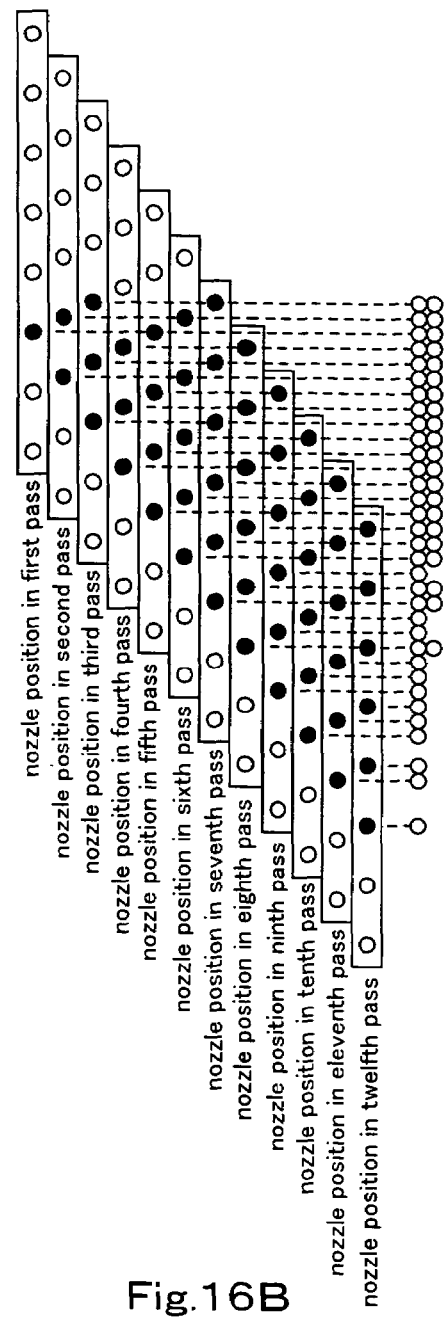
FIG. 16B is an explanatory diagram of the overlap mode.

FIGS. 16A and 16B are explanatory diagrams of the overlap mode. With the above-described interlaced mode, a single raster line is formed by a single nozzle, whereas with the overlap mode, a single raster line is formed, for example, by two or more nozzles.

That is, with the overlap mode, each time the papers is carried by a carry amount F in the carrying direction, the nozzles, which move in the raster line direction, intermittently eject ink droplets every several dots, intermittently forming dots in the raster line direction. Then, in another pass, dots are formed such that the intermittent dots already formed by the other nozzle are completed in a complementary manner. Thus, a single raster line is completed by a plurality of nozzles. The overlap number M is defined as the number of passes needed to complete a single raster line. In the figure, since each nozzle forms dots intermittently at every other dot, dots are formed in every pass either at the uneven numbered pixels or at the even numbered pixels. Since a single raster line is formed using two nozzles, the overlap number is M=2. It should be noted that the overlap number is M=1 in the case of the above-mentioned interlaced mode.

In overlap printing, the following conditions are necessary in order to carry out recording with a constant carry amount F: (1) N/M is an integer, (2) N/M and k are coprime, and (3) the carry amount F is set to (N/M)·D.

In the figures, the nozzle row is shown to have eight nozzles arranged in the carrying direction. However, since the nozzle pitch k of the nozzle row is 4, in order to fulfill the condition for the overlap mode, which is that "N/M and k are coprime," not all the nozzles can be used. Therefore, only six of the eight nozzles are used in the overlap mode. Furthermore, because six nozzles are used, the paper S is carried by a carry amount 3·D. As a result, for example a nozzle row with a nozzle pitch of 180 dpi (4·D) is used to form dots on the paper S at a dot pitch of 720 dpi (=D). Furthermore, in a single pass, the nozzles form dots intermittently in the raster line direction at an interval of every other dot. In the figure, raster lines in which two dots have been written in the raster line direction are already completed. For example, in FIG. 16A, the first through the sixth raster lines have already been completed. Raster lines in which only one dot is written are raster lines in which dots have been formed intermittently at every other dot. For example, in the seventh and tenth raster lines, dots are formed intermittently every other dot. It should be noted that the seventh raster line, in which dots have been intermittently formed at every other dot, is completed by having the nozzle #1 fill it up in the ninth pass.

The figures show the manner in which consecutive raster lines are formed, with the first raster line being formed by the nozzle #4 in the third pass and the nozzle #1 in the seventh pass, the second raster line being formed by the nozzle #5 in the second pass and the nozzle #2 in the sixth pass, the third raster line being formed by the nozzle #6 in the first pass and the nozzle #3 in the fifth pass, and the fourth raster line being formed by the nozzle #4 in the fourth pass and the nozzle #1 in the eighth pass. It should be noted that in the first to sixth passes, some of the nozzles #1 to #6 do not eject ink. The reason for this is that if ink were ejected from all of the nozzles in the first to sixth pass, it would not be possible to form consecutive raster lines on the paper S. It should be noted that from the seventh pass on, six nozzles (#1 to #6) eject ink and the paper S is carried by a constant carry amount F (=3·D), forming consecutive raster lines at the dot pitch D.

Table 1 is a table illustrating the positions in the raster line direction where dots are formed in each pass.

TABLE 1

| | pass | | | | | | | |
|---|---|---|---|---|---|---|---|---|
| | $1^{st}$ pass | $2^{nd}$ pass | $3^{rd}$ pass | $4^{th}$ pass | $5^{th}$ pass | $6^{th}$ pass | $7^{th}$ pass | $8^{th}$ pass |
| recorded pixel | odd | even | odd | even | even | odd | even | odd |

In Table 1, "odd" means that dots are formed at odd-numbered pixels of the pixels lined up in the raster line direction (pixels in a raster line). Moreover, "even" in the table means that dots are formed at even-numbered pixels of the pixels lined up in the raster line direction. For example, in the third pass, the nozzles form dots at odd-numbered pixels. When a single raster line is formed by M nozzles, k×M passes are required in order to complete a number of raster lines corresponding to the nozzle pitch. For example, in the example shown in the figure, a single raster line is formed by two nozzles, so that 8 (4×2) passes are required in order to complete four raster lines. As can be seen from Table 1, in the four passes during the first half, dots are formed in the order of odd-even-odd-even. Consequently, when the four passes during the first half have been finished, dots are formed at even-numbered pixels in raster lines adjacent to raster lines in which dots are formed at odd-numbered pixels. In the four passes during the second half, dots are formed in the order of even-odd-even-odd. In other words, in the four passes during the second half, dots are formed in reverse order with respect to the four passes during the first half. Consequently, dots are formed so as to fill up gaps between the dots that have been formed in the passes during the first half.

=== Regarding Borderless Printing and Bordered Printing ===

With the printer 1 of the present embodiment, it is possible to execute both "borderless printing" in which printing is carried out without forming margins at the edges of the paper, and "bordered printing," in which printing is carried out with margins at the edges of the paper.

<Overview of Borderless Printing and Bordered Printing>

Figure 17A:
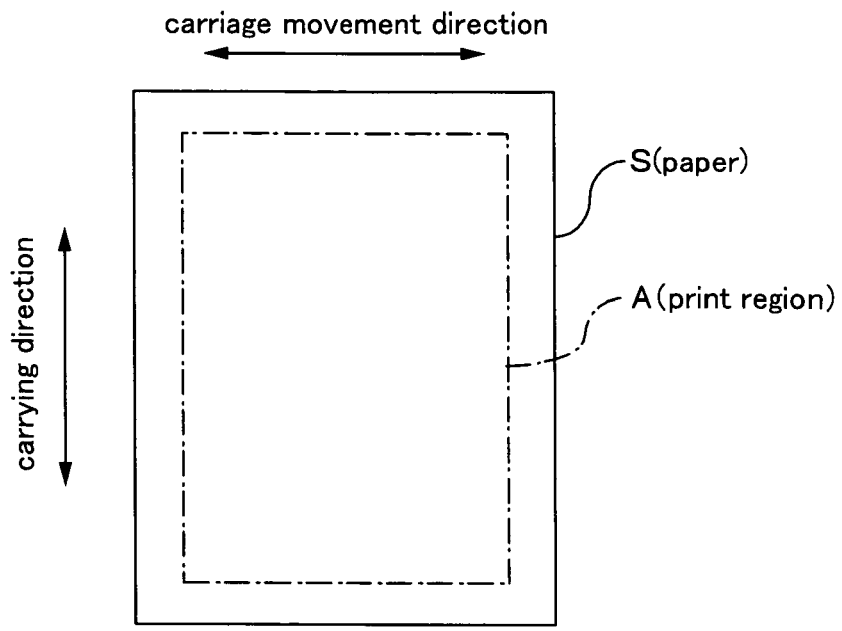
FIG. 17A is a diagram showing the size relationship between the print region and the paper during bordered printing.

With bordered printing, printing is performed such that the print region A, which is the region to which ink is ejected according to the print data, is contained within the paper S. FIG. 17A shows the relationship between the sizes of the print region A and the paper S during "bordered printing." The print region A is set to be contained within the paper S, and margins are formed at the upper and lower edge as well as the left and right edge of the paper S.

When performing bordered printing, the printer driver 1110 converts the resolution of the image data in the above-noted resolution conversion process to a designated print resolution while processing the image data so that the print region A is located inward from the edges of the paper S by a predetermined width. For example, if the print region A of the image data does not fit within a predetermined width from the edges when printing at that print resolution, then the pixel data corresponding to the edges of the image are removed by trimming etc. as appropriate, making the print region A smaller.

Figure 17B:
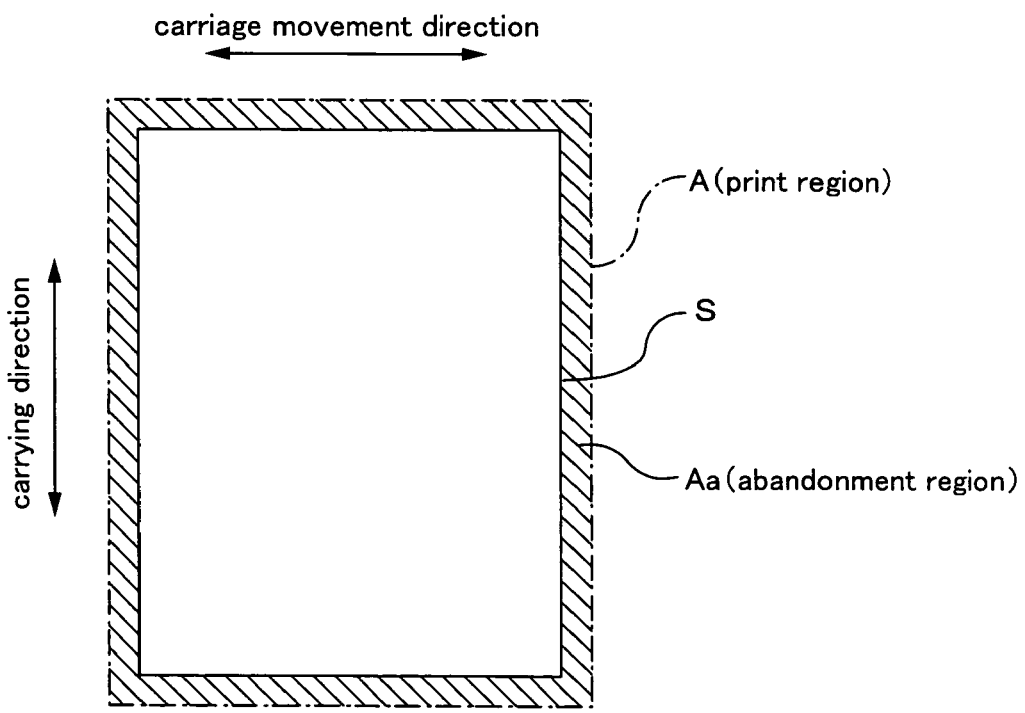
FIG. 17B is a diagram showing the size relationship between the print region and the paper during borderless printing.

On the other hand, with borderless printing, printing is executed such that the print region A extends beyond the paper S. FIG. 17B shows the relationship between the sizes of the print region A and the paper S during "borderless printing." The print region A is also set for a region that extends beyond the top and bottom edges and the left and right edges of the paper S (hereinafter, this region is referred to the abandonment region Aa), and ink is ejected onto this region as well. Thus, ink is reliably ejected toward the edges of the paper S, even if there is some shift in the position of the paper S with respect to the head 41 caused by the precision of the carrying operation, for example, thus achieving printing without forming margins at the edges. It should be noted that the region protruding from the upper and lower edges in the abandonment region Aa corresponds to the "region determined to be outside toward the upstream side from the upstream edge in the intersecting direction of the medium, and the region determined to be outside toward the downstream side from the downstream edge" in the claims.

When performing borderless printing, the printer driver 1110 converts the resolution of the image data in the above-noted resolution conversion process to a designated print resolution while processing the image data so that the print region A extends beyond the edges of the paper S by a predetermined width. For example, if the print region A of the image data extends too far beyond the paper S when printing at that print resolution, then the image data is suitably trimmed, for example, so that the amount by which the print region A extends beyond the paper S becomes a predetermined width.

It should be noted that paper size information regarding the standard dimensions of the paper, such as the A4 size, is stored in advance in the memory of the computer 1100. This paper size information indicates for example how many dots (D) there are in the carriage movement direction and in the carrying direction, respectively, and this information is stored in association with the aforementioned paper size modes that are entered through the user interface of the printer driver 1110. Then, when processing the image data, the printer driver 1110 references the paper size information corresponding to that paper size mode to find the size of the paper, and then processing is performed.

<Regarding the Nozzles Used in Borderless Printing and Bordered Printing>

As mentioned above, with "borderless printing", ink is ejected toward the abandoned region as well, which is the region outside of the upper edge and the lower edge of the paper. Thus, there is the possibility that the ink that is abandoned will adhere to the platen 24 and cause the platen 24 to become dirty. Accordingly, the platen 24 is provided with grooves for collecting the ink outside the upper and lower edge of the paper S, and when printing the upper edge and the lower edge, use of the nozzles is restricted such that ink is ejected from only the nozzles that are in opposition to those grooves.

Figure 18A:
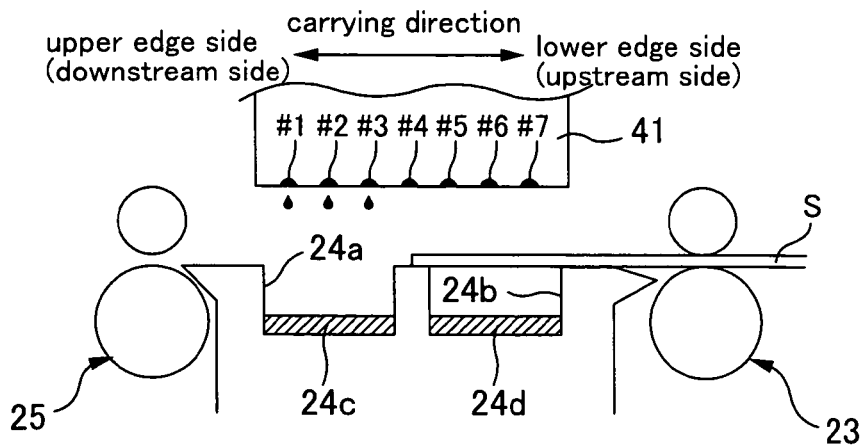
FIG. 18A is a diagram showing the positional relationship between the grooves provided in the platen and the nozzles.
Figure 18B:
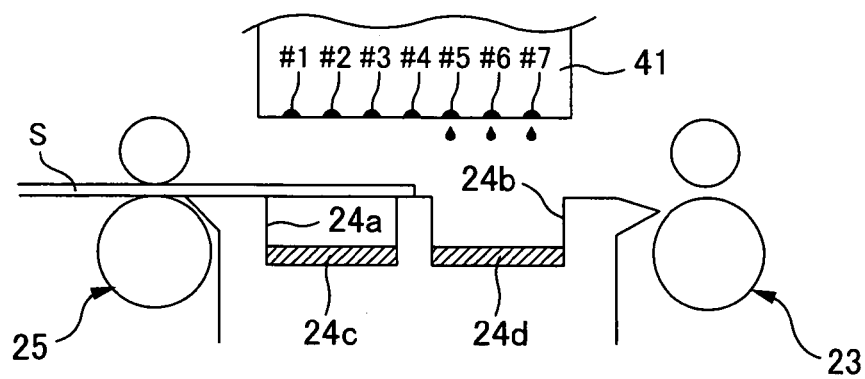
FIG. 18B is a diagram showing the positional relationship between the grooves provided in the platen and the nozzles.
Figure 18C:
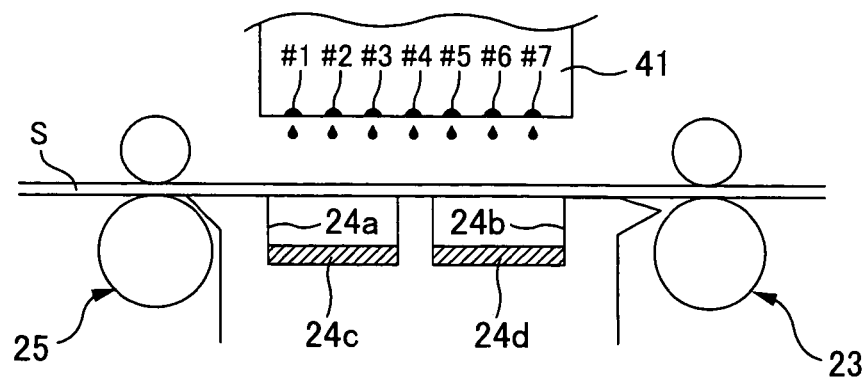
FIG. 18C is a diagram showing the positional relationship between the grooves provided in the platen and the nozzles.

FIGS. 18A to 18C show the positional relationship between the nozzles and the grooves provided in the platen 24. It should be noted that for illustrative reasons, a nozzle row with n=7, that is, a nozzle row provided with nozzles #1 to #7, is used as an example. As shown in FIG. 18A, the upstream side and the downstream side in the carrying direction respectively correspond to the lower edge side and the upper edge side of the paper S.

As shown in FIG. 18A, the platen 24 is provided with two grooves 24*a* and 24*b*, one on the downstream side in the carrying direction and one on the upstream side in the carrying direction. The groove 24*a* on the downstream side faces the nozzles #1 to #3, whereas the groove 24*a* on the upstream side faces the nozzles #5 to #7. When printing the upper edge of the paper S as shown in FIG. 18A, printing is performed using the nozzles #1 to #3 (hereinafter, this is referred to as "upper edge processing"), and when printing the lower edge portion as shown in FIG. 18B, printing is performed using the nozzles #5 to #7 (hereinafter, this is referred to as "lower edge processing"). The intermediate portion between the upper edge and the lower edge is printed using all of the nozzles #1 to #7 as shown in FIG. 18C (hereinafter, this is referred to as "intermediate processing"). When printing the upper edge of the paper S as shown in FIG. 18A, the ejection of ink from the nozzles #1 to #3 is started before the upper edge arrives at the downstream groove 24*a*. However, at this time, the abandoned ink that does not land on the paper S is absorbed by an absorbing material 24*c* within the downstream side groove 24*a*, so that the platen 24 will not become dirty. Also, as shown in FIG. 18B, when printing the lower edge of the paper S, the ejection of ink from the nozzles #5 to #7 is continued even after that lower edge has passed over the upstream groove 24*b*. However, at this time, the abandoned ink that does not land on the paper S is absorbed by an absorbing material 24*d* within the upstream side groove 24*b*, so that the platen 24 will not become dirty.

On the other hand, in "bordered printing", a margin is formed at the edges of the paper S, and thus ink is not ejected toward the abandoned region, which is the region outside of the upper edge and the lower edge of the paper S. Consequently, it is always possible to start and end the ejection of ink in a state where the paper S is in opposition to a nozzle, and thus unlike with "borderless printing", there is no limitation to which nozzles are used, so that printing is performed using all nozzles #1 to #7 over the entire length of the paper S.

=== Regarding the Processing Modes ===

The user can select "borderless printing" or "bordered printing" through the user interface of the printer driver 1110. That is, as shown in FIG. 7, the two buttons "bordered" and "borderless" are displayed on a screen of the user interface as the input buttons of the margin format mode for specifying the margin format.

It is also possible to select the image quality mode for specifying the image quality of the image from the screen of that user interface, which displays the two buttons "normal" and "fine" as the input buttons of the image quality mode. If the user has input "normal," then the printer driver 1110 sets the print resolution to 360×360 dpi, for example, whereas if the user has input "fine", then the printer driver 1110 sets the print resolution to, for example, 720×720 dpi.

It should be noted that as shown in the first reference table of FIG. 19, print modes are given for each combination of margin mode and image quality mode. Also, processing modes are associated with these print modes as shown in the second reference table in FIG. 20. It should be noted that the first and the second reference table are stored in the memory of the computer 1100.

These processing modes determine the dot formation operation and the carrying operation, and through the processes from the resolution conversation process to the rasterizing process, the printer driver 1110 converts the image data into print data that matches the format of that processing mode. It should be noted that if the processing modes are different, then print processing in which at least one of the dot formation operation and the carrying operation is different is performed. Here, print processing in which the dot formation operations are different refers to print processing in which the change patterns of the nozzles that are used in the dot formation operations are different. Also, print processing in which the carrying operations are different refers to print processing in which the change patterns of the carry amounts used in the carrying operations are different. These are described later using specific examples.

Six processing modes, namely a first upper edge processing mode, a first intermediate processing mode, a first lower edge processing mode, a second upper edge processing mode, a second intermediate processing mode, and a second lower edge processing mode, are provided.

The first upper edge processing mode is a processing mode for executing the upper edge processing mentioned above at a print resolution of 720×720 dpi. In other words, it is a processing mode in which in the first half of the passes, printing is performed in principle in the interlaced mode using only nozzles #1 to #3. In this case, the carry amount F of the paper is 3·D because three nozzles are used (see FIG. 21A).

The first intermediate processing mode is a processing mode for executing the intermediate processing mentioned above at a print resolution of 720×720 dpi. In other words, it is a processing mode in which printing in the interlaced mode using all of the nozzles #1 to #7 of the nozzle row is performed in all passes. It should be noted that the carry amount F of the paper is 7·D because seven nozzles are used (see FIG. 21A and FIG. 21B).

The first lower edge processing mode is a processing mode for executing the lower edge processing mentioned above at a print resolution of 720×720 dpi. In other words, it is a processing mode in which in the latter half of the passes, printing is performed in principle in the interlaced mode using only nozzles #5 to #7. In this case, the carry amount of the paper is 3·D because three nozzles are used (see FIG. 21B).

The second upper edge processing mode is a processing mode for executing the upper edge processing mentioned above at a print resolution of 360×360 dpi. In other words, it is a processing mode in which in the first half of the passes, printing is performed in principle in the interlaced mode using only nozzles #1 to #3. However, due to the print resolution being only half as fine as that of the first upper edge processing mode, the carry amount F of the paper is 6·D, which is twice that of the first upper edge processing mode (see FIG. 23A).

The second intermediate processing mode is a processing mode for executing the intermediate processing mentioned above at a print resolution of 360×360 dpi. In other words, it is a processing mode in which printing in the interlaced mode using all of the nozzles #1 to #7 of the nozzle row is performed in all passes. However, due to the print resolution being only half as fine as that of the first intermediate processing mode, the carry amount F of the paper is 14·D dots, which is twice that of the first intermediate processing mode (see FIG. 23A and FIG. 23B).

The second lower edge processing mode is a processing mode for executing the upper edge processing mentioned above at a print resolution of 360×360 dpi. In other words, it is a processing mode in which in the latter half of the passes, printing is performed in principle in the interlaced mode using only the nozzles #5 to #7. However, due to the print resolution being only half as fine as that of the first lower edge processing mode, the carry amount F of the paper is 6·D, twice that of the first lower edge processing mode (see FIG. 23B).

Here, the manner in which the image is formed on the paper S through these processing modes is described with reference to FIG. 21A to FIG. 24B. It should be noted that in all of these figures, the two diagrams A and B represent the manner in which a single image is formed. In other words, FIG. A shows what nozzle in what pass of what processing mode the raster lines at the upper edge of the image are formed, and FIG. B shows what nozzle in what pass of what processing mode the raster lines at the lower edge of the image are formed.

The left side of FIG. 21A through FIG. 24B (hereinafter referred to as the "left diagrams") shows the relative position of the nozzle row with respect to the paper in each pass of the processing modes. It should be noted that in the left diagrams, for illustrative reasons, the nozzle row is shown moving downward in increments of the carry amount F for each pass, but in actuality the paper S is moved in the carrying direction. Also, the nozzle row has nozzles #1 to #7, whose nozzle number is shown surrounded by a circle, and their nozzle pitch k·D is 4·D. Further, the dot pitch D is 720 dpi (1/720 inch). It should be noted that in this nozzle row the nozzles shown shaded in black are the nozzles that eject ink.

The diagrams to the right of the left diagrams (hereinafter referred to as the "right diagrams") show how the dots are formed by ejecting ink toward the pixels making up the raster lines. As mentioned earlier, the pixels are square boxes virtually arranged on the paper in a grid for defining the positions where ink is caused to land to form dots, and the square boxes in the right diagrams respectively represent pixels of 720×720 dpi, that is, pixels of D×D size. The numbers written in each square indicate the numbers of the nozzles that eject ink toward those pixels, and the squares in which no numbers are written indicate pixels in which ink is not ejected. Also, as shown in the right diagrams, the raster line at the uppermost edge that can be formed through this print mode is called the first raster line R1. Thereafter, in the direction toward the lower end, the raster lines are successively referred to as the second raster line R2, the third raster line R3, etc.

Figure 21A:
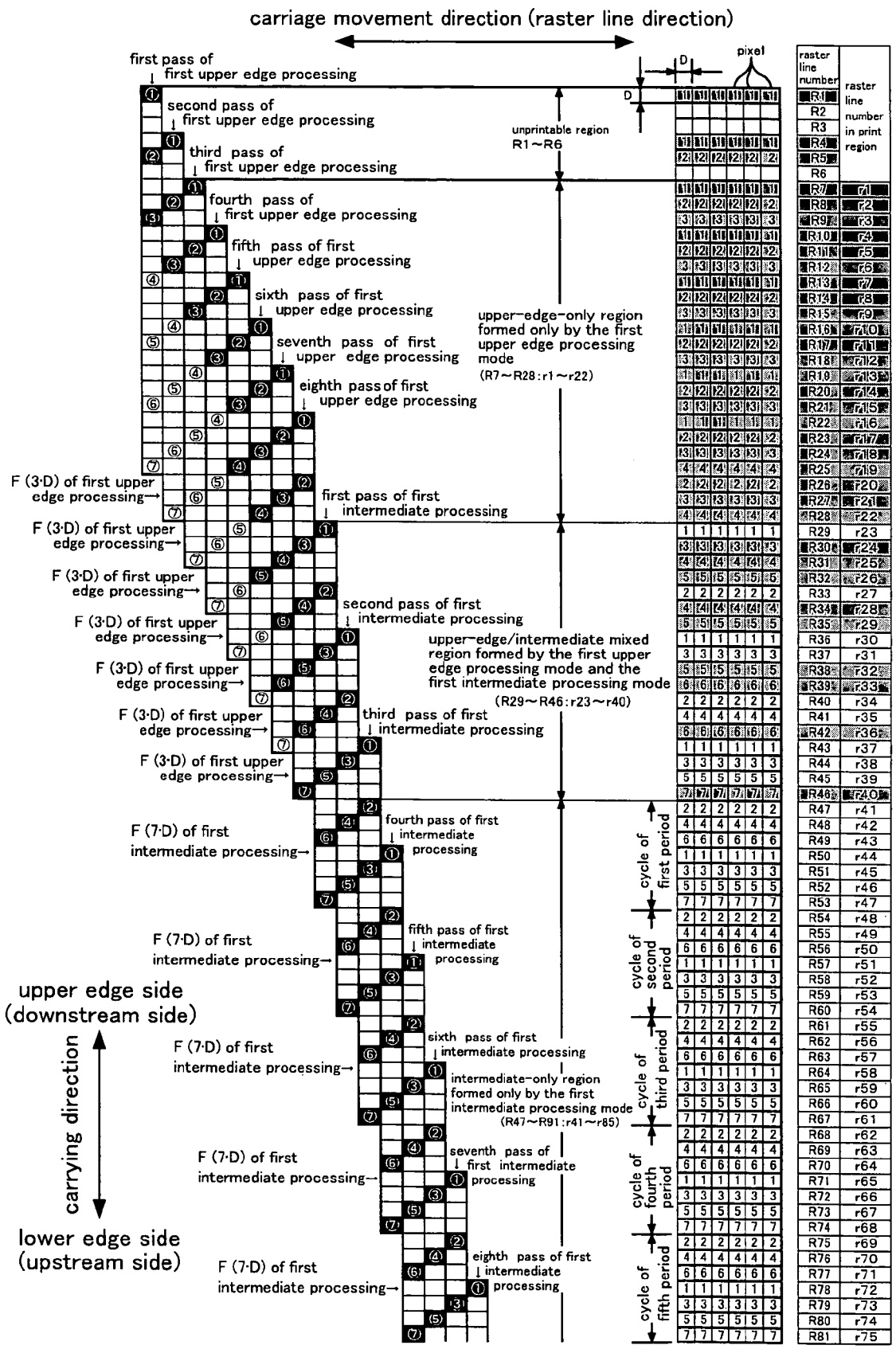
FIG. 21A is a diagram illustrating the various processing modes.
Figure 21B:
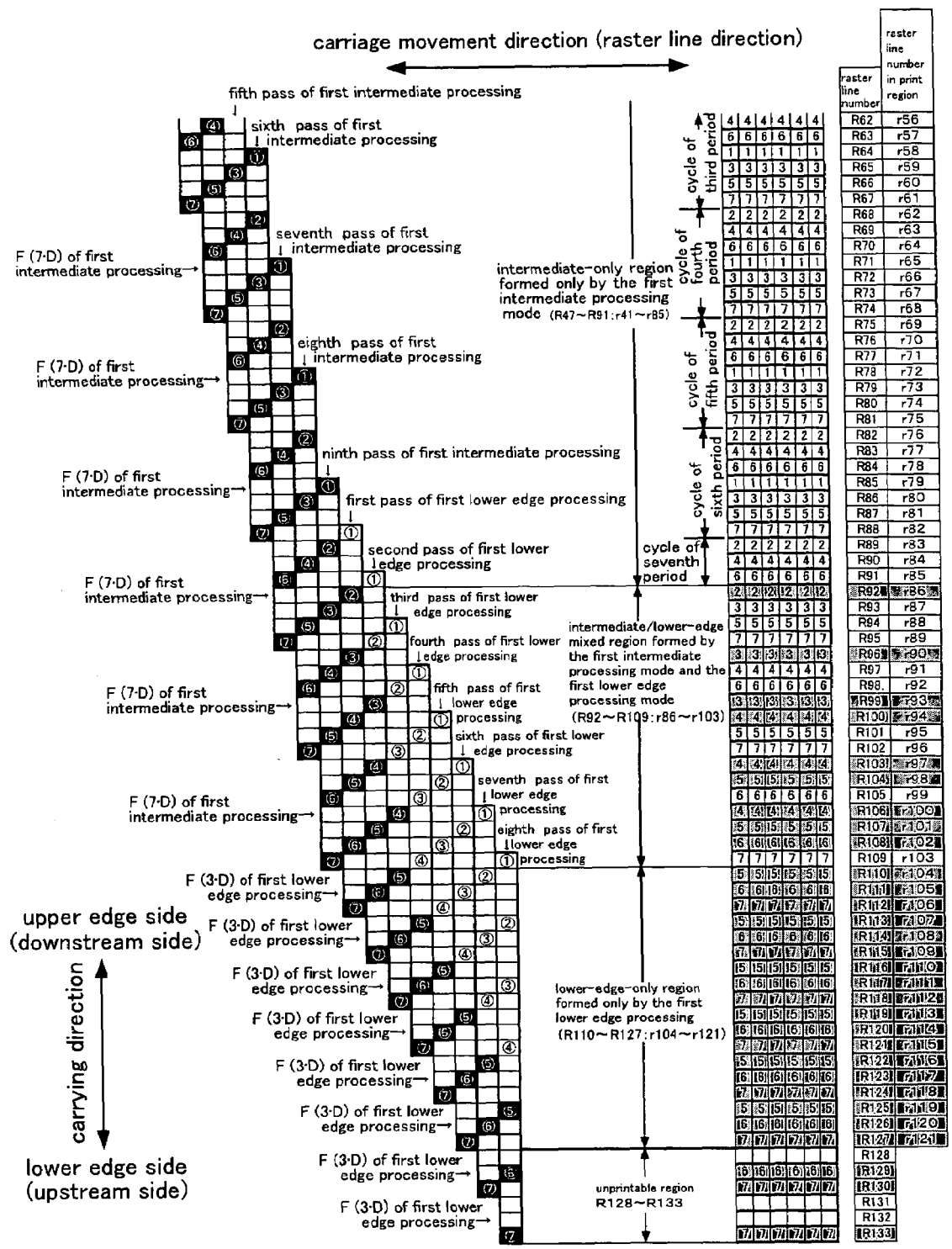
FIG. 21B is a diagram illustrating the various processing modes.

(1) Regarding the Case of Printing an Image Using the First Upper Edge Processing Mode, the First Intermediate Processing Mode, and the First Lower Edge Processing Mode This corresponds to the case that the first print mode shown in FIG. 19 and FIG. 20 has been set, that is, the case that "borderless" has been set as the margin format mode and "fine" has been set as the image quality mode. As shown in FIG. 21A and FIG. 21B, the printer 1 performs eight passes in the first upper edge processing mode, then performs nine passes in the first intermediate processing mode, and then performs eight passes in the first lower edge processing mode. As a result, ink is ejected at a print resolution of 720×720 dpi to the region R7 to R127 from the seventh raster line R7 to the 127$^{th}$ raster line R127 serving as a print region, borderlessly printing on a paper of a later-described "first size", which is 110·D in the carrying direction.

It should be noted that the pass numbers of the first upper edge processing mode and the first lower edge processing mode are fixed values, and do not change from the, for example, eight passes mentioned above, but the number of passes of the first intermediate processing mode is set to change in correspondence with the paper size mode that has been input through the user interface of the printer driver 1110. This is because in order to perform borderless printing it is necessary for the size of the print region to be larger in the carrying direction than the paper corresponding to the paper size mode, and the size of the print region is adjusted by changing the number of passes in the intermediate processing mode. In the example of the diagrams, "first size," which indicates that the size in the carrying direction is 110·D, has been input as the paper size mode. Then, the number of passes of the first intermediate mode is set to nine passes as mentioned above so that the size in the carrying direction of the print region becomes 121·D. This is explained in detail later.

In the first upper edge processing mode, the dot formation operation of a single pass is in principle executed in the interlaced mode between the carrying operations, each of which carries the paper S by 3·D, as shown in the left diagram of FIG. 21A. In the four passes of the first half of this processing mode, printing is performed using nozzles #1 to #3. In the four passes of the latter half, printing is performed while increasing the nozzle number by one every time the pass number advances, in the order of nozzle #4, #5, #6, and #7. It should be noted that the reason why the number of nozzles used is successively increased in the four passes of the latter half is so that the usage state of the nozzles matches that of the first intermediate processing mode that is executed immediately afterward.

Printing through the first upper edge processing mode results in raster lines formed over the region R1 to R46, from the first raster line R1 to the 46$^{th}$ raster line R46, shown in the right diagram (in the right diagram, the raster lines that are formed by the first upper edge processing mode are shown shaded). However, it should be noted that in the region R1 to R46, the complete region in which all raster lines have been formed is only the region R7 to R28 ranging from raster line R7 to raster line R28, whereas the region R1 to R6 from raster line R1 to raster line R6 and the region R29 to R46 from raster line R29 to raster line R46 are incomplete, containing portions in which no raster lines are formed.

The former of these incomplete regions, namely the region R1 to R6, is a so-called unprintable region, which means that no nozzles pass over the portion corresponding to the second, third and sixth raster lines R2, R3 and R6 in any of the passes, and thus no dots can be formed in those pixels. Thus, this region R1 to R6 is not used for recording an image, and is excluded from the print region. On the other hand, the yet unformed sections of the raster lines in the later region R29 to R46 are formed in a complementary manner through the first intermediate processing mode that is executed immediately afterwards, so that this region R29 to R46 is completed at that time. In other words, the region R29 to R46 is a region that is completed through both the first upper edge processing mode and the first intermediate processing mode, and hereinafter this region R29 to R46 is referred to as the "upper-edge/intermediate mixed region." Also, the region R7 to R28 that is formed through only the first upper edge processing mode is referred to as the "upper-edge-only region."

In the first intermediate processing mode, the dot formation operation of a single pass is executed in principle in the interlaced mode between carrying operations, each of which carries the paper S by 7·D, as shown in the left diagrams of FIG. 21A and FIG. 21B. All the nozzles #1 to #7 are used for printing in all of the passes, from the first pass to the ninth pass, and as a result, raster lines are formed over the region R29 to R109 from the 29$^{th}$ raster line R29 to the 109$^{th}$ raster line R 109 shown in the right diagram.

More specifically, with regard to the upper-edge/intermediate mixed region R29 to R46, the raster lines R29, R33, R36, R37, R40, R41, R43, R44, and R45, which were not completed in the first upper edge processing mode, are each formed in a complementary manner, completing the upper-edge/intermediate mixed region R29 to R46. All of the raster lines of the region R47 to R91 are completely formed through only the dot formation operations of the first intermediate processing mode. Hereinafter, the region R47 to R91, which is completed through only the first intermediate processing mode, is referred to as the "intermediate-only region." The region R92 to R109 includes some raster lines with unformed portions, and these are formed in a complementary manner through the first lower edge processing mode that is executed next, completing the region R92 to R109. In other words, the region R92 to R109 is a region that is completed through both the first intermediate processing mode and the first lower edge processing mode, and hereinafter this region R92 to R109 is referred to as the "intermediate/lower-edge mixed region." It should be noted that in the right diagram, the raster lines that are formed through the first lower edge processing mode are shown shaded.

In the first lower edge processing mode, as shown in FIG. 21B, the dot formation operation of a single pass is in principle executed in the interlaced mode between carrying operations, each of which carrying the paper S by 3·D. In the five passes of the latter half of the first lower edge processing mode, printing is executed using nozzles #5 to #7. Also, in the three passes of the first half of the first lower edge processing mode, printing is carried out while decreasing the nozzle number of the nozzles that are used by one in the order of nozzle #1, nozzle #2, and nozzle #3, each time the pass number increases. That is, printing is executed in the first pass using nozzles #2 to #7, in the second pass using nozzles #3 to #7, and in the third pass using nozzles #4 to #7. It should be noted that the reason why the number of nozzles used is successively decreased in the three passes of the first half is so that the usage state of the nozzles matches that of the five passes of the latter half that are executed immediately afterward.

The result of printing in the first lower edge processing mode is that raster lines are formed over the region R92 to R133, from the 92$^{nd}$ raster line R92 to the 133$^{rd}$ raster line R133 shown in the right diagram.

More specifically, with regard to the intermediate/lower-edge mixed region R92 to R109, the raster lines R92, R96, R99, R100, R103, R104, R106, R107, and R108, which were not completed in the first intermediate processing mode, are each formed in a complementary manner, completing the intermediate/lower-edge mixed region R92 to R109. All the raster lines of the region R110 to R127 are formed through only the dot formation operations of the first lower edge processing mode, completing this region. Hereinafter, the region R110 to R127 that is formed through only the lower edge processing mode is referred to as the "lower-edge-only region." Further, the region R128 to R133 is a so-called unprintable region, that is, no nozzles pass over the portion corresponding to the 128$^{th}$, 131$^{st}$, and 132$^{nd}$ raster lines R128, R131, and R132 in any pass number, and thus it is not possible to form dots in those pixels. Thus, the region R128 to R133 is not used for recording an image, and is excluded from the print region.

Incidentally, in the case of printing using the first upper edge processing mode, the first intermediate processing mode, and the first lower edge processing mode, the print start position (the target position at the upper edge of the paper S when printing is started) should be set to the fourth raster line from the uppermost edge of the print region toward the lower edge (in FIG. 21A, this is the tenth raster line R10). By doing this, even if due to carry error the paper is carried more than the stipulated carry amount, as long as that error is within 3·D, the upper edge of the paper S will be positioned more to the side of the lower edge than the uppermost edge of the print region. Consequently, borderless printing can be reliably achieved without a margin being formed at the upper edge of the paper S. Conversely, if due to carry error the paper S is carried less than the stipulated carry amount, then as long as that amount is within 14·D, the upper edge of the paper S will be positioned more to the side of the upper edge than the 24$^{th}$ raster line R24, and thus the upper edge of the paper S will be printed by only the nozzles #1 to #3 above the groove portion, reliably preventing the platen 24 from becoming dirty.

On the other hand, the print end position (the target position at the lower edge of the paper S when printing is finished) should be set to the ninth raster line from the lowermost edge of the print region toward the upper edge (in FIG. 21B, this is the 119$^{th}$ raster line R119), for example. By doing this, even if due to carry error the paper is carried less than the stipulated carry amount, as long as that error is within 8·D, the lower edge of the paper will still be positioned more to the side of the upper edge than the raster line R127 at the lowermost edge of the print region. Consequently, borderless printing can be reliably achieved without a margin being formed at the lower edge of the paper S. Conversely, if due to carry error the paper S is carried more than the stipulated carry amount, then as long as that amount is within 12·D, the lower edge of the paper S will be positioned more to the side of the lower edge than the 106$^{th}$ raster line R106, and thus the lower edge of the paper will be printed by only the nozzles #5 to #7 above the groove portion, preventing the platen 24 from becoming dirty.

It should be noted that the print start position and the print end position are related to the number of passes that is set in the first intermediate processing mode mentioned above. In other words, to satisfy the conditions of the print start position and the print end position mentioned above with respect to a paper that corresponds to the paper size mode, first the size of the print region in the carrying direction must be set to a size that extends beyond the upper edge and the lower edge of the paper by 3·D and 8·D, respectively. That is, it needs to be set 11·D larger in the carrying direction than the paper. Consequently, the number of passes in the first intermediate processing mode is set such that the size is 11·D larger than the size in the carrying direction, which is indicated by the paper size mode that has been input. Incidentally, the size in the carrying direction of the "first size" mentioned above is 110·D. Therefore, to set the print region larger than this by 11·D to 121·D, the number of passes of the first intermediate processing mode is set to nine passes.

Figure 22A:
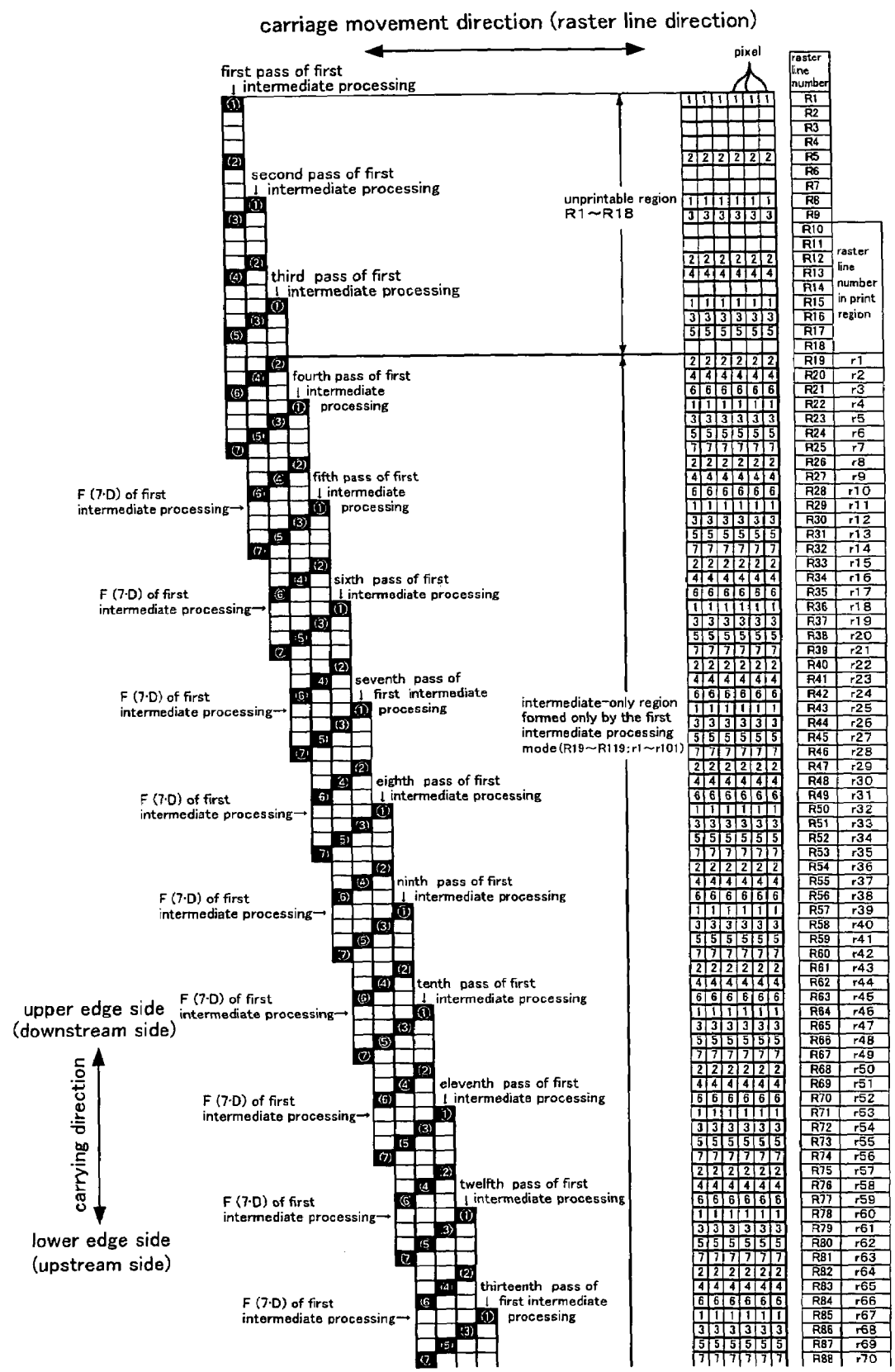
FIG. 22A is a diagram illustrating the various processing modes.
Figure 22B:
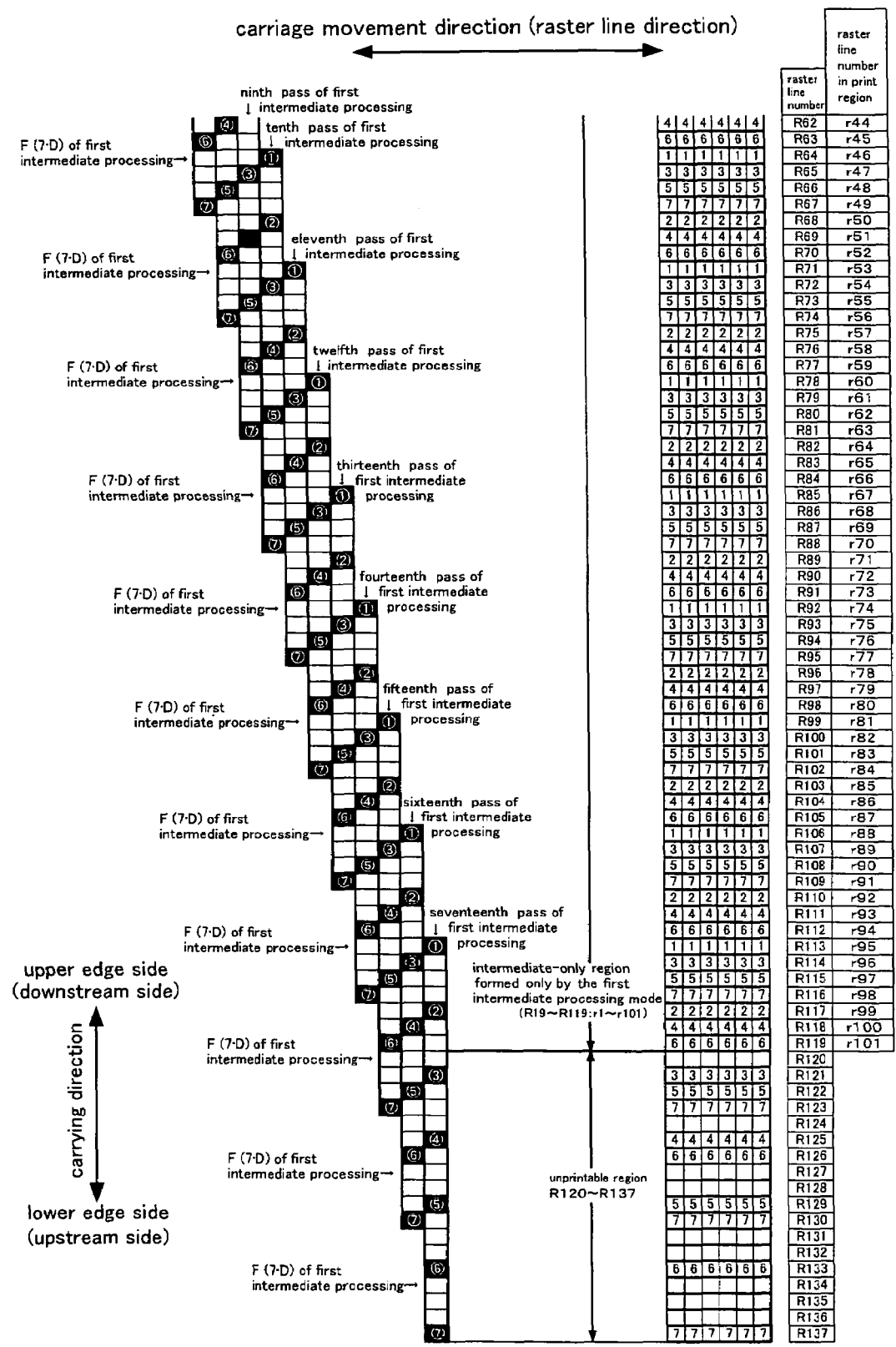
FIG. 22B is a diagram illustrating the various processing modes.

(2) Regarding the Case that an Image is Printed Using Only the First Intermediate Processing Mode This corresponds to the case that the second print mode shown in FIG. 19 and FIG. 20 has been set, that is, a case in which "bordered" has been set as the margin format mode and "fine" has been set as the image quality mode. As shown in FIG. 22A and FIG. 22B, the printer 1 performs nine passes in the first intermediate processing mode. As a result, ink is ejected at a print resolution of 720×720 dpi onto the region R19 to R119, which serves as the print region, printing a paper of the "first size," which is 110·D in the carrying direction, while leaving a border.

It should be noted that as in case (1) mentioned above, the number of passes of the first intermediate processing mode changes depending on the paper size mode that has been input. In other words, the number of passes is set such that the size of the print region is a size with which a margin of a predetermined width is formed at the upper and lower edges of a paper of the print size mode that has been input. In the example shown in the diagrams, "first size" has been input as the paper size mode, so that the size of the paper in the carrying direction is 110·D. Thus, in order to print the paper while leaving a border, the number of passes of the first intermediate processing mode is set to 17 passes, as mentioned above, so that the size in the carrying direction of the print region is 101·D.

As mentioned above, bordered printing is printing forming a margin at the upper edge and the lower edge of the paper. Thus, it is not necessary to print the upper edge and the lower edge using only the nozzles opposing the grooves 24a and 24b, so that printing is executed according to only the first intermediate processing mode, in which all of the nozzles #1 to #7 are used over the entire length in the carrying direction of the paper.

In the first intermediate processing mode, the dot formation operation of a single pass is performed in the interlaced mode between carrying operations, with each of which the paper is carried by 7·D. In the example shown in the diagrams, all of the nozzles #1 to #7 are used in all of the passes, from the first pass to the seventeenth pass, resulting in raster lines being formed over the region from the first raster line R1 to the 137$^{th}$ raster line R137.

However, the region R1 to R18 at the upper edge includes portions in which raster lines are not formed in any of the passes, such as R18, and thus the region R1 to R18 is regarded as an unprintable region and is excluded from the print region. Similarly, also the region R120 to R137 at the lower edge includes portions in which raster lines are not formed in any of the passes, such as R120, and thus this region R120 to R137 also is regarded as an unprintable region and is excluded from the print region. It should be noted that in the remaining region R19 to R119 all of the raster lines are formed through only the first intermediate processing mode, and thus this corresponds to an intermediate-only region as described above.

Figure 23A:
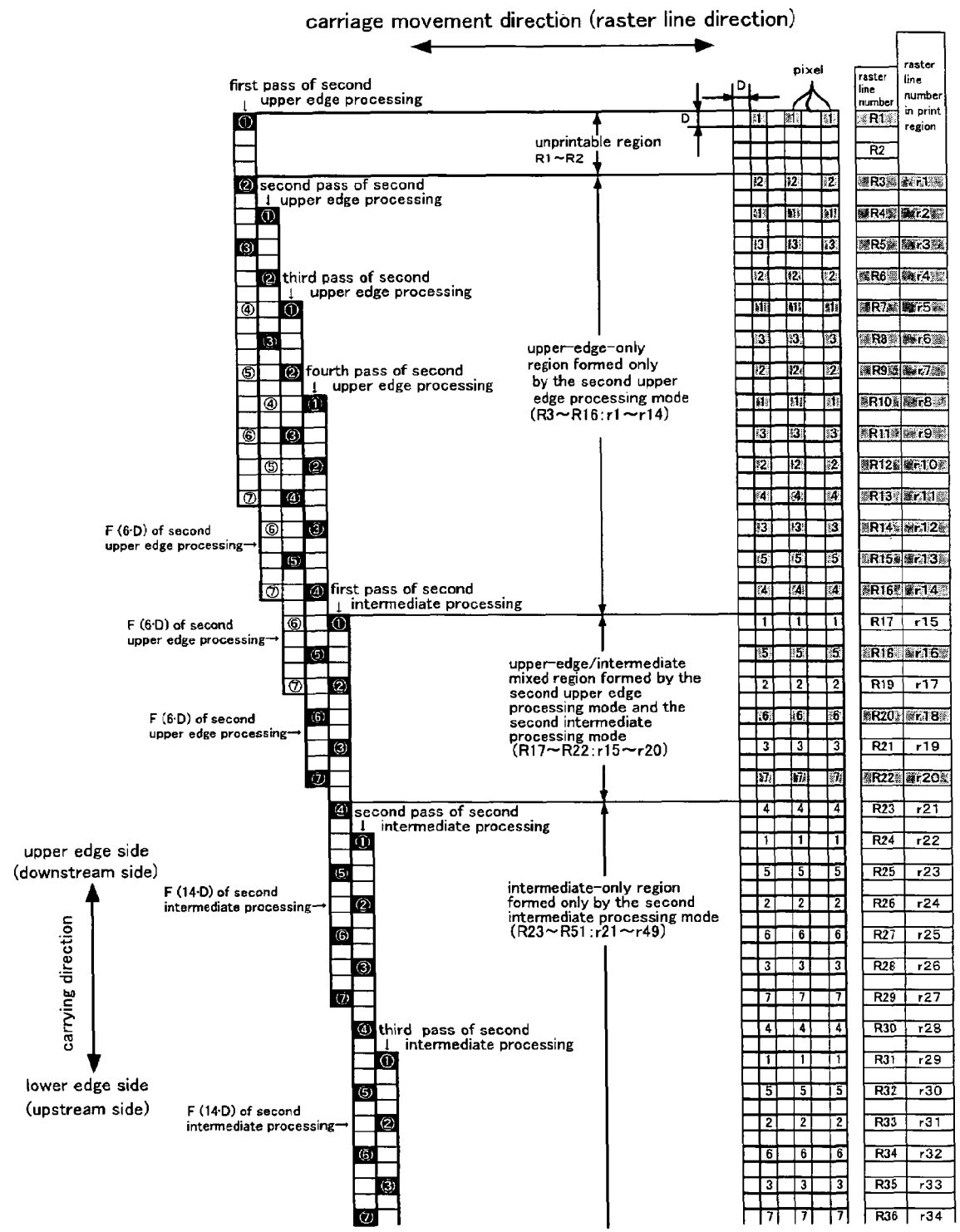
FIG. 23A is a diagram illustrating the various processing modes.
Figure 23B:
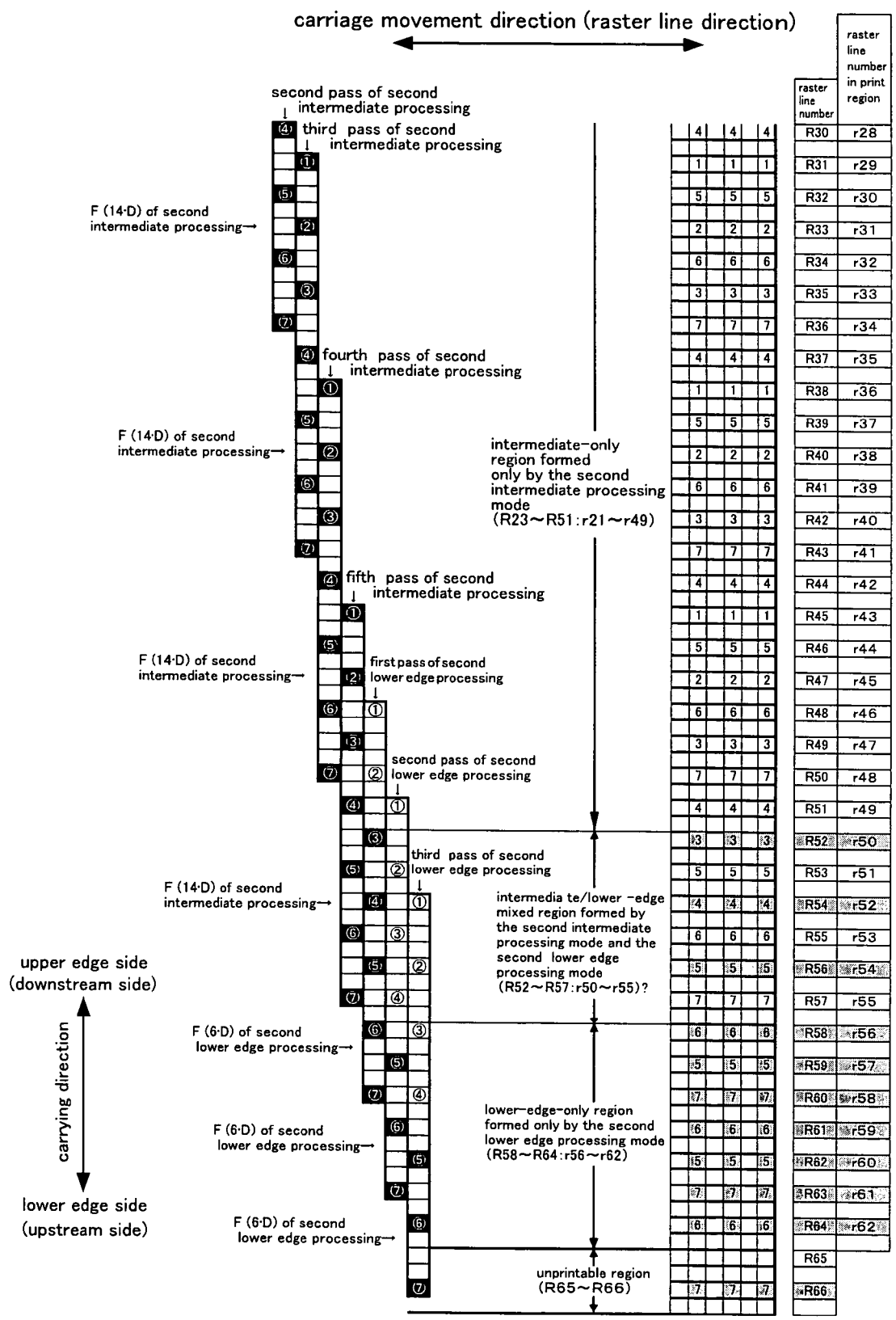
FIG. 23B is a diagram illustrating the various processing modes.

(3) Regarding the Case that an Image is Printed Using the Second Upper Edge Processing Mode, the Second Intermediate Processing Mode, and the Second Lower Edge Processing Mode This corresponds to the case that the third print mode shown in FIG. 19 and FIG. 20 has been set, that is, the case that "borderless" has been set as the margin format mode and "normal" has been set as the image quality mode. As shown in FIG. 23A and FIG. 23B, the printer 1 performs four passes in the second upper edge processing mode, five passes in the second intermediate processing mode, and three passes in the second lower edge processing mode. As a result, ink is ejected at a print resolution of 360×360 dpi to the region R3 to R64, which serves as the print region, thereby borderlessly printing a paper of the "first size."

It should be noted that because the print resolution is 360× 360 dpi, only every other of the squares shown in the right diagrams is covered by a dot. That is to say, the raster lines in the print region are formed by only every other one of the squares.

As in case (1) above, the number of passes in the second upper edge processing mode and the second lower edge processing mode is fixed and does not change, but the number of passes in the second intermediate processing mode changes depending on the paper size mode. In other words, in order to reliably print borderlessly on a paper of any paper size mode, the number of passes of the second intermediate processing mode is set such that the size of the print region is 14·D larger than the size of the paper. It should be noted that the value 14·D is determined so that the print start position becomes the fourth raster line from the uppermost edge of the print region toward the lower edge (i.e., the sixth raster line R6 in FIG. 23A), and that the print end position becomes the fourth raster line from the lowermost edge of the print region toward the upper edge (the 61st raster line R61 in FIG. 23B). In the example shown in the drawings, "first size" has been input and thus the size of the paper in the carrying direction is 110·D. Therefore the number of passes of the first intermediate processing mode is set to five passes such that the size in the carrying direction of the print region becomes 124·D (=110·D+14·D).

In the second upper edge processing mode, the dot formation operation of one pass is in principle executed in the interlaced mode between the carrying operations, each of which carries the paper by 6·D, as shown in the left diagram in FIG. 23A.

In the first two passes of the second upper edge processing mode, printing is performed using nozzles #1 to #3. In the latter two passes, printing is performed while increasing the nozzle number of the nozzles that are used by two each time the pass number increases, in the order of nozzle #4, nozzle #5, nozzle #6, and nozzle #7. It should be noted that the reason for successively increasing the number of nozzles that are used is the same as in the case (1) discussed above.

The result of printing with the second upper edge processing mode is that raster lines are formed over the region R1 to R22 shown in the right diagram (in the right diagram, the raster lines that are formed are shown shaded). However, the completed region in which all of the raster lines have been formed, which corresponds to the upper-edge-only region mentioned above, is only the region R3 to R16; the region R1 to R2 and the region R17 to R22 are incomplete because they include some unformed raster lines. Of these, the former region R1 to R2 is regarded as an unprintable region because raster lines are not formed in the portion corresponding to the second raster line R2 in any pass number, and is excluded from the print region. On other hand, the latter region R17 to R22 corresponds to the upper-edge/intermediate mixed region, and the unformed portions of raster lines in the region R17 to R22 are completed by being formed in a complementary manner in the second intermediate processing mode that is executed immediately thereafter.

In the second intermediate processing mode, the dot formation operation of a single pass is in principle executed in the interlaced mode between carrying operations, each of which carries the paper by 14·D, as shown in the left diagrams of FIG. 23A and FIG. 23B. All the nozzles #1 to #7 are used for printing in all of the passes, from the first pass to the fifth pass, and as a result, raster lines are formed over the region R17 to R57 shown in the right diagrams. More specifically, with regard to the upper-edge/intermediate mixed region R17 to R22, the raster lines R17, R19, and R21, which were not yet formed in the second upper edge processing mode, are each formed in a complementary manner, thus completing them. The region R23 to R51 corresponds to the intermediate-only region, and the region R23 to R51 is completed by forming all of the raster lines through only the dot formation operations of the second intermediate processing mode. Moreover, the region R52 to R57 corresponds to the intermediate/lower-edge mixed region and includes some portions of raster lines that have not been formed, but which will be formed in a complementary manner through the second lower edge processing mode that is performed immediately thereafter, completing these regions R52 to R57. It should be noted that in the right diagram, the raster lines that are formed through only the second lower edge processing mode are shown shaded.

In the second lower edge processing mode, the dot formation operations of a single pass are in principle executed in the interlaced mode between the carrying operations, each of which carries the paper by 6·D, as shown in FIG. 23B.

In the single pass of the latter half of the second lower edge processing mode, printing is performed using nozzles #5 to #7. Also, in the two first passes of the second lower edge processing mode, printing is performed while the number of the nozzles that are used is reduced by two each time the pass number advances, in the order of nozzle #1, nozzle #2, nozzle #3, and nozzle #4. It should be noted that the reason for successively decreasing the number of nozzles that are used is the same as in the case (1) discussed above.

The result of executing the second lower edge processing mode is that raster lines are formed over the region R48 to R66 shown in the right diagram. More specifically, the intermediate/lower-edge mixed region R52 to R57 is completed by forming each of the raster lines R52, R54, and R56 that were not yet formed in the second intermediate processing mode in a complementary manner. Also, the region R58 to R64 corresponds to the lower-edge-only region, and is completed by all the raster lines formed through only the dot formation operations of the second lower edge processing mode. The remaining region R65 to R66 is regarded as an unprintable region because raster lines are not formed in the portion corresponding to the 65$^{th}$ raster line R65 in any pass number, and thus it is excluded from the print region.

Figure 24A:
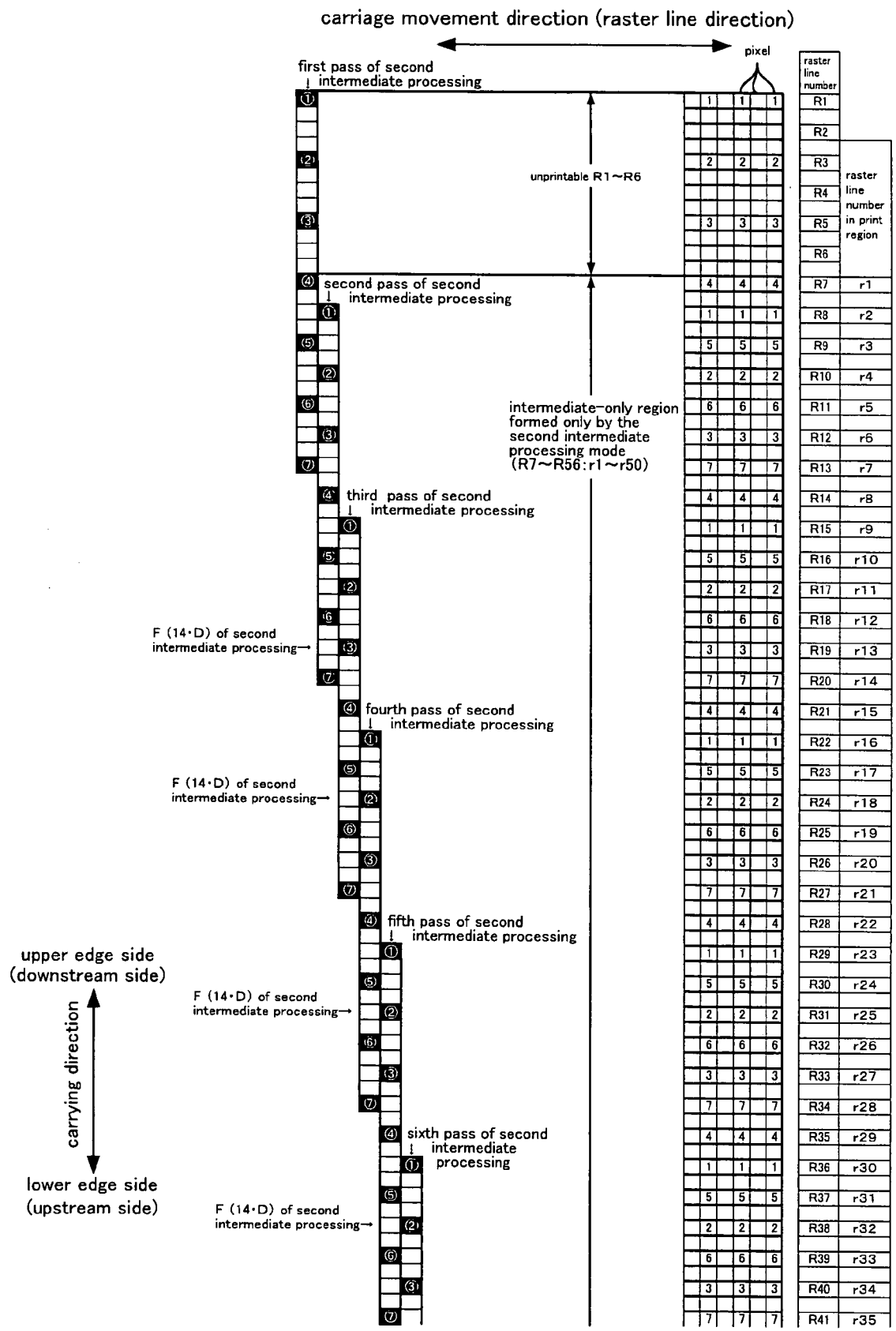
FIG. 24A is a diagram illustrating the various processing modes.
Figure 24B:
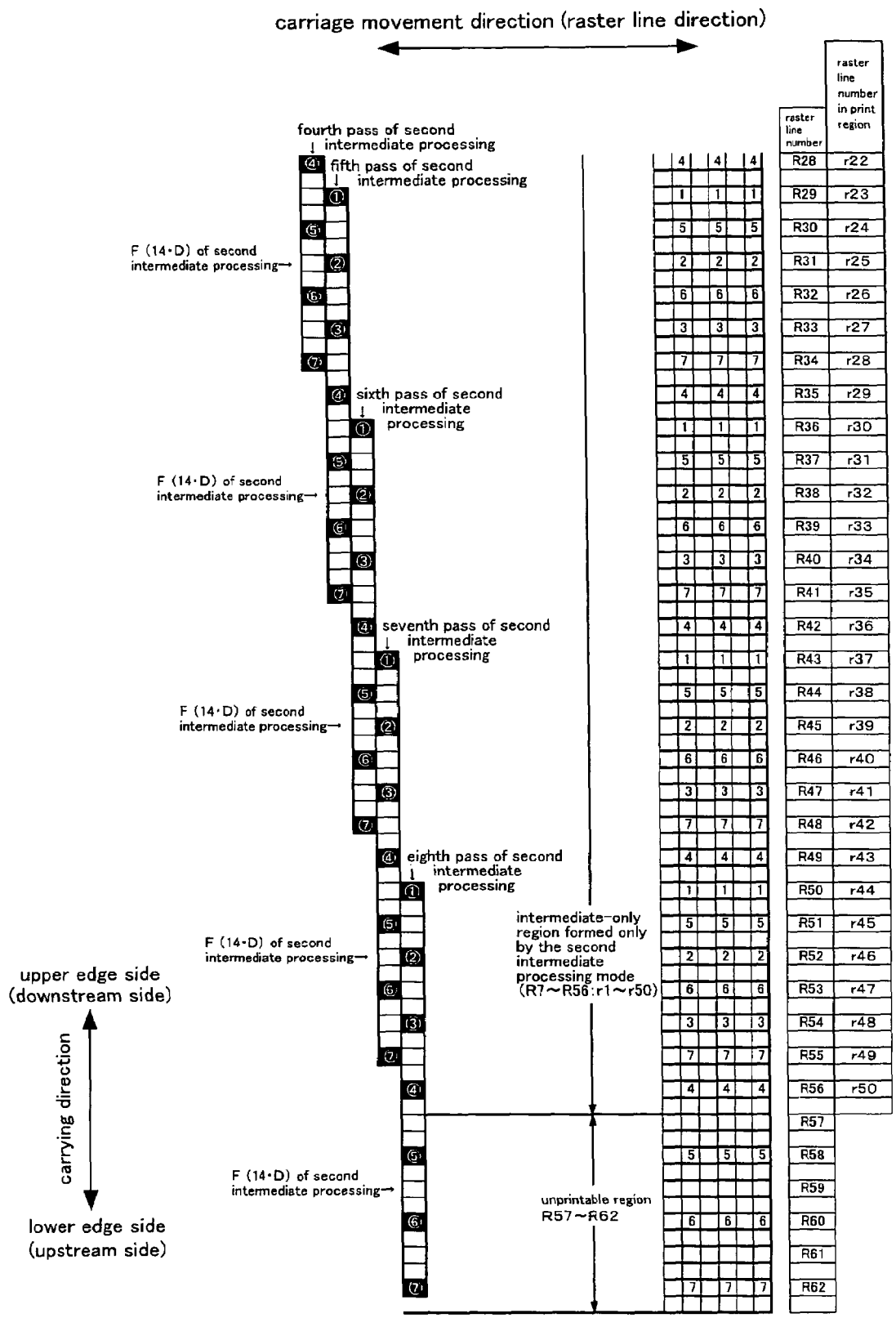
FIG. 24B is a diagram illustrating the various processing modes.

(4) Regarding the Case that an Image is Printed Using Only the Second Intermediate Processing Mode This corresponds to the case that the fourth print mode shown in FIG. 19 and FIG. 20 has been set, that is, the case that "bordered" has been set as the margin format mode and "normal" has been set as the image quality mode. As shown in FIG. 24A and FIG. 24B, the printer 1 performs eight passes in the first intermediate processing mode. As a result, ink is ejected at a print resolution of 360×360 dpi to the region R7 to R56, which serves as the print region, printing with a border on a paper of the "first size."

As in case (2) mentioned above, the number of passes of the second intermediate processing mode changes depending on the paper size mode. In the example shown in the diagrams, "first size" has been input, so that in order to print on a paper whose size is 110·D while leaving a border, the number of passes of the second intermediate processing mode is set to the aforementioned eight passes, so that the size of the print region in the carrying direction becomes 100·D. It should be noted that in this bordered printing, the reason for printing in the second intermediate processing mode is the same as in the case (2) discussed above.

In the second intermediate processing mode, the dot formation operation of a single pass is performed in the interlaced mode between carrying operations, with each of which the paper is carried by 14·D. Then, in the example shown in the diagrams, all of the nozzles #1 to #7 are used in all of the passes, from the first pass to the eighth pass, resulting in raster lines being formed over the region spanning the region R1 to R62.

However, the region from R1 to R6 on the upper edge side includes portions in which raster lines are not formed in any of the passes, such as R6, and thus the region R1 to R6 is regarded as an unprintable region and is excluded from the print region. Similarly, the region R57 to R62 on the lower edge side includes portions in which raster lines are not formed in any of the passes, such as R57, and thus this region R57 to R62 also is regarded as an unprintable region and is excluded from the print region. In the remaining region R7 to R56, all of the raster lines are formed through only the first intermediate processing mode, and thus this corresponds to the intermediate-only region noted above.

Incidentally, the first upper edge processing mode, first intermediate processing mode, first lower edge processing mode, second upper edge processing mode, second intermediate processing mode, and second lower edge processing mode described above are all different processing modes, because they correspond to printing processes in which at least one of the dot formation operation and the carrying operation differs.

That is to say, printing processes with different carrying operations are printing processes in which, as noted above, the change pattern of the carry amount F (carry amount F of each pass) for each carrying operation differs. In the first intermediate processing mode the change pattern is 7·D for all passes, in the second intermediate processing mode the change pattern is 14·D for all passes, in the first upper edge processing mode and the first lower edge processing mode the change pattern is 3·D for all passes, and in the first upper edge processing mode and the first lower edge processing mode the change pattern is 6·D for all passes. Consequently, the first intermediate processing mode and the second intermediate processing mode are different from any of the other modes in terms of their change pattern for the carry amount F, and thus these processing modes are different from the other processing modes.

On the other hand, in both the first upper edge processing mode and the first lower edge processing mode, the change pattern for the carry amount F is 3·D for all of the passes, and thus they are not different from one another with respect to the print processing in the carrying operations. However, with regard the print processing of their dot formation operations, they are different from one another and thus they are different processing modes. That is to say, the change pattern of the nozzles that are used in the dot formation operations (passes) in the first upper edge processing mode is a pattern in which the nozzles #1 to #3 are used in the first through fourth passes, and the nozzles that are used in the fifth through eighth passes are increased one at a time in the order of #4, #5, #6, and #7 each time the pass number increases. In contrast, the change pattern in the first lower edge processing mode is a pattern in which the nozzles are decreased one at a time in the order of #1, #2, #3, and #4 in the first to fourth passes, and the nozzles #5 to #7 are used in the fifth to eighth passes. Consequently, the first upper edge processing mode and the first lower edge processing mode are different from one another in terms of the nozzle change pattern, that is, they are different from one another in terms of their print processing of the dot formation operations. Due to this, these processing modes are different from one another.

Likewise, the second upper edge processing mode and the second lower edge processing mode both have a carry amount change pattern of 6·D for all of the passes, and thus they are not different from one another in terms of the print processing of the carrying operations. However, as regards the print processing of their dot formation operations, they are different from one another and thus they are different processing modes. In other words, the change pattern in the nozzles that are used in the dot formation operations (passes) in the second upper edge processing mode is a pattern in which the nozzles #1 to #3 are used in the first and second passes, and the nozzles that are used are increased by two at a time in the order of #4, #5, #6, and #7 each time the pass number increases in the third and fourth passes. By contrast, the change pattern in the second lower edge processing mode is a pattern in which #3 to #7 are used in the first pass and the nozzles #5 to #7 are used in the third and fourth passes. Consequently, the second upper edge processing mode and the second lower edge processing mode are different from one another in terms of the nozzle change pattern, that is, they are different from one another in terms of their print processing of the dot formation operations. Due to this, these processing modes are different from one another.

The processing modes were described above using specific examples, and because the print region is the only region that contributes to image formation, the raster line numbers are reassigned for only the print region in the following description. That is to say, as shown in the right diagrams of FIG. 21A to FIG. 24C, the uppermost raster line in the print region is called the first raster line r1, and thereafter heading toward the lower end in the drawings, the raster lines are the second raster line r2, the third raster line r3, and so on.

=== Regarding the Reason Why Darkness Non-uniformities Occur in the Image ===

Darkness non-uniformities that occur in a multicolor image that is printed using CMYK inks are generally due to darkness non-uniformities that occur in each of those ink colors. For this reason, the method that is normally adopted is a method for inhibiting darkness non-uniformities in images printed in multiple colors by individually inhibiting darkness non-uniformities in each of the ink colors.

Figure 25:
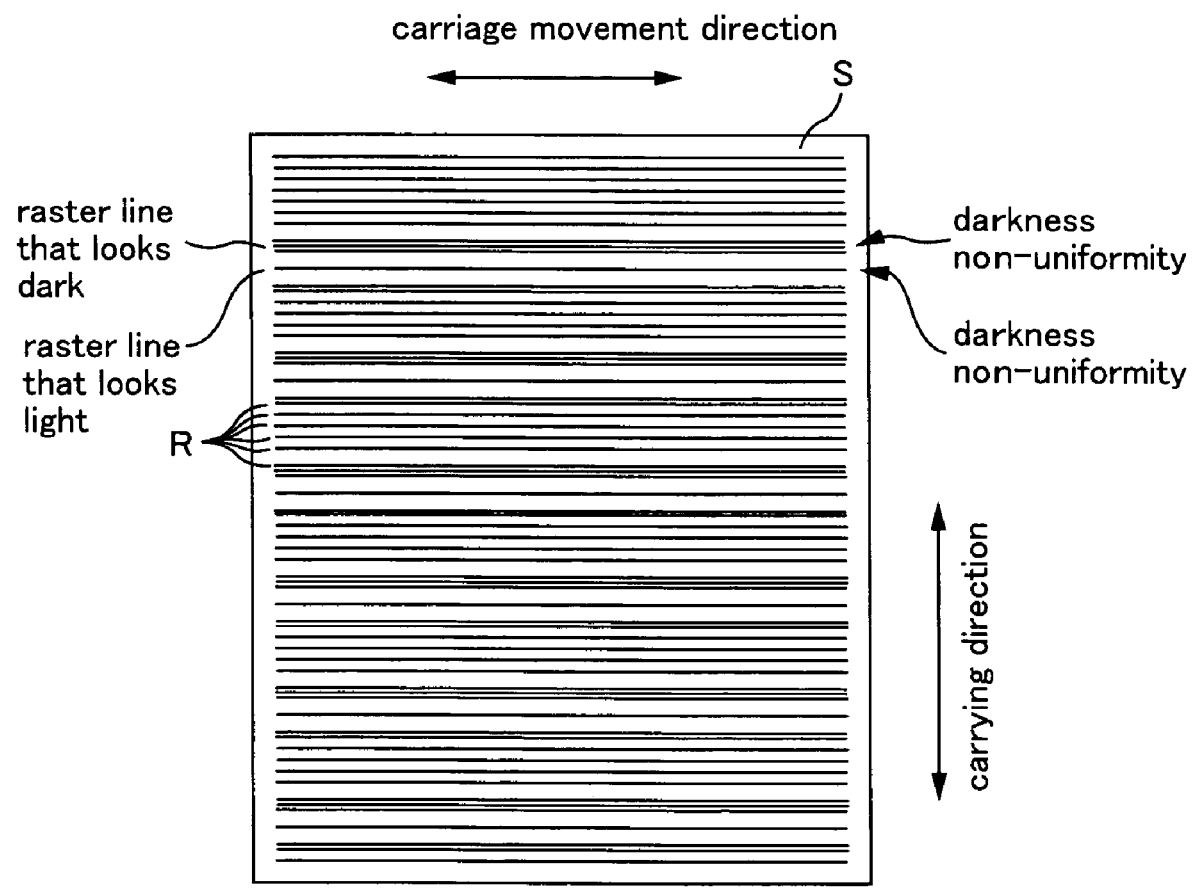
FIG. 25 is a diagram illustrating the darkness non-uniformities that occur in a monochrome printed image.

Accordingly, the following is a description of how darkness non-uniformities occur in images printed in a single color. FIG. 25 illustrates darkness non-uniformities in an image that has been printed in a single color, that is, an image that has been printed in one of the ink colors C, M, Y or K, for example with black ink.

As shown in this figure, what is referred to as darkness non-uniformities here can be seen as stripes that are parallel to the carriage movement direction. A main reason for darkness uniformities is, for example, that the dot formation position shifts in the carrying direction with respect to the target formation position due to poor manufacturing precision of the nozzles and tilts in the ink ejection direction. In such a case, also the formation positions of the raster lines R made of these dots are inevitably shifted in the carrying direction from the target formation positions, and thus the spacing between adjacent raster lines R in the carrying direction is periodically wide or narrow. Observed macroscopically, this will be apparent as striped non-uniformities. In other words, adjacent raster lines R with a wide spacing between them macroscopically appear light, whereas raster lines R with a narrow spacing between them macroscopically appear dark.

It should be noted that this cause of darkness non-uniformities also applies to the other ink colors as well. And as long as any of the colors CMYK has this tendency, darkness non-uniformities will appear in an image printed in multiple colors.

The method of a first reference example of inhibiting these darkness non-uniformities is the method of forming a correction pattern with a gradation value of predetermined darkness, determining a correction value for each nozzle by measuring the darkness of the raster lines formed by each nozzle from this correction pattern, and undertaking a correction for each nozzle in accordance with these correction values when actually printing an image. It should be noted that in the case of multi-color printing, a correction pattern is, of course, printed for each color of ink used for multi-color printing, such as C, M, Y and K, and correction values are determined for each of these ink colors.

This method is described in detail in the following. First, for example the first intermediate processing mode is selected from the above-described six processing modes, and a correction pattern is printed by ejecting ink from the nozzles using this processing mode. This correction pattern is made of a multitude of raster lines that are formed at a predetermined pitch in the carrying direction, and each of these raster lines is made of a plurality of dots that are lined up in the carriage movement direction at the spots where the ink has landed on the paper. It should be noted that to print, ink is ejected by giving command values of the same gradation values for all pixels of the correction pattern.

Next, the darkness of this correction pattern is measured at each raster line, and based on these measurement values, a darkness correction value is determined for each raster line. Then, the nozzles that have formed the respective raster lines are found out, and the correction values are stored in association with the corresponding nozzles.

Finally, actual printing of an image is performed using these correction values, and for this, ink is ejected while correcting the gradation values of the pixel data of the image data by these correction values, thereby inhibiting darkness non-uniformities. More precisely, for nozzles that form raster lines at which the measurement value has become small because the spacing between adjacent raster lines is wide, the ink amount is increased so that those raster lines appear darker, and conversely, for nozzles that form raster lines at which the measurement value has become large because the spacing between adjacent raster lines is narrow, the ink amount is decreased so that those raster lines appear lighter.

However, the spacing between adjacent raster lines in the carrying direction, which was described as a reason for darkness non-uniformities, depends on the combination of nozzles forming those adjacent raster lines. And those combinations depend on the processing mode.

Consequently, the correction values based on a correction pattern that was printed with the first intermediate processing mode is valid when actually printing in this first intermediate processing mode, but when performing actual printing with a different processing mode, the combination of nozzles forming the adjacent raster lines is different, so that those correction values are not appropriate. For example, in the case of borderless printing in the first print mode, the actual printing of an image is not only performed using the first intermediate processing mode, but also the first upper edge processing mode and the first lower edge processing mode, but the correction values of the first intermediate processing mode are not appropriate for the first upper edge processing mode and the first lower edge processing mode.

Explaining this in more detail with reference to the right diagram in FIG. 21A, when actually printing in the first intermediate processing mode, the order of the nozzles forming raster lines is, for example, repeated in cycles of #2, #4, #6, #1, #3, #5, and #7 in the carrying direction (see for example region r41 to r54). On the other hand, in the case of the first upper edge processing mode, the order of the nozzles forming raster lines is, for example, repeated in cycles of #1, #2, #3 in the carrying direction (see for example region r1 to r6).

Comparing for example the raster lines r44 and r4 that are formed by the nozzle #1 in the first intermediate processing mode and in the first upper edge processing mode, it can be seen that in the first intermediate processing mode, the raster line 45 that is immediately upstream from this raster line r44 is formed by the nozzle #3 and the raster line 43 that is immediately downstream is formed by the nozzle #6. Therefore, the macroscopic darkness of the raster line r44 formed by the nozzle #1 is given by the combination of the nozzles #3, #1 and #6. By contrast, in the first upper edge processing mode, the raster line r5 that is immediately upstream from the raster line r4 formed by the nozzle #1 is formed by the nozzle #2, and the raster line r3 that is immediately downstream is formed by the nozzle #3, so that the macroscopic darkness of the raster line r4 formed by the nozzle #1 is given by the combination of the nozzles #2, #1 and #3. Hence, the combination of the nozzles #2, #1 and #3 in the first upper edge processing mode is different from the combination of the nozzles #3, #1 and #6 in the first intermediate processing mode, so that the macroscopic darkness of the raster line r4 formed by the nozzle #1 in the first upper edge processing mode is different from the macroscopic darkness of the raster line r44 that is formed by the nozzle #1 in the first intermediate processing mode. Consequently, the correction values of the first intermediate processing mode is not appropriate for the first upper edge processing mode.

To address this problem, the second reference example described in the following prints a correction pattern for each processing mode and determines correction values of the darkness of the raster lines for each processing mode. Then, when actually printing an image in a given processing mode, the darkness correction of the raster lines is performed using the correction values that have been determined based on the correction pattern printed in that processing mode, so that darkness non-uniformities are reliably inhibited.

=== Second Reference Example of Method for Printing an Image in which Darkness Non-uniformities are Inhibited ===

Figure 26:
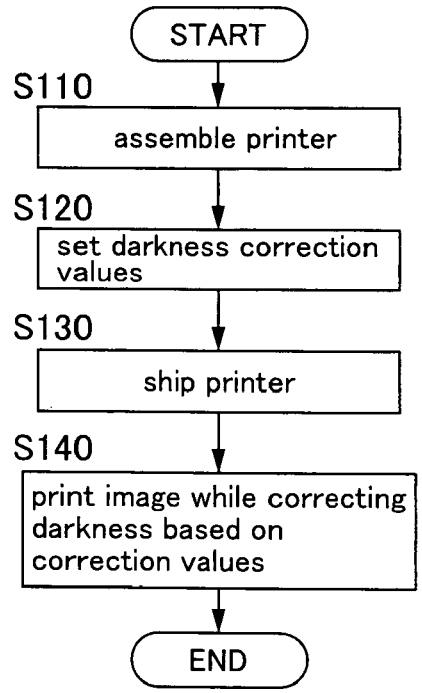
FIG. 26 is a flowchart showing the overall procedure of the method for printing an image in which the darkness non-uniformities have been inhibited, according to the second reference example.

FIG. 26 is a flowchart showing the overall procedure of the method for printing an image according to this second reference example. First, the printer 1 is assembled on a manufacturing line (S110), and then darkness correction values for inhibiting darkness non-uniformities are set by an operator of an inspection line (S120), and then the printer 1 is shipped (S130). Then, a user who has purchased the printer 1 performs actual printing of an image, and at the time of this actual printing, the printer 1 prints an image on paper while performing darkness correction for each raster line based on the correction values (S140).

The following is an explanation of Step S120 and Step S140.

Figure 27:
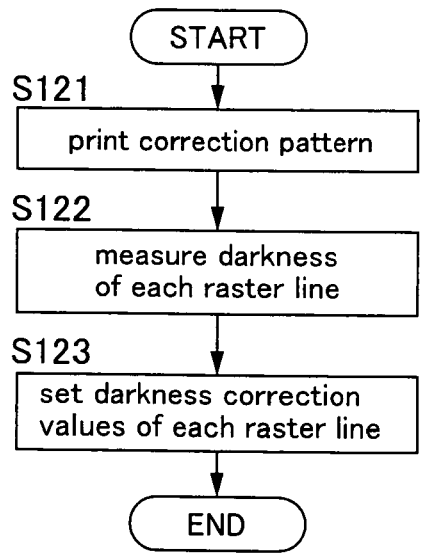
FIG. 27 is a flowchart of Step S120 in FIG. 26.

<Step S120: Setting the Darkness Correction Values for Inhibiting>Darkness Non-Uniformities FIG. 27 is a flowchart showing the procedure of Step S120 in FIG. 26. First, the procedure for setting the darkness correction values is outlined below with reference this flowchart.

Step S121: First, an operator of the inspection line connects the printer 1 to a computer 1100A on the inspection line and prints a correction pattern for determining correction values using the printer 1. It should be noted that the printer 1 printing this correction pattern is the printer 1 in which darkness non-uniformities are to be inhibited, that is, the setting of the correction values is performed for each printer individually. The correction pattern is subdivided for each ink color and for each processing mode (see FIG. 28).

Step S122: Next, the darkness of all printed correction patterns is measured for each raster line, and these measurement values are recorded in recording tables in association with the raster line numbers. It should be noted that these recording tables are arranged for each ink color and for each processing mode in a memory of the computer 1100 of the inspection line (see FIG. 32).

Step S123: Next, the computer 1100 calculates a darkness correction value for each raster line, based on the darkness measurement values recorded in the recording tables, and records these correction values in correction value tables in association with the raster line numbers. It should be noted that these correction value tables are provided for each ink color and for each processing mode in the memory 63 of the printer 1 (see FIG. 34).

In the following, the Steps S121 to S123 are described in more detail.

(1) Step S121: Printing the Correction Pattern

First, the operator of the inspection line communicably connects the printer 1 whose correction values are to be set to the computer 1100 of the inspection line, establishing a printing system as illustrated in FIG. 1. Then, the printer 1 is instructed to print a correction pattern on paper based on the print data of the correction patterns stored in the memory of the computer 1100, and the printer 1 prints this correction pattern on the paper S based on the print data sent to it. The print data of this correction pattern has been created by performing halftone processing and rasterization with respect to CMYK pixel data made by directly specifying the gradation values of the various ink colors CMYK. The gradation values of the pixel data of the CMYK image data are set to the same value for all of the pixels of each correction pattern formed for each ink color, so that the correction patterns are each printed at a substantially uniform darkness across the entire region. The gradation value can be set to an appropriate value, but from the standpoint of actively inhibiting darkness non-uniformities in regions in which darkness non-uniformities occur easily, it is preferable to select a gradation value that results in so-called intermediate gradation regions for CMYK colors. More specifically, a gradation value from the range of 77 to 128 within a total range of 256 gradations should be selected for each of the colors C, M, Y and K.

The print command given by the operator is performed through the user interface of the printer driver 1110. For this, the print mode and the paper size mode are set through the user interface, and the printer driver 1110 prints the correction pattern based on print data corresponding to these settings. That is to say, the print data of the correction pattern is prepared for each print mode and for each paper size. Note, however, that the print data of the "first print mode" and the "third print mode" is required, whereas the print data of the "second print mode" and the "fourth print mode" is not necessarily required. This is because the correction patterns of the "second print mode" and the "fourth print mode" are included within the correction patterns of the "first print mode" and the "third print mode", and can be used appropriately as described below.

Figure 28:
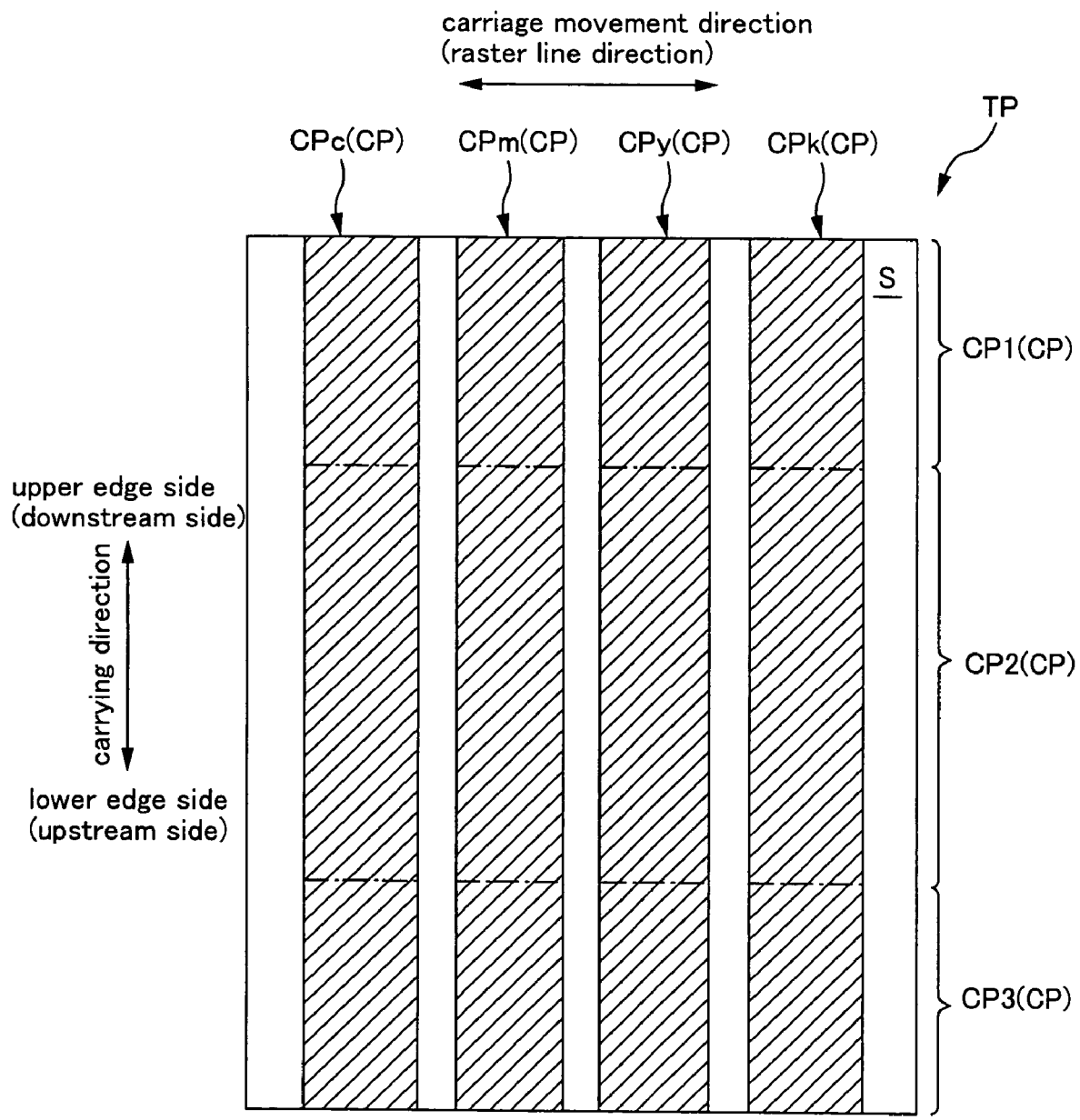
FIG. 28 shows an example of correction patterns according to the second reference example printed on paper.

FIG. 28 shows a correction pattern printed on paper. This correction pattern CP is printed for each of the ink colors C, M, Y and K. In the example shown in the figure, correction patterns CPc, CPm, CPy and CPk of the various ink colors are lined up in the carriage movement direction on one sheet of paper S in the order cyan (C), magenta (M), yellow (Y), and black (K).

It should be noted that basically the only difference between these correction patterns is the ink color, so that in the following, the correction pattern CPk for black (K) is described as a representative one of these correction patterns CP.

Also, as mentioned above, darkness non-uniformities in multicolor prints are inhibited for each ink color that is used in that multicolor print, and the method that is used for inhibiting the darkness non-uniformities is the same. For this reason, black (K) shall serve as a representative example in the following explanation. In other words, some of the following description is given only for the color black (K), but the same also applies for the other ink colors C, M, and Y as well.

The black (K) correction pattern CPk is printed in a band shape that is oblong in the carrying direction. The print region in the carrying direction extends over the entire region of the paper S.

The correction pattern CPk is printed for each processing mode, and in the example shown in the drawing, one of the correction patterns CP1, CP2, and CP3 for the different processing modes, is printed in each of the three or so regions into which the carrying direction is partitioned.

Here, it is preferable that the relationship dictating of which processing mode the correction pattern CP1, CP2, and CP3 is printed in which of these partitioned regions matches that relationship during actual printing. In this case, the same carrying operation and the same dot formation operation as during the actual printing can be accurately realized also during the printing of the correction patterns CP1, CP2 and CP3, so that the correction precision of the correction values obtained from these correction patterns CP1, CP2 and CP3 is improved, and darkness non-uniformities can be inhibited reliably.

For example, taking the first upper edge processing mode, the first intermediate processing mode and the first lower edge processing mode as an example, it is preferable to print a correction pattern (in the following referred to as first upper edge correction pattern CP1) in the first upper edge processing mode onto the region at the top of the paper S, a correction pattern (in the following referred to as first intermediate correction pattern CP2) in the first intermediate processing mode onto the region in the middle of the paper S, and a correction pattern (in the following referred to as first lower edge correction pattern CP3) in the first lower edge processing mode onto the region at the bottom of the paper S. This is because during actual printing, if the first print mode is selected, the upper edge of the paper S is printed in the first upper edge processing mode, the middle of the paper is printed in the first intermediate processing mode, and the bottom of the paper is printed in the first lower edge processing mode.

Here, the formation process of the print patterns CP1, CP2 and CP3 is explained in detail for the example of the first upper edge, the first intermediate and the first lower edge correction patterns CP1, CP2 and CP3. Note that the following explanations also apply to the second upper edge processing mode, the second intermediate processing mode and the second lower edge processing mode, and since it is clear that the darkness corrections can be carried out in the same manner by executing basically the same basic flow, further explanations have been omitted.

Figure 29A:
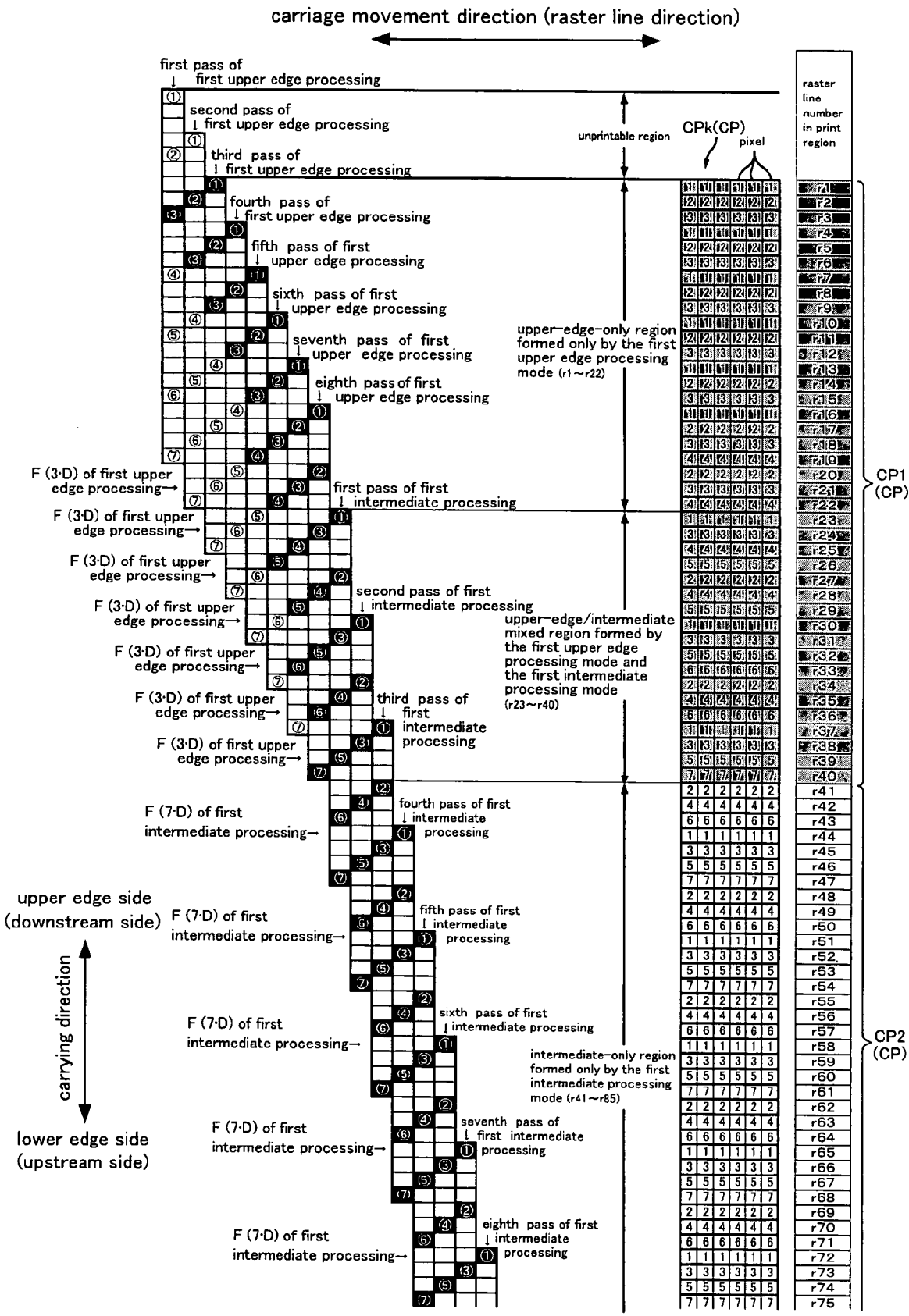
FIG. 29A is a diagram showing by which of the nozzles the raster lines constituting the correction pattern according to the second reference example are formed.
Figure 29B:
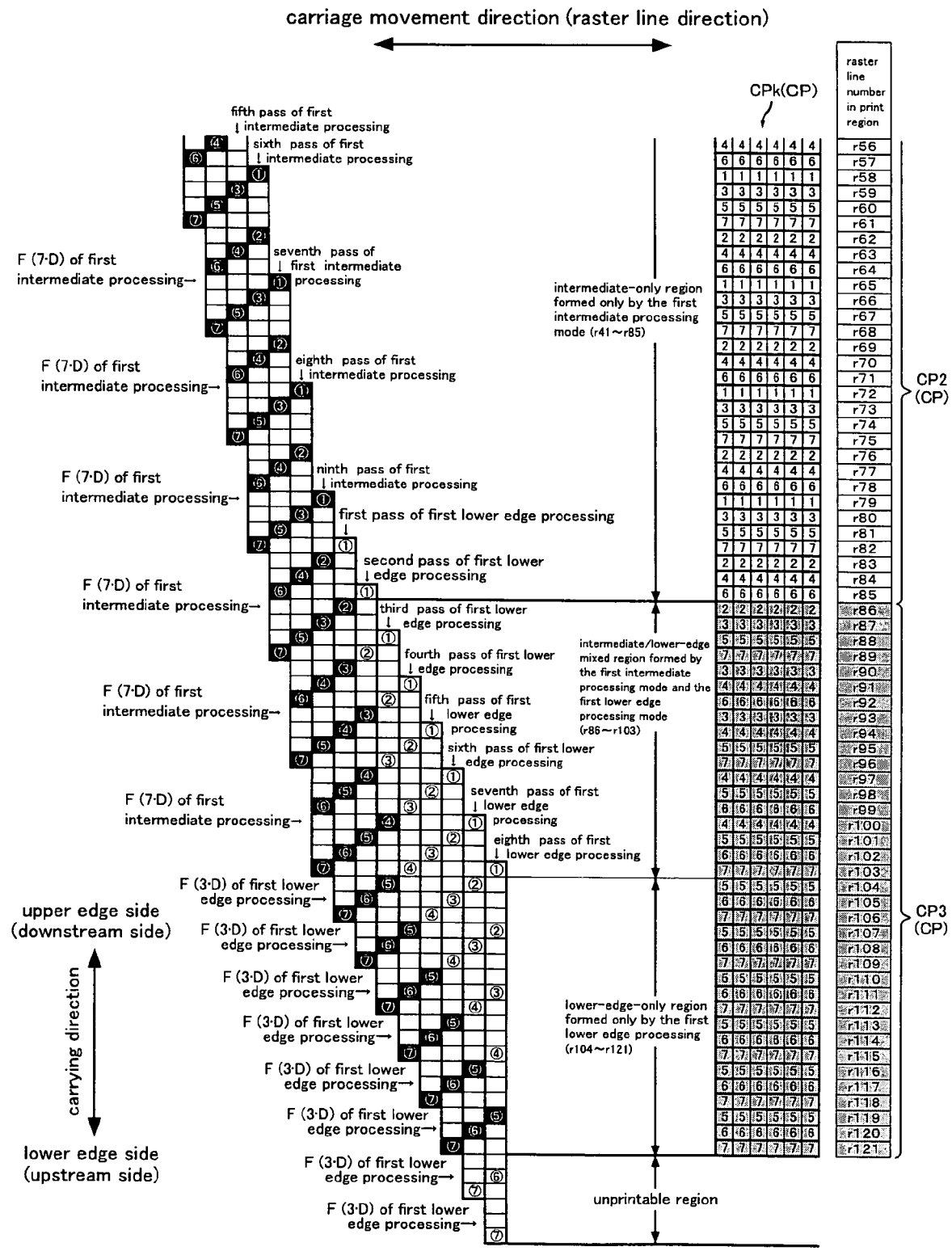
FIG. 29B is a diagram showing by which of the nozzles the raster lines constituting the correction pattern according to the second reference example are formed.

FIG. 29A and FIG. 29B show by which nozzles the raster lines constituting the correction patterns CP1, CP2 and CP3 are formed. FIG. 29A shows this for the first upper edge correction pattern CP1 and the first intermediate correction pattern CP2, whereas FIG. 29B shows this for the first intermediate correction pattern CP2 and the first lower edge processing correction pattern CP3. It should be noted that FIG. 29A and FIG. 29B have the same format as FIG. 21A and FIG. 21B shown above.

In the example shown in the drawings, "first print mode" is set as the print mode, and "first size" is set as the paper size mode. The print data of the correction pattern corresponding to these settings is selected from the memory, and as shown in the right diagrams in FIG. 29A and FIG. 29B, the correction patterns CP1, CP2 and CP3 are printed in the processing modes used for actual printing on the regions at the upper edge, the middle and the lower edge of the paper S.

That is to say, as during the actual printing in FIG. 21A, raster lines are formed in the regions r1 to r40 at the upper edge of the paper shown in FIG. 29A by eight passes in the first upper edge processing mode, and the raster lines formed in these regions r1 to r40 constitute the first upper edge correction pattern CP1. As noted above, the upper-edge/intermediate mixed region r23 to r40 within the region r1 to r40 is formed by both the first upper edge processing mode and the first intermediate processing mode, and some of the raster lines r24, r25, r26, r28, r29, r32, r33, r36 and r40 are formed by the first intermediate processing mode, but also these lines are treated as constituting the first upper edge correction pattern CP1. That is to say, as shown by the shading in the right diagram, the first upper edge correction pattern CP1 is constituted by raster lines of the upper-edge-only region r1 to r22 and of the upper-edge/intermediate mixed region r23 to r40.

Moreover, as in the actual printing of FIG. 21A and FIG. 21B, the raster lines in the region r23 to r103 are formed by nine passes in the first intermediate processing mode in the middle of the paper shown in FIG. 29A and FIG. 29B. Note, however, that as mentioned above, the raster lines in the upper-edge/intermediate mixed region r23 to r40 are treated as constituting the first upper edge correction pattern CP1, and the raster lines of the intermediate/lower-edge mixed region r86 to r103 described below are treated as constituting the first lower edge correction pattern CP3. Therefore, the raster lines of the remaining intermediate-only region r41 to r85 constitute the first intermediate correction pattern CP2. The right diagram shows the raster lines constituting the first intermediate correction pattern CP2 without shading.

Moreover, as during the actual printing in FIG. 21B, raster lines are formed in the region r86 to r121 at the lower edge of the paper shown in FIG. 29B by eight passes in the first lower edge processing mode, and the raster lines formed in these regions r86 to r121 constitute the first lower edge correction pattern CP3. As mentioned above, the intermediate/lower-edge mixed region r86 to r103 in the region r86 to r121 is formed by both the first lower edge processing mode and the first intermediate processing mode, and some of the raster lines r87, r88, r89, r91, r92, r95, r96, r99 and r103 are formed by the first intermediate processing mode, but also these raster lines are treated as constituting the first lower edge correction pattern CP1. That is to say, as shown by the shading in the right diagram, the first lower edge correction pattern CP3 is constituted by raster lines of the intermediate/lower-edge mixed region r86 to r103 and of the lower-edge-only region r104 to r121.

Here, comparing the combinations of nozzles forming adjacent raster lines in these correction patterns CP1, CP2 and CP3, these combinations are obviously the same as the during actual printing, as can be seen from comparing them with the right side in FIG. 21A and FIG. 21B, which show the combination of nozzles during actual printing. That is to say, the combination of nozzles forming adjacent raster lines in the regions r1 to r40 of the first upper edge correction pattern CP1 as shown on the right side in FIG. 29A and FIG. 29B is the same as the combination of nozzles in the region r1 to r40 printed in the first upper edge processing mode during actual printing, as shown on the right side in FIG. 21A. Similarly, the combination of nozzles in the intermediate-only region r41 to r85 of the first intermediate correction pattern CP2 as shown on the right side in FIG. 29A and FIG. 29B is the same as the combination of nozzles in the intermediate-only region r41 to r85 printed in only the first intermediate processing mode during actual printing, as shown on the right side in FIG. 21A and FIG. 21B. Likewise, the combination of nozzles in the region r86 to r121 of the first lower edge correction pattern CP3 as shown on the right side in FIG. 29B is the same as the combination of nozzles in the region r86 to r121 printed in the first lower edge processing mode during actual printing, as shown on the right side in FIG. 21B.

Consequently, it can be seen that it is possible to reliably inhibit darkness non-uniformities of the image during actual printing, by correcting the darkness of each of the raster lines individually based on the correction patterns CP1, CP2 and CP3 formed for each of the processing modes.

It should be noted that the paper size used for printing the correction patterns CP has been taken to be the first size, that is, a size of 110·D in the carrying direction, in order to emulate the same carrying operation and dot formation operation as during actual printing. Consequently, a portion at the uppermost edge and the lowermost edge of the print region r1 to r121 (mainly the portion that corresponds to the abandonment region) cannot be printed at this paper size, so that there are cases in which the correction patterns CP for this portion cannot be obtained.

In this case, a paper that is longer than, for example, 120·D may be used, such that all of the print region r1 to r121 can be covered with respect to the carrying direction. Then, the correction pattern printed on the paper of at least 120·D length is used as the correction patterns CP for the region that is abandoned, whereas the correction patterns CP printed on the paper of the first size may be used as the correction patterns CP for the portion other than the abandonment region.

(2) Step S122: Measuring the Darkness of the Correction Pattern for Each Raster Line The darkness of the correction patterns CP1, CP2 and CP3 shown in FIG. 29A and FIG. 29B is measured for each raster line by a darkness measurement device that optically measures this darkness. This darkness measurement device is capable of measuring the average darkness of a predetermined number of pixels in the raster line direction for each raster line individually. An example of such a device is a scanner as known in the art. It should be noted that the reason why the darkness of the raster lines is evaluated by the average darkness of a predetermined number of pixels is because even if the gradation values of all the pixels are equalized, the size of the dots that are formed in the pixels will differ from pixel to pixel due to the halftone processing. That is, one pixel will not necessarily be representative of the darkness of the entire raster line.

Figure 30A:
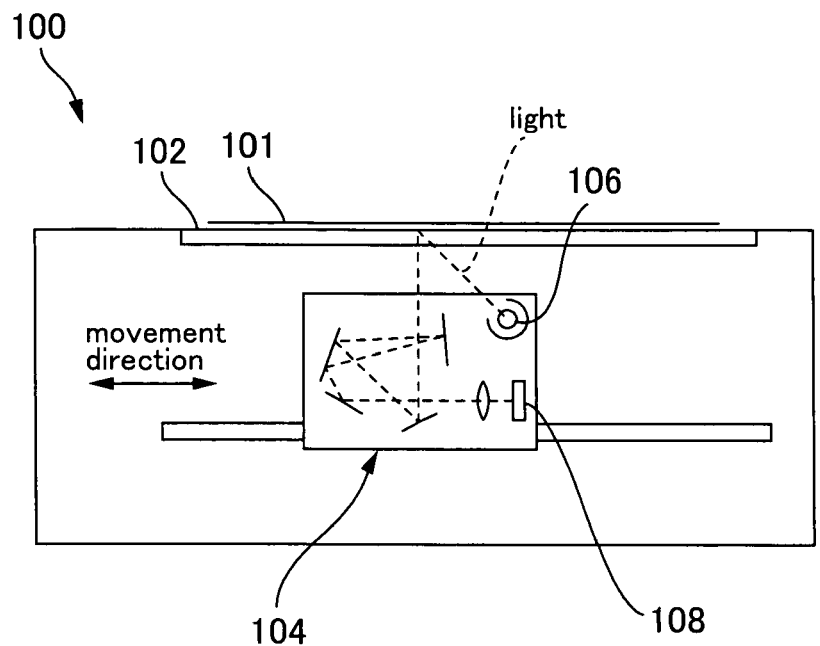
FIG. 30A is a cross-sectional view of a scanner.
Figure 30B:
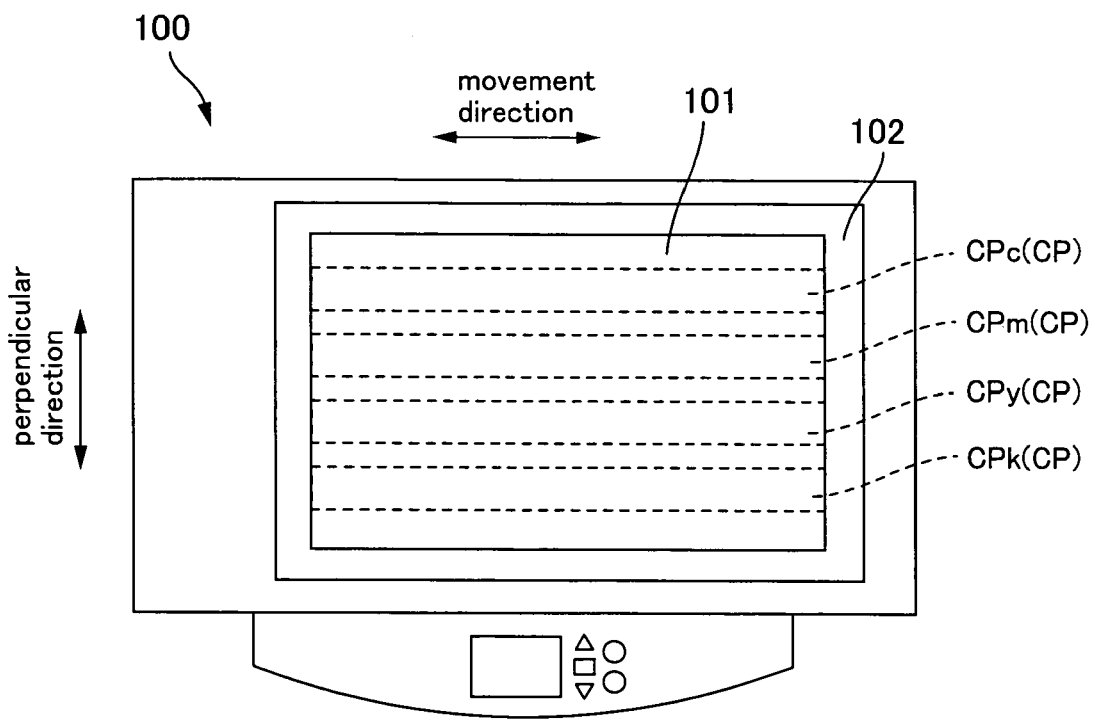
FIG. 30B is a top view of a scanner.

FIG. 30A and FIG. 30B show, respectively, a cross-sectional view and a top view of the scanner. The scanner 100 includes a platen glass 102 on which a document 101 is placed, and a reading carriage 104 that faces the document 101 via this platen glass 101 and that moves in a predetermined movement direction. The reading carriage 104 is provided with an exposure lamp 106 that irradiates light onto the document 101 and a linear sensor 108 for receiving the light that is reflected by the original document 101 over a predetermined range in a direction that is perpendicular to the movement direction. An image is read from the document 101 at a predetermined read resolution, while moving the reading carriage 104 in the movement direction. It should be noted that the dashed line in FIG. 30A indicates the path of the light.

As shown in FIG. 30B, the paper serving as the document 101, on which the correction patterns CP have been printed, is placed on the platen glass 102, aligning its raster lines with the perpendicular direction. Thus, the average darkness of a predetermined number of pixels in the raster line direction can be read for each raster line individually. It is preferable that that the reading resolution in the movement direction of the reading carriage 104 is several integer multiples finer than the pitch of the raster lines. In this way, it is easy to correlate the darkness measurement values that have been read in with the raster lines.

Figure 31:
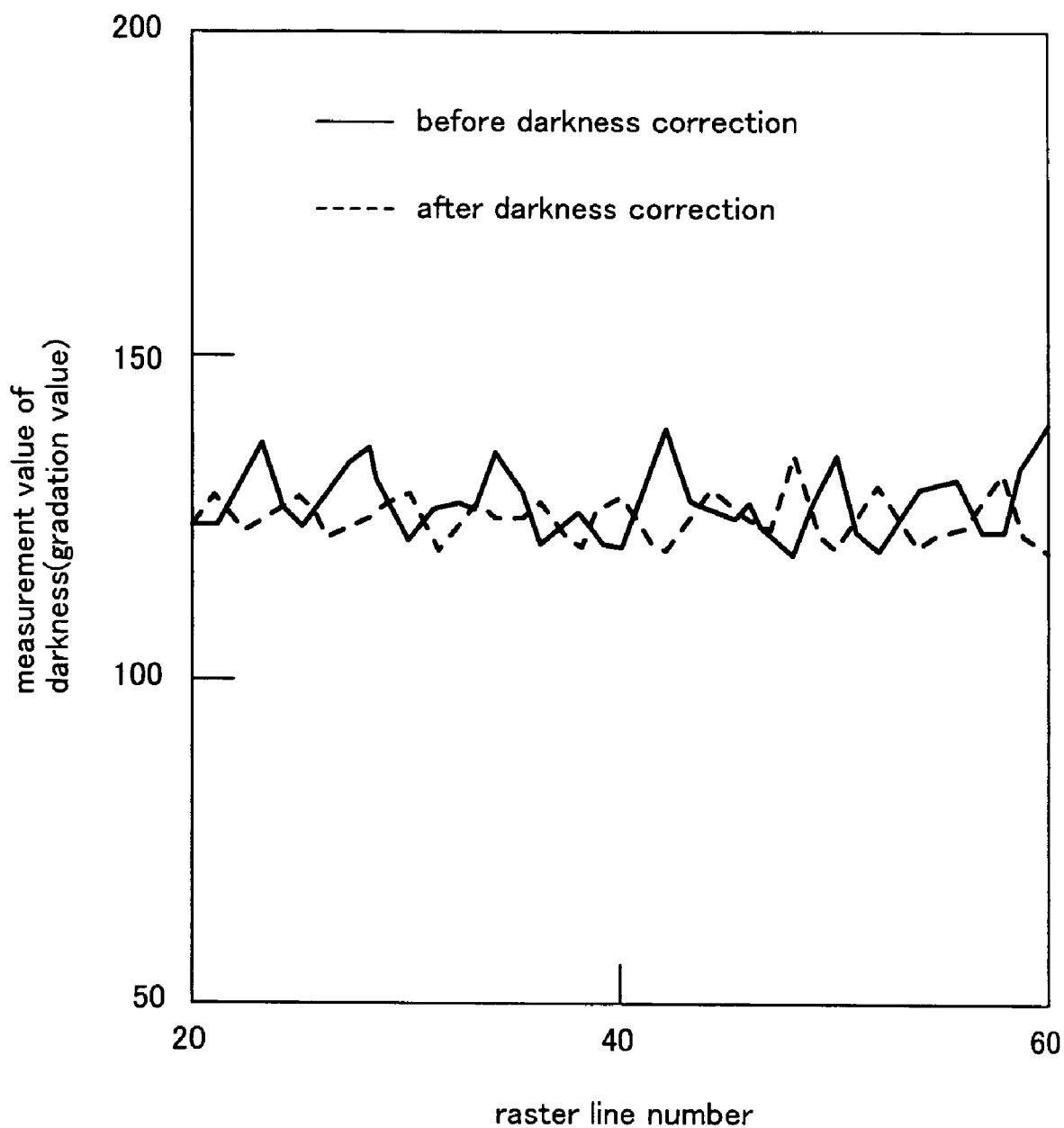
FIG. 31 is a diagram illustrating an example of measurement values of the darkness of a correction pattern.

FIG. 31 shows an example of the darkness measurement values of the correction pattern CPk. The horizontal axis of FIG. 31 denotes the raster line number and the vertical axis denotes the darkness measurement value. The solid line in the figure denotes the measurement values, and, for reference, also the measurement values after the darkness correction according to the second reference example are also indicated by the broken line.

Even though printing was performed at a gradation value of the same darkness across all raster lines constituting the correction pattern CPk, the measurement values indicated by the solid line vary greatly for each raster line. These are the darkness non-uniformities caused by the above-noted variations in the ink ejection direction etc. That is to say, the darkness of raster lines where the spacing of the adjacent raster lines is narrow is measured to be large, whereas the darkness of raster lines where this spacing is wide is measured to be low.

In this second reference example, by performing the later-described darkness correction during the actual printing, the raster lines corresponding to those raster lines where the measurement value is large are corrected so that their macroscopic darkness becomes smaller by making for example the dot creation ratio (corresponds to the above-noted level data) of the dots constituting the corresponding raster line smaller, whereas conversely the raster lines corresponding to those raster lines where the measurement value is small are corrected so that their macroscopic darkness becomes larger by making the dot creation ratio of the dots constituting those raster line larger. As a result, darkness non-uniformities in the image are inhibited. Incidentally, when the correction pattern CPk for black (K) is printed while performing the later-described darkness correction, then the measurement result of that darkness is that the variations among the raster lines have been inhibited to smaller measurement values, as shown by the dashed line in FIG. 31.

Now, the scanner 100 is communicably connected to the computer 1100. Moreover, the measurement values of the darkness of the correction pattern read with the scanner 100 are recorded in a recording table arranged in the memory of the computer 1100, in association with the raster line numbers. It should be noted that the darkness measurement values output from the scanner 100 are grey-scale values (that is, data not representing color information but only brightness) represented by 256 gradation values. Here, the reason for using this grey-scale is that if the measurement values include color information, then a further process for expressing the measurement values by gradation values of that ink color must be performed, so that the processing becomes more complicated.

Figure 32:
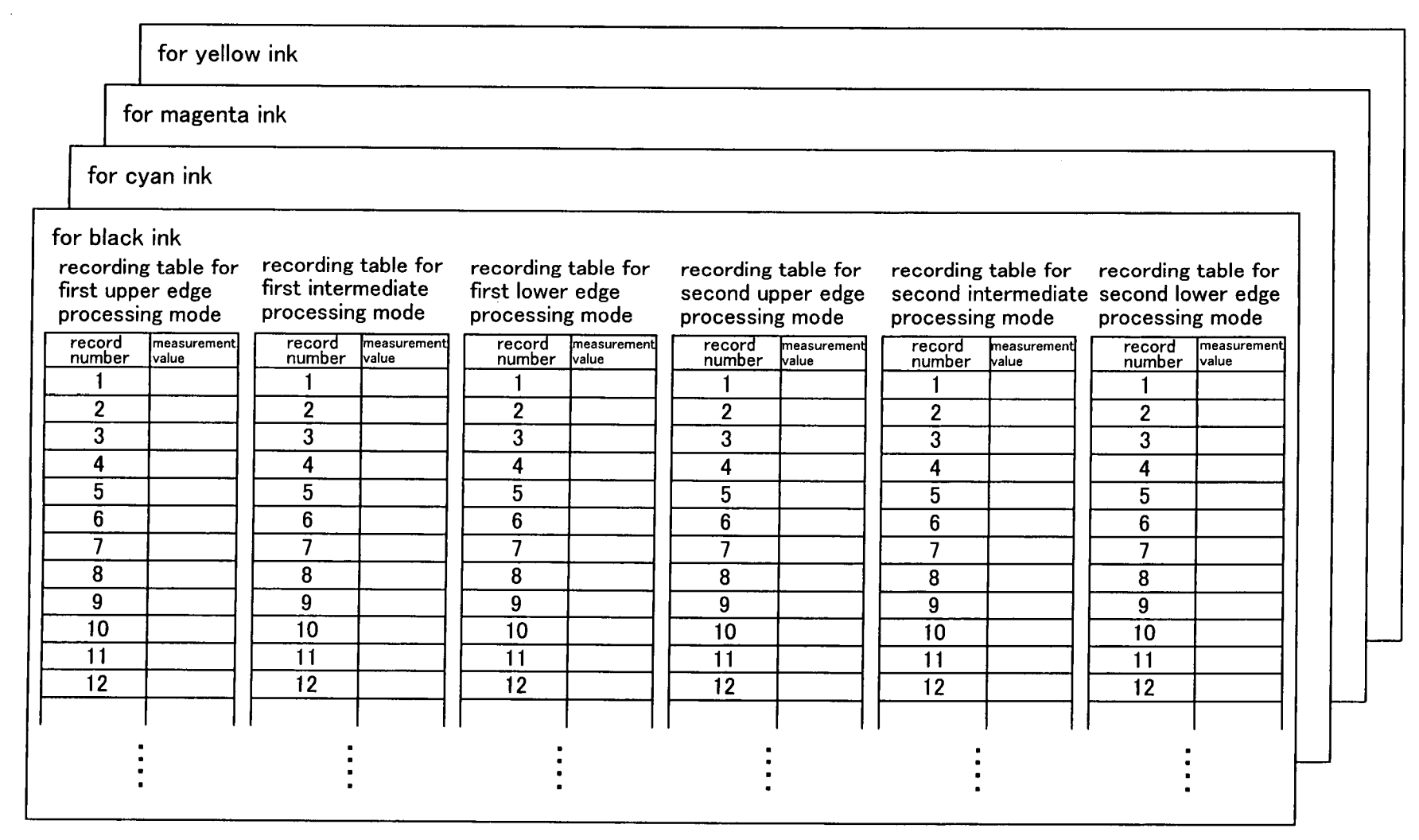

FIG. 32 is a conceptual diagram of the recording tables, which are provided for each ink color and each processing mode. The measurement values of the correction patterns CP printed in each section are recorded in the corresponding recording table.

FIGS. 33A to 33C show the recording tables for the first upper edge processing mode, the first intermediate processing mode and the first lower edge processing mode, respectively, taking black (K) as a representative example. These recording tables each have records for recording the measurement values. A record number is given to each record, and the measurement values of the raster lines for low numbers in the corresponding correction patterns CP1, CP2, and CP3 are successively recorded from the records of low numbers. It should be noted that three asterisks "*" in FIGS. 33A to 33**C denote a state in which a measurement value is recorded in the record, whereas a blank field denotes a state in which no record is made.

In the recording table for the first upper edge processing mode shown in FIG. 33A, the measurement values for the raster lines of the first upper edge correction pattern CP1 are recorded. It should be noted that, as mentioned before, this first upper edge correction pattern CP1 is constituted by the raster lines of the upper-edge-only region r1 to r22 and the upper-edge/intermediate mixed region r23 to r40 shown in FIG. 29A, so that the measurement values of the raster lines of the upper-edge-only region and the intermediate mixed region are recorded in this recording table. Now, since there are 40 raster lines in these regions, the measurement values are recorded in the region from the first record to the $40^{th}$ record in this recording table.

In the recording table for the first intermediate processing mode shown in FIG. 33B, the measurement values for the raster lines of the first intermediate correction pattern CP2 are recorded. As mentioned before, this first intermediate correction pattern CP2 is constituted by the raster lines of the intermediate-only region r41 to r85 shown in FIG. 29A and FIG. 29B, so that the measurement values of the raster lines of the intermediate-only region are recorded in this recording table. Now, since there are 45 raster lines in this region, the measurement values are recorded in the region from the first record to the $45^{th}$ record in this recording table.

In the recording table for the first lower edge processing mode shown in FIG. 33C, the measurement values for the raster lines of the first lower edge correction pattern CP3 are recorded. As mentioned before, this first lower edge correction pattern CP3 is constituted by the raster lines of the intermediate/lower-edge mixed region r86 to r103 and the lower-edge-only region r104 to r121 shown in FIG. 29B, so that the measurement values of the raster lines of the intermediate/lower-edge mixed region and the lower-edge-only region are recorded in this recording table. Now, since there are 36 raster lines in these regions, the measurement values are recorded in the region from the first record to the $36^{th}$ record in this recording table.

(3) Step S123: Setting the Darkness Correction Values for Each Raster Line

Figure 34:
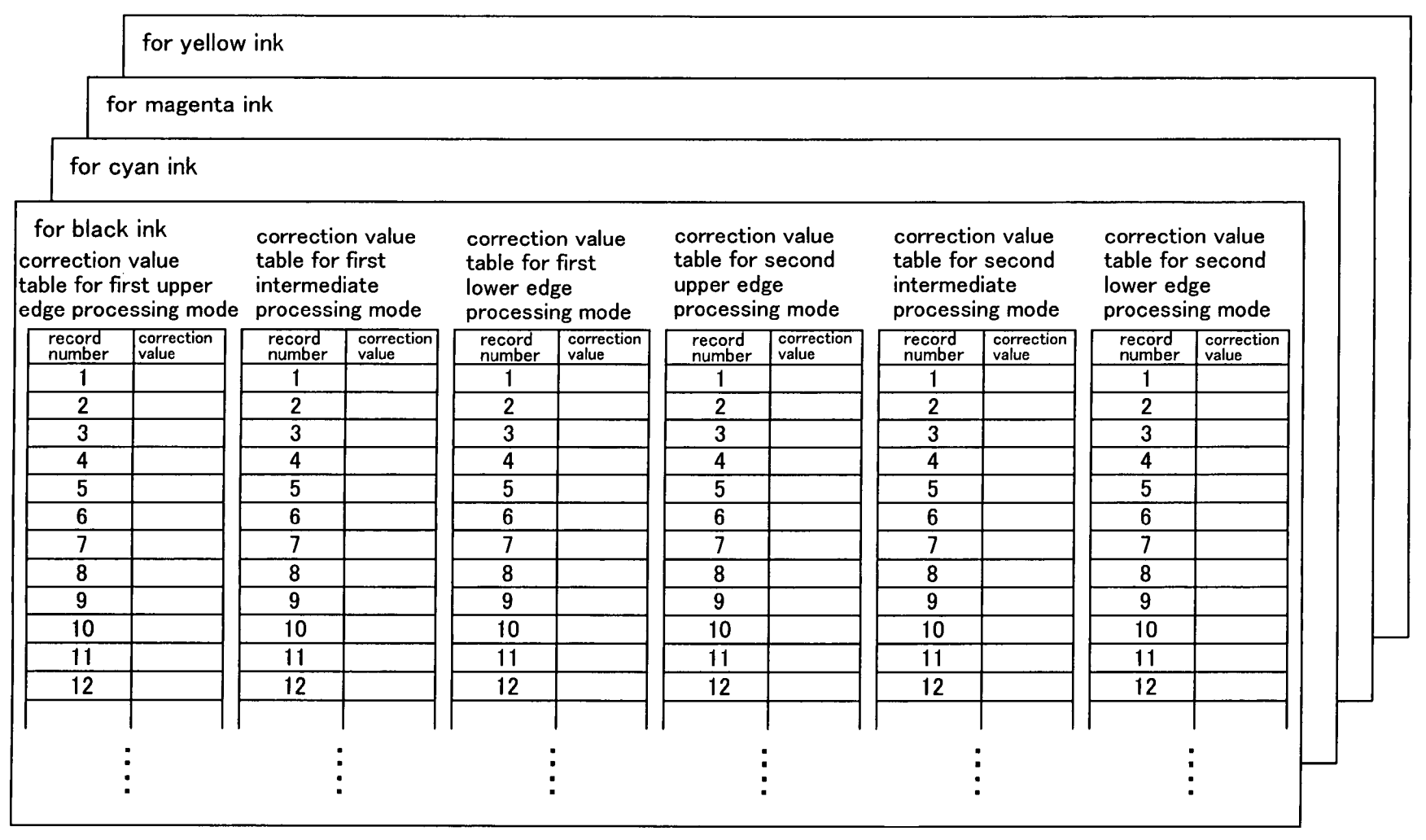

Next, the computer 1100 calculates the darkness correction values based on the measurement values that have been recorded in the records of the recording tables, and sets the correction values in the correction value tables in the memory 63 of the printer 1. FIG. 34 is a conceptual diagram of these correction value tables, which are divided by ink color and processing mode, just like the aforementioned recording tables.

FIGS. 35A to 35C show the correction value tables for the first upper edge processing mode, the first intermediate processing mode and the first lower edge processing mode for black (K), respectively, as representative examples of the correction value tables. These correction value tables each have records for recording the correction values. Each record is assigned a record number, and a correction value calculated based on the measurement values is recorded in the record having the same record number as the record for those measurement values.

For example, in the records from the first record to the $40^{th}$ record of the correction value table for the first upper edge processing mode shown in FIG. 35A, the correction values calculated based on the measurement values recorded from the first record to the $40^{th}$ record of the recording table for the first upper edge processing mode are recorded. That is to say, the correction values corresponding to the upper-edge-only region and the upper-edge/intermediate mixed region are recorded in this correction value table.

Similarly, in the records from the first record to the $45^{th}$ record of the correction value table for the first intermediate processing mode shown in FIG. 35B, the correction values calculated based on the measurement values recorded from the first record to the $45^{th}$ record of the recording table for the first intermediate processing mode are recorded. That is to say, the correction values corresponding to the intermediate-only region are recorded in this correction value table.

Furthermore, in the records from the first record to the 36$^{th}$ record of the correction value table for the first lower edge processing mode shown in FIG. 35C, the correction values calculated based on the measurement values recorded from the first record to the 36$^{th}$ record of the recording table for the first lower edge processing mode are recorded. That is to say, the correction values corresponding to the intermediate/ lower-edge mixed region and the lower-edge-only region are recorded in this correction value table.

These correction values are obtained in the format of a correction ratio indicating the ratio of correction with respect to the darkness gradation value. More specifically, they are calculated as follows. First, an average value M of the measurement values recorded in the recording tables is calculated for each of the recording tables, and the calculated average values are taken as a target value M of the darkness for each recording table. Then, for each measurement value C in the recording tables, the deviation $\Delta C$ (=M−C) between this target value M and the measurement value C is calculated, and the value obtained by dividing the deviation $\Delta C$ by the target value M is taken as the correction value H. That is to say, this correction value H can be expressed by the following mathematical equation 1:

$$\text{correction value } H = \Delta C / M \quad \text{(Eq. 1)}$$
$$= (M - C) / M$$

Then, using this correction value H, it is possible to perform such a correction on the raster lines for which the measurement value C is higher than the target value M that the darkness of those raster lines is reduced to the target value M. For example, if the measurement value C of a raster line is 105 and the target value M is 100, then the correction value H (=(100−105)/100) is −0.05, and the darkness of the printed raster line can be set to the target value M=100 by reducing the gradation value of the darkness of this raster line by a factor of 0.05 when printing. It is also possible to perform such a correction on the raster lines for which the measurement value C is lower than the target value M that the darkness of those raster lines is increased to the target value M. For example, if the measurement value C of a raster line is 95 and the target value M is 100, then the correction value H (=(100−95)/100 is +0.05, and the darkness of the printed raster line can be set to the target value M=100 by increasing the gradation value of the darkness of this raster line by a factor of 0.05 when printing.

Thus, by using this correction value H to perform darkness correction, which is discussed later, variations in the darkness of each raster line can be made small for each ink color and processing mode, thus making it possible to inhibit darkness non-uniformities.

<Step S140: Actual Printing of the Image While Performing Darkness Correction for Each Raster Line>

When the darkness correction values are set in this manner, the printer 1 can inhibit darkness non-uniformities when printing, by performing a darkness correction for each raster line, using the correction value tables arranged for each ink color and for each processing mode. It should be noted that this darkness correction for each raster line is achieved by correcting the pixel data based on the correction values when the printer driver 1110 converts the RGB image data into print data. That is to say, as noted above, the pixel data is ultimately turned into 2-bit pixel data indicating the size of the dots formed on the paper, and the macroscopic darkness of the raster lines printed based on this data is changed by changing this 2-bit pixel data.

(1) Darkness Correction Procedure

Figure 36:
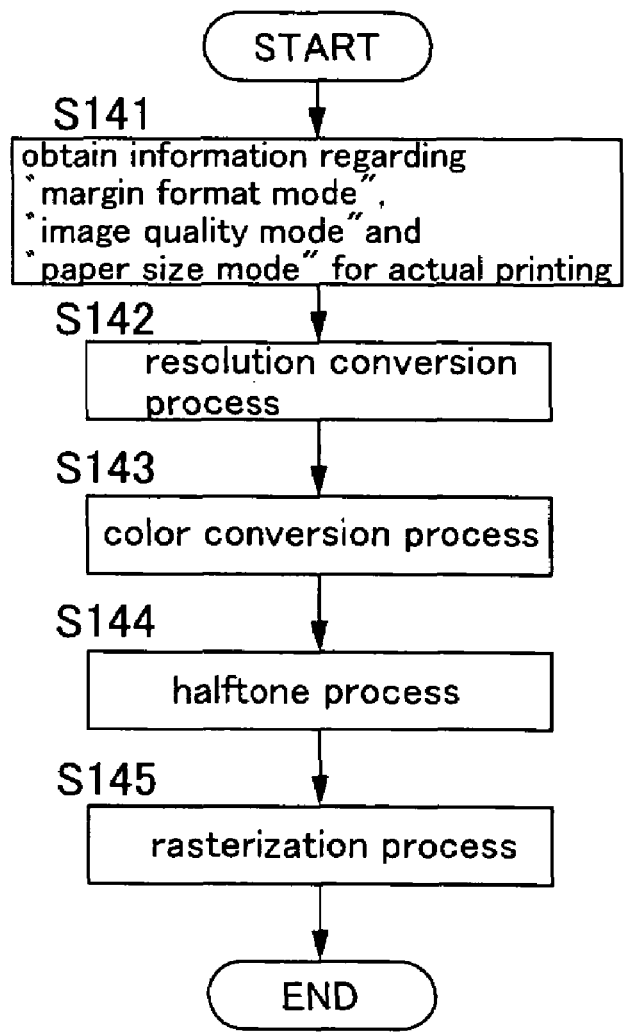
FIG. 36 is a flowchart of Step S140 in FIG. 26.

FIG. 36 is a flowchart showing the procedure for correcting the darkness of each raster line in Step S140 of FIG. 26. Hereinafter, the darkness correction procedure is described with reference to this flowchart.

Step S141: First, the user communicably connects the printer 1 that he has purchased to his computer 1100, establishing a printing system as illustrated in FIG. 1. The user then inputs the margin format mode, the image quality mode, and the paper size mode through the user interface screen of the printer driver 1110 in the computer 1100. With this input, the printer driver 1110 obtains information on these modes, for example. In the following explanations, it is assumed that "fine" is input as the image quality mode, "borderless" is input as the margin format mode, and the above-noted "first size" is input as the paper size mode.

Step S142: Next, the printer driver 1110 subjects the RGB image data that has been output from the application program 1104 to a resolution conversion process. That is to say, the resolution of the RGB image data is converted to the print resolution corresponding to the image quality mode, and moreover, the number of pixels in the RGB image data is matched to the dot number of the print region corresponding to the paper size and the margin format mode by, for example, trimming the RGB image data as appropriate.

Figure 37:
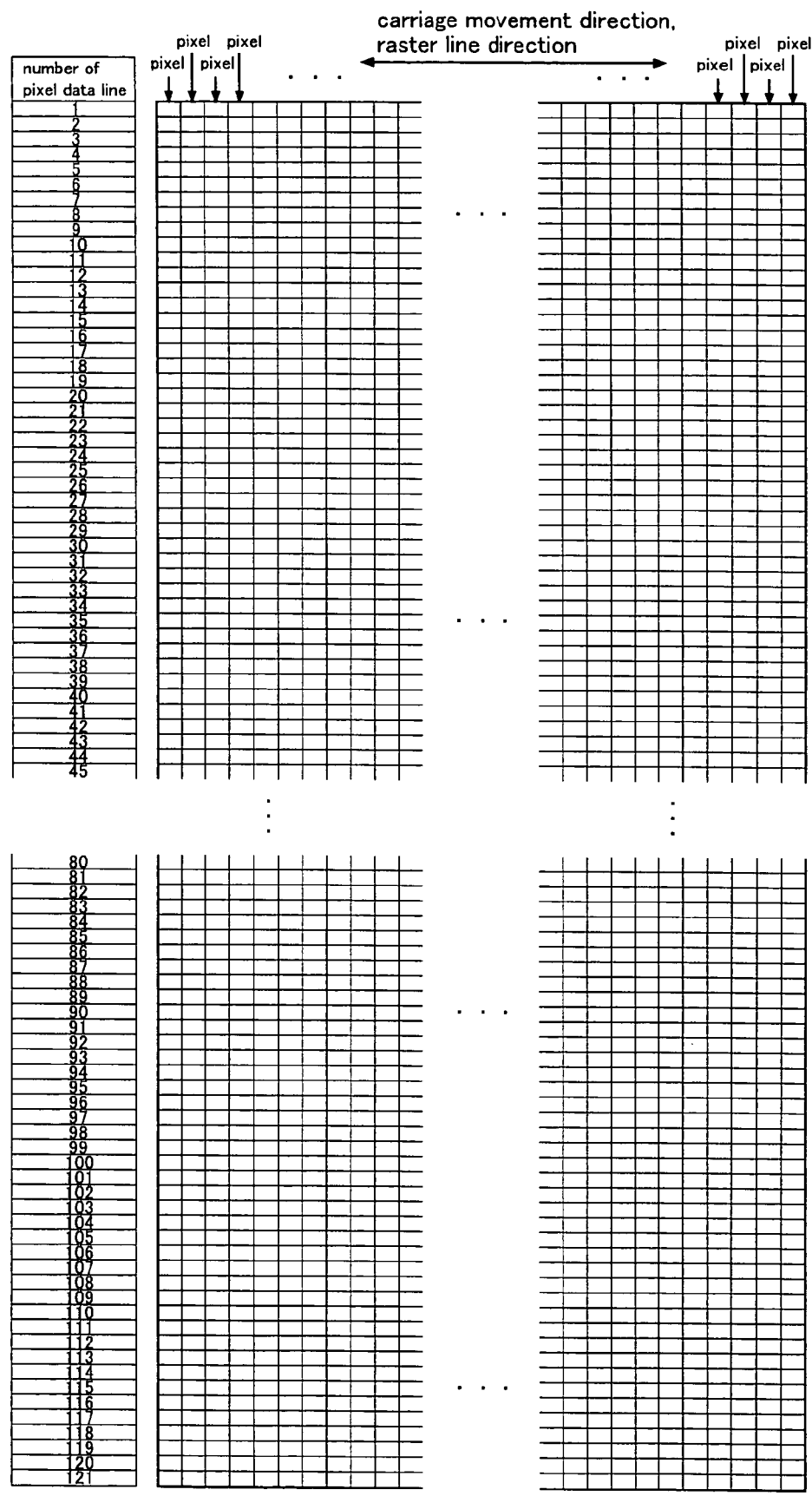
FIG. 37 is a conceptual diagram showing an array of pixel data according to RGB image data.

FIG. 37 is a conceptual diagram showing an array of pixel data according to the RGB image data after the resolution conversion process. Each of the squares in the figure represents a pixel of 720×720 dpi size, and each pixel has pixel data. Here, "fine" has been input as the image quality mode, so that the resolution of the RGB image data is converted to 720×720 dpi. Also, "first size" has been input as the paper size mode and "borderless" has been input as the margin format mode, so that the size of the print region is 121·D in the carrying direction, and the RGB image data is processed to a number of 121 pixels in the carrying direction to correspond to this condition. That is to say, the RGB image data is processed to a state in which there are 121 pixel data rows, each constituted by data for a plurality of pixels aligned in the direction of the raster lines.

It should be noted that the pixel data rows are data for forming the raster lines in the print region r1 to r121 of the image. That is to say, the first pixel data row is the data of the uppermost first raster line r1 of the print region r1 to r121, and the second pixel data row is the data of the second raster line r2. From there on, the pixel data rows correspond numerically to the raster lines, and the last, 121$^{st}$ pixel data row is the data of the lowermost, 121$^{st}$ raster line r121 of the print region r1 to r121.

Step S143: Next, the printer driver 1110 performs the above-described color conversion to convert the RGB image data into CMYK image data. As mentioned above, the CMYK image data includes C image data, M image data, Y image data, and K image data, and these C, M, Y, and K image data are each made of 121 rows of pixel data.

Step S144: Next, the printer driver 1110 performs halftone processing. Halftone processing is processing for converting the 256 gradation values given by the pixel data in the C, M, Y, and K image data into gradation values of four gradations. It should be noted that the pixel data of these four gradation values is 2-bit data indicating "no dot formation," "small dot formation," "medium dot formation," and "large dot formation."

Then, in this second reference example, the darkness correction is performed for each raster line during halftone processing. In other words, the conversion of the pixel data constituting the image data from 256 gradations to one of four gradations is performed while correcting the pixel data by an amount corresponding to the correction value. Darkness correction is performed for each of the C, M, Y, and K image data values based on the correction value table for each ink color, but here the image data K black (K) is described as representative image data. Moreover, in the above-noted color conversion process, the array of the pixel data does not change, so that in the following explanations, FIG. 37 is used also as the figure representing the array of the K pixel data.

First, the printer driver 1110 references the first reference table (FIG. 19) using the margin format mode and the image quality mode as the key to obtain the corresponding print mode. The printer driver 1110 then references the second reference table (FIG. 20) using the print mode as the key to specify the processing mode to be used during actual printing of the image.

If a single processing mode is specified, then the correction value table for that processing mode is used to correct the pixel data rows in the K image data.

On the other hand, if a plurality of processing modes have been specified, then the regions that are to be printed by each processing mode are specified in accordance with the paper size mode. Then, the correction value table for each processing mode is used to correct the image data rows corresponding to the regions to be printed by that processing mode.

It should be noted that the information on the regions that are printed by the processing modes is recorded in a region determination table. The region determination table is stored in the memory in the computer 1100, and the printer driver 1110 references this region determination table to specify the region that is printed by each processing mode.

For example, as shown in FIG. 21A, the upper-edge-only region and the upper-edge/intermediate mixed region that are printed by the first upper edge processing mode are formed in a fixed number of eight passes as discussed above, and thus it is known in advance that this region will have 40 raster lines from the uppermost edge of the print region downstream. Consequently, "region from uppermost edge of print region to the $40^{th}$ raster line" is recorded in the region determination table in association with the first upper edge processing mode.

Similarly, as shown in FIG. 21B, the intermediate/lower-edge mixed region and the lower-edge-only region printed through the first lower edge processing mode are formed in a fixed number of eight passes as discussed above, and thus it is known in advance that this region will have 36 raster lines from the lowermost edge of the print region upward. Consequently, "region from lowermost edge of the print region to the $36^{th}$ raster line on upper edge side thereof" is recorded in the region determination table in association with the first lower edge processing mode.

Further, as shown in FIG. 21A and FIG. 21B, the intermediate-only region that is printed through the first intermediate processing mode only is the region that continues toward the lower edge from the region that is printed by the first upper edge processing mode, and is also the region that continues toward the upper edge from the region that is printed by the first lower edge processing mode. Thus, the intermediate-only region is known in advance to be the region that is sandwiched by the $41^{st}$ raster line toward the lower edge from the uppermost edge of the print region and the $37^{th}$ raster line toward the upper edge from the lowermost edge of the print region. Consequently, "region sandwiched by the $41^{st}$ raster line toward the lower edge from the uppermost edge of the print region and the $37^{th}$ raster line toward the upper edge from the lowermost edge of the print region" is recorded in the region determination table in association with the first intermediate processing mode.

In this example, the modes are "borderless" and "fine", and thus the printer driver 1110 references the first and second reference tables shown in FIG. 19 and FIG. 20 and specifies "first print mode" as the print mode, and specifies the three corresponding processing modes of first upper edge processing mode, first intermediate processing mode, and first lower edge processing mode as the corresponding processing modes for the actual printing.

Also, because the paper size mode is "first size" the print region during the actual printing is 121·D in the carrying direction, and as discussed above, because three processing modes are specified, the regions that are printed by the respective processing modes are specified by referencing the region determination table, and the pixel data rows corresponding to the respective regions are corrected.

For example, the upper-edge-only region and the upper-edge/intermediate mixed region that are printed through the first upper edge processing mode are specified from the region determination table as the region r1 to r40 within the print region r1 to r121. The data of the raster lines of the region r1 to r40 are the pixel data rows from the first row to the $40^{th}$ row of the K image data. On the other hand, the correction values corresponding to the upper-edge-only region and the upper-edge/intermediate mixed region are recorded in the first through $40^{th}$ records in the correction value table for the first upper edge processing mode. Consequently, the pixel data making up each pixel data row are corrected while correlating the correction values of the first through $40^{th}$ records of the correction value table for the first upper edge processing mode successively with the first through $40^{th}$ pixel data rows.

Similarly, the intermediate/lower-edge mixed region and the lower-edge-only region that are printed in the first lower edge processing mode are specified as the region r86 to r121 within the print region r1 to r121, based on the region determination table. The data of the raster lines of the region r86 to r121 are the pixel data rows from the $86^{th}$ row to the $121^{st}$ row of the K image data. On the other hand, the correction values corresponding to the intermediate/lower-edge mixed region and the lower-edge-only region are recorded in the first through $36^{th}$ records of the correction value table for the first lower edge processing mode. Consequently, the pixel data making up each pixel data row are corrected while correlating the correction values of the first through $36^{th}$ records of the correction value table for the first lower edge processing mode successively with the first through $36^{th}$ pixel data rows.

The intermediate-only region, which is printed in the first intermediate processing mode only, is specified as the region r41 to r85 of the print region r1 to r121 based on the region determination table. The data of the raster lines of the region r41 to r85 are the pixel data rows of the $41^{st}$ to $85^{th}$ rows in the K image data. On the other hand, the correction values corresponding to the intermediate-only region are recorded in the first through $45^{th}$ records of the correction value table for the first intermediate processing mode. Consequently, the pixel data making up each pixel data row are corrected while correlating the correction values of the first through $45^{th}$ records of the correction value table for the first intermediate processing mode successively with the $41^{st}$ through $85^{th}$ pixel data rows.

As mentioned above, the number of passes of the first intermediate processing mode is not fixed like that of the first upper edge processing mode, for example, but changes depending on the paper size mode that has been input. Therefore, the number of pixel data rows in the intermediate-only region varies. Here, the correction value table for the first intermediate processing mode includes correction values for only the fixed number of 45 records from the first record through the 45$^{th}$ record, so that there may be the problem that the number of correction values may become insufficient in the latter half of correlating them to a pixel data row.

As explained in more detail later, this can be dealt with by utilizing the periodicity of the combination of nozzles forming adjacent raster lines. Put simply, as shown in the right diagrams of FIG. 21A and FIG. 21B, the order of the nozzles forming the raster lines in the intermediate-only region r41 to r85, which is printed by only the first intermediate processing mode, in a single cycle is #2, #4, #6, #1, #3, #5, and #7, and this cycle is repeated. This cycle is increased by one cycle each time the pass number of the first intermediate processing mode increases by one. Consequently, it is possible to use the correction values of this one cycle for row numbers that do not have a corresponding correction value. That is, the correction values from the first record to the seventh records, for example, corresponding to the correction values of this one cycle can be used repeatedly for however many correction values are insufficient.

Incidentally, in the above explanation of Step S144, the method for correcting the pixel data based on the correction values has not been explained in detail, and will be discussed later.

Step S145: Next, the printer driver 1110 performs rasterization. The rasterized print data are output to the printer 1, and the printer 1 performs actual printing of the image on paper in accordance with the pixel data of the print data. It should be noted that as discussed above, the darkness of the pixel data has been corrected for each raster line individually, so that darkness non-uniformities in the image can be inhibited.

(2) Regarding the Method for Correcting the Pixel Data Based on the Correction Values Next, a method for correcting the pixel data based on the correction values is described in detail.

As mentioned above, pixel data having 256 gradation values are converted through halftone processing into pixel data having four gradation values representing "no dot formation," "small dot formation," "medium dot formation," and "large dot formation". During this conversion, the 256 gradations are first substituted with level data and then converted into four gradations.

Accordingly, in this second reference example, at the time of this conversion, the level data are changed by an amount corresponding to the correction value so as to correct the pixel data of gradation values having four gradations, thus realizing a "correction of pixel data based on the correction values."

It should be noted that the halftone processing in this second reference example differs from the halftone processing that has been described using FIG. 3 in that it includes steps S301, S303, and S305 for setting the level data, but otherwise the two are the same. Consequently, the following description focuses on this difference, and aspects that are the same are described only summarily. Also, the following description refers to the flowchart of FIG. 3 and the dot creation ratio table of FIG. 4.

First, as in ordinary halftone processing, the printer driver 1110 obtains the K image data in Step S300. It should be noted that at this time the C, M, and Y image data also are obtained, but because the following description can be applied to any of the C, M, and Y image data as well, the description is made with the K image data as representative image data.

Next, in Step S301, for each pixel data value, the level data LVL corresponding to the gradation value of that pixel data is read in from the large dot profile LD of the creation ratio table. However, in this second reference example, when reading the level data LVL, the gradation values are shifted by the correction value H corresponding to the pixel data row to which the pixel data belong.

For example, if the gradation value of the pixel data is gr and the pixel data row to which that pixel data belongs is the first row, then that pixel data row is correlated with the correction value H of the first record in the correction value table for first upper edge processing. Consequently, the level data LVL is read while shifting the gradation value gr by a value $\Delta gr$ ($=gr \times H$) that is obtained by multiplying the correction value H by the gradation value gr, obtaining a level data LVL of 11d.

In Step S302', it is determined whether or not the level data LVL of this large dot is greater than the threshold value THL of the pixel block corresponding to that pixel data on the dither matrix. Here, the level data LVL has been changed by an amount corresponding to $\Delta gr$ ($=gr \times H$), in accordance with the correction value H. Consequently, the result of this size determination is changed by that amount of change, and thus the ease with which a large dot is formed also changes, thus achieving the "correction of pixel data in accordance with the correction value" mentioned above.

It should be noted that if in Step S302 the level data LVL is larger than the threshold value THL, then the procedure advances to Step S310 and a large dot is recorded in association with that pixel data. Otherwise the procedure advances to Step S303.

In Step S303, the level data LVM corresponding to the gradation value is read from the medium dot profile MD of the creation ratio table, and also at this time, as in Step S301, the level data LVM is read while shifting the gradation value by an amount corresponding to the correction value H.

For example, the level data LVM is read while shifting the gradation value gr by a value $\Delta gr$ ($=gr \times H$) that is obtained by multiplying the correction value H by the gradation value gr, obtaining a level data LVM of 12d. Then, in Step S304, it is determined whether or not the level data LVM of this medium dot is greater than the threshold value THM of the pixel block corresponding to that pixel data on the dither matrix. Here, the level data LVM is changed by an amount corresponding to $\Delta gr$, in accordance with the correction value H. Consequently, the result of this size determination is changed by that amount of change, and thus the ease with which a medium dot is formed also changes, thus achieving the "correction of pixel data in accordance with the correction value" mentioned above.

It should be noted that if in Step S304 the level data LVM is larger than the threshold value THM, then the procedure advances to Step S309 and a medium dot is recorded in association with that pixel data. Otherwise the procedure advances to Step S305.

In Step S305, the level data LVS corresponding to the gradation value is read from the small dot profile SD of the creation ratio table, and also at this time, as in Step S301, the level data LVS is read while shifting the gradation value by an amount corresponding to the correction value H.

For example, the level data LVS is read while shifting the gradation value gr by a value $\Delta gr$ ($=gr \times H$) that is obtained by multiplying the correction value H by the gradation value gr, obtaining a level data LVS of 13d. Then, in Step S306, it is determined whether or not the level data LVS of this small dot is greater than the threshold value THS of the pixel block corresponding to that pixel data on the dither matrix. Here, the level data LVS is changed by an amount corresponding to Δgr, in accordance with the correction value H. Therefore, the result of this size determination is changed by that amount of change, and thus the ease with which a small dot is formed also changes, thus achieving the "correction of pixel data in accordance with the correction value" mentioned above.

It should be noted that if in Step S306 the level data LVS is larger than the threshold value THS, then the procedure advances to Step S308, and a small dot is recorded in association with that pixel data. Otherwise the procedure advances to Step S307 and no dot is recorded corresponding to that pixel data.

(3) Regarding the "Darkness Correction Procedure" in the Case that the Second Print Mode has Been Set In the explanation of "(1) Darkness Correction Procedure", an example was given of a case in which the first print mode was set, but here, the case that the second print mode is set is explained.

This corresponds to the case that the user has entered "bordered" as the margin format mode and "fine" as the image quality mode in the interface of the printer driver 1110. Then, the printer 1 performs printing only in the first intermediate processing mode shown in FIG. 19, and prints a bordered image with a print resolution of 720×720 dpi on paper.

Step S141: First, the printer driver 1110 obtains "fine" as the image quality mode, "bordered" as the margin format mode and "first size" as the paper size mode, through input from the user interface of the printer driver 1110.

Figure 38:
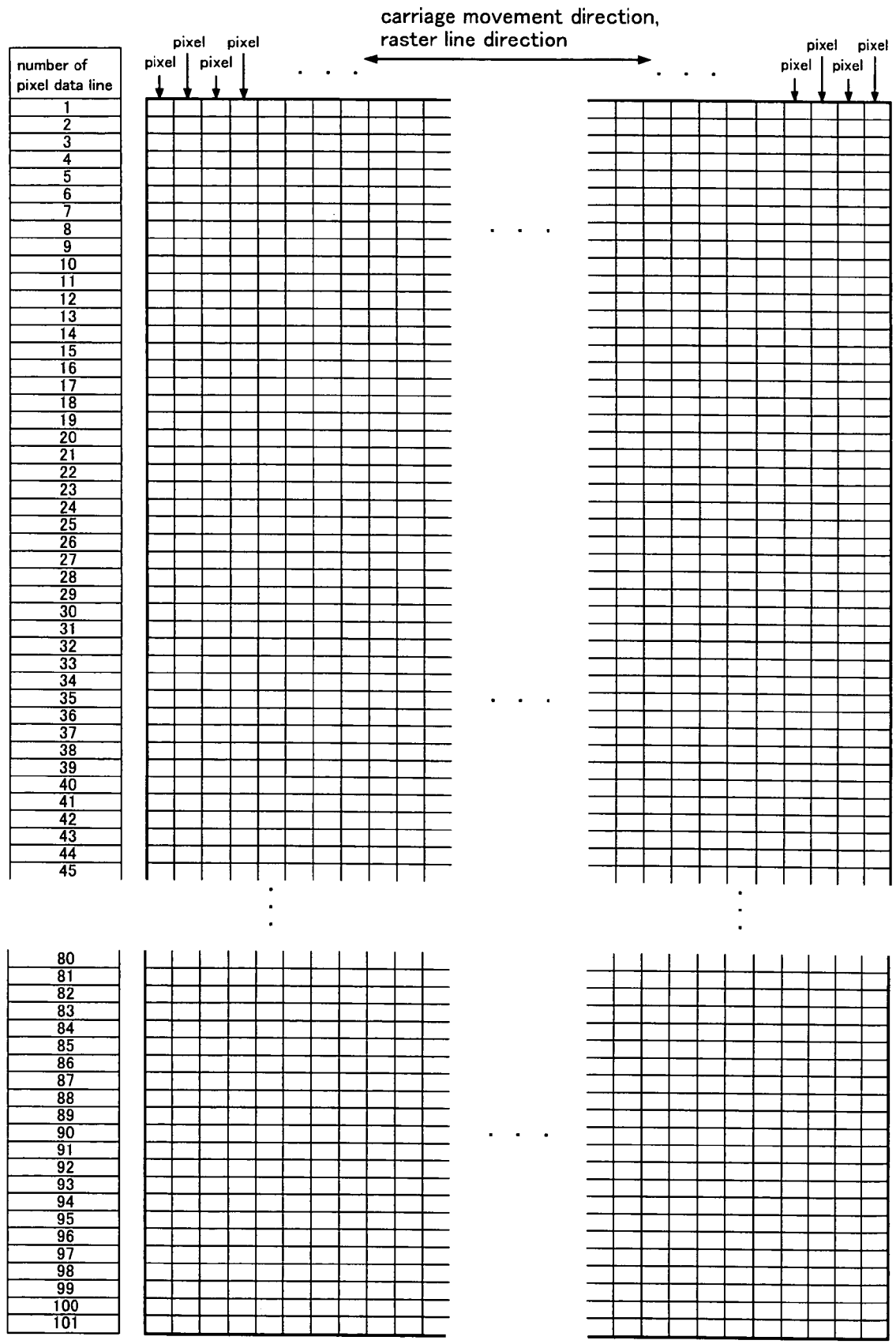
FIG. 38 is a conceptual diagram showing an array of pixel data according to RGB image data.

Step S142: Next, the printer driver 1110 performs a resolution conversion process. FIG. 38 is a conceptual diagram showing an array of pixel data according to the RGB image data after the resolution conversion process. In accordance with the "fine" mode, the resolution of the RGB image data is converted to 720×720 dpi. Also, the "first size" and "bordered" print region r1 to r101 has the size 101·D in the carrying direction, and the RGB image data corresponding to this is processed to 101 pixel data rows.

Step S143: Next, the printer driver 1110 performs color conversion to convert the RGB image data into CMYK image data. As in the foregoing, the following is an explanation for the K image data as representative of CMYK image data. It should be noted that the K image data has 101 pixel data rows, just like the RGB image data.

Step S144: Next, the printer driver 1110 performs halftone processing. As in the previous examples, darkness correction is performed for each raster line individually during this halftone processing. The following explanation uses FIG. 38 as the figure representing the pixel array of the K image data.

First, the printer driver 1110 references the first reference table (FIG. 19) using "bordered" and "fine" as the key to specify that the corresponding print mode is the second print mode. The printer driver 1110 then references the second reference table (FIG. 20) using this second print mode as the key to specify that only the first intermediate processing mode is to be used during actual printing of the image. That is to say, in this case, it is specified that the entire print region is the intermediate-only region. Therefore, there is no need to specify the printed regions by print mode through referring to the region determination table, and thus all pixel data rows of the K image data, which are the data of the entire print region, are corrected using the correction value table (see FIG. 35B) for the first intermediate processing mode that stores the correction values corresponding to the intermediate-only region.

That is to say, the pixel data of the pixel data rows are corrected while correlating the correction values from the first record to the 45$^{th}$ record of the correction value table respectively to the first to 101$^{st}$ pixel data rows shown in FIG. 38.

Note, however, that as mentioned above, the correction value table for the first intermediate processing mode includes correction values for only the fixed number of 45 records from the first record through the 45$^{th}$ record, so that depending on the size of the intermediate-only region, there may be the problem that the number of correction values may become insufficient in the latter half of correlating them to a pixel data row. For example, in the K image data shown in FIG. 38, there are 101 rows worth of pixel data, so that in this case, 56 (=101−45) rows of correction values are missing. However, by utilizing the periodicity of the combinations of the nozzles forming adjacent raster lines as noted above, the correction values from the first record to the seventh records, for example, can be used repeatedly for however many correction values are insufficient.

Step S145: Next, the printer driver 1110 performs a rasterization process. The rasterized print data is output to the printer 1, and the printer 1 performs actual printing of the image on paper in accordance with the pixel data of the print data. It should be noted that as discussed above, the darkness of the pixel data has been corrected for each raster line individually, so that darkness non-uniformities in the image can be inhibited.

=== Problems Regarding the Darkness Correction Values of the Second Reference Example ===

The printer 1 according to the above-described second reference example stores the correction values in its memory 63 in correlation with all of the respective raster lines. However, this number of raster lines is very large, and accordingly also the number of correction values to be stored in the memory 63 inevitably becomes very large.

For example, in the second reference example, for the sake of illustration, the intermediate-only region r41 to r85 shown in FIG. 21A and FIG. 21B was treated as being made up of 45 raster lines, but in actuality, this intermediate-only region changes in size depending on the paper size mode, and in the case of A4 size for example, it is made of an enormous number of raster lines ranging from several thousand to several ten thousand. More specifically, in the case of an intermediate-only region that is 290 mm long in the carrying direction and has a print resolution of 720 dpi in that direction, there are 8220 (=720 dpi/(25.4 mm/inch)×290 mm) raster lines. As a result, the enormous number of 8220 correction values needs to be stored. In this case, the capacity of the memory 63 needs to be enlarged, leading to increased costs for the printer 1.

To address this problem, in the printer 1 according to the present invention as described below, the number of correction values to be stored is reduced by utilizing the periodicity in the case of a processing mode in which the nozzles forming the raster lines change periodically in the carrying direction, like in the first intermediate processing mode for forming the intermediate-only region, for example. That is to say, taking an integer multiple of the number of raster lines formed in one period as one set, the correction values for at least one set are stored in the memory 63, thus reducing the number of correction values to be stored. Then, in the darkness correction during actual printing of an image, one set of correction values is repeatedly correlated, in order, with the raster lines of the image to be printed, thus making it possible to handle the correction values with a memory 63 of smaller capacity.

=== Regarding the Darkness Correction Values According to the Present Invention and the Darkness Correction Using these Correction Values ===

Referring to several embodiments, the following is an explanation of a printer 1 performing darkness correction using one set of correction values stored in the memory 63. It should be noted that the following embodiments are basically premised on the printer 1 according to the second reference example described above, and their configuration and method of darkness correction is substantially the same. Thus, the following explanations focus on the differences, and like portions are only explained where this is necessary to appreciate the present invention.

First Embodiment

In the first embodiment, the number of correction values for the first intermediate processing mode is reduced by utilizing the periodicity of the change of the nozzles forming the raster lines. That is to say, FIGS. 39A to 39C show correction value tables according to this first embodiment, and in the correction value table for the first intermediate processing mode shown in FIG. 39B, only seven correction values are stored in the range from the first record to the seventh record. Comparing this with the correction value table of the first intermediate processing mode of the second reference example shown in FIG. 33B, it can be seen that the number of correction values has been greatly reduced from 45 (for an actual A4 size, this would be several thousand to several ten thousand) of the second reference example to 7.

It should be noted that the reason why the correction values for the first upper edge processing mode and the first lower edge processing mode are not reduced utilizing this periodicity is because, as noted above, the necessary number of correction values is fixed at 40 and 36 correction values respectively, so that they cannot amount to a number of several thousand to several ten thousand as in the first intermediate processing mode.

The following is an explanation of the reason why the darkness correction of the intermediate-only region r41 to r85 can be accomplished with these seven correction values.

First, when looking at the above-mentioned periodicity of the change of the nozzles forming the raster lines shown in FIG. 21 and FIG. 21B, it can be seen that in the intermediate-only region r41 to r85 formed only through the first intermediate processing mode, the numbers of the nozzles forming these raster lines form one periodic cycle of #2, #4, #6, #1, #3, #5 and #7 in the carrying direction. That is to say, this cycle is repeated six and a half times in the carrying direction over the intermediate-only region r41 to r85.

On the other hand, the darkness non-uniformities are mainly caused by changes of the spacing among adjacent raster lines in the carrying direction, and the state of this spacing depends on the combination of nozzles forming those adjacent raster lines, as noted above. That is to say, for the same combinations of nozzles, substantially the same darkness non-uniformities occur, and also the same correction values can be applied if they inhibit the same darkness non-uniformities. Thus, if the nozzles forming the raster lines change periodically in the carrying direction, then a darkness correction can be achieved by using the correction values of the cycle serving as a basic period thereof and repeatedly correlating them successively with the raster lines of the image to be printed. Accordingly, the printer 1 of this first embodiment stores the seven correction values making up a set of one cycle in the memory 63, as shown in FIG. 39B, and when performing the actual printing of an image in Step S140 of FIG. 26, the correction values of this one set are repeatedly correlated successively with the raster lines of the image to perform the darkness correction, thus achieving the same darkness correction as with the second reference example.

The following are some additional explanations regarding the darkness correction by repeatedly using this one set of correction values. As in the second reference example, this darkness correction is performed in the halftone processing of Step S144 in FIG. 36. FIG. 37 shows an array of pixel data for K image data, as representative CMYK image data to be processed; the $41^{st}$ to $85^{th}$ pixel data rows in the K image data correspond to the data of the intermediate-only region that is printed only through the first intermediate processing mode. Consequently, this darkness correction is performed by correcting the pixel data of the pixel data rows by correlating the seven correction values successively starting with the low numbers of the pixel data rows. More specifically, the $41^{st}$ pixel data row is corrected by the correction value of the first record in the correction value table (FIG. 39B) for the first intermediate processing mode. The following $42^{nd}$ pixel data row is corrected by the correction value of the second record. And the then following $43^{rd}$ to $47^{th}$ pixel data rows are corrected by correlating them successively with the correction values from the third record to the seventh record, thus completing the darkness correction of the pixel data rows for one set of seven rows. Then, this darkness correction for one set is repeated for the $48^{th}$ to $85^{th}$ pixel data rows, thus completing the darkness correction.

Incidentally, like in the second reference example, the correction values for one set are obtained by measuring the darkness of a correction pattern CP for each raster line individually.

Figure 40:
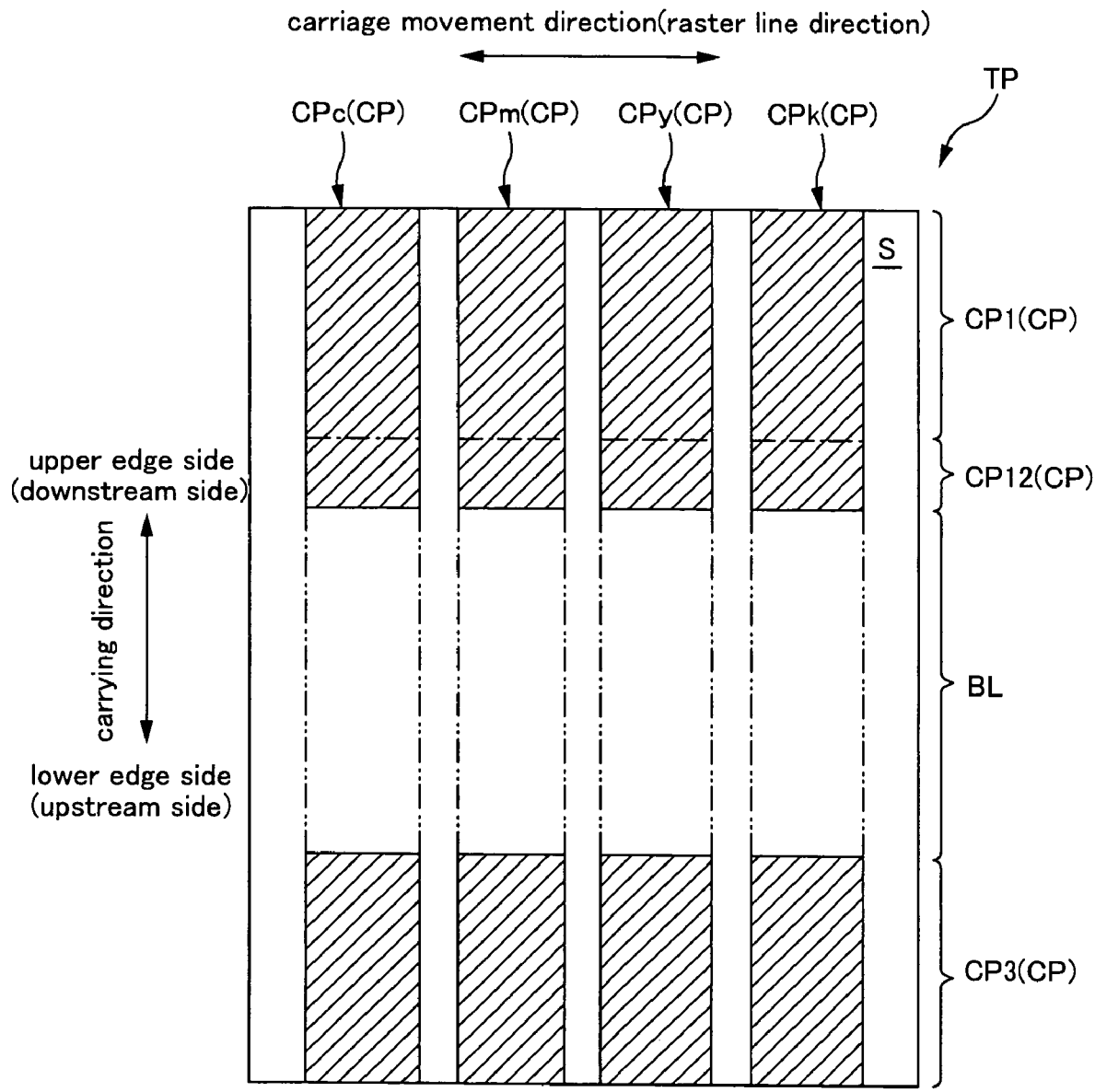
FIG. 40 shows an example of correction patterns according to the first embodiment printed on paper.

FIG. 40 shows correction patterns CP according to the first embodiment printed on paper. Hereinafter, the black (K) correction pattern CPk is described as representative of the correction patterns CPc, CPm, CPy and CPk of the ink colors C, M, Y and K, but the same is true for the other ink colors.

Figure 41A:
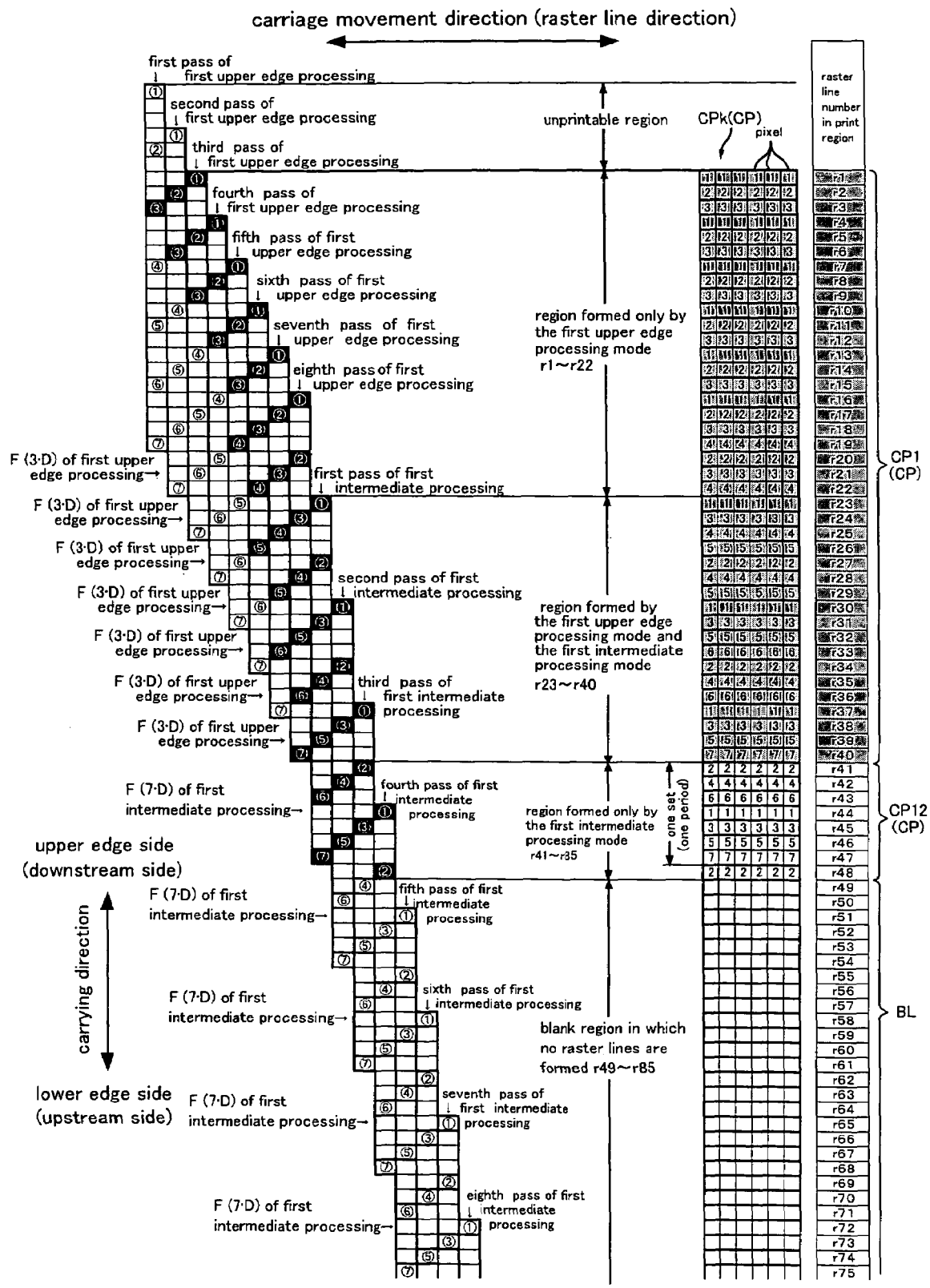
FIG. 41A is a diagram showing by which of the nozzles the raster lines constituting the correction pattern according to the first embodiment are formed.
Figure 41B:
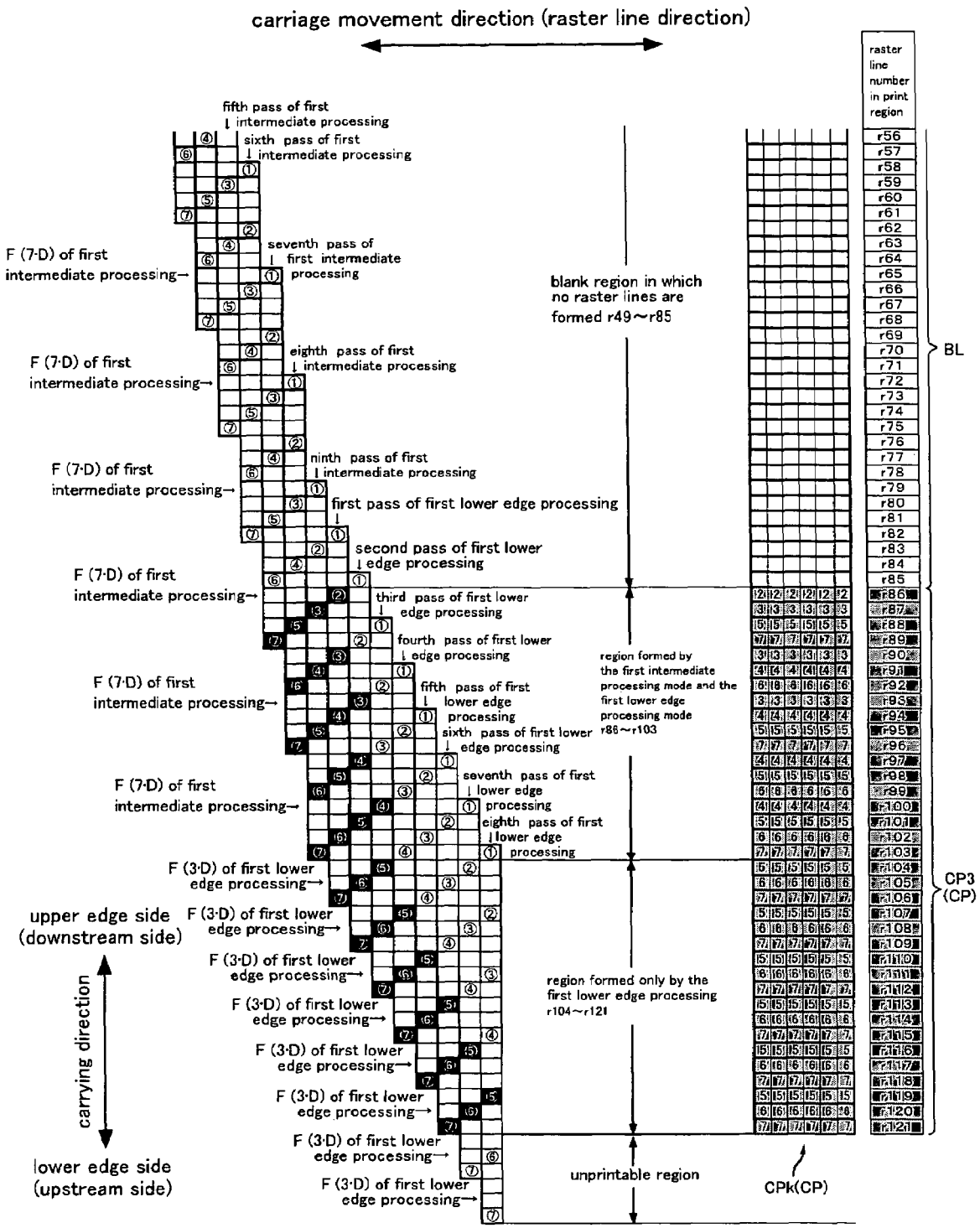
FIG. 41B is a diagram showing by which of the nozzles the raster lines constituting the correction pattern according to the first embodiment are formed.

FIG. 41A and FIG. 41B show by which nozzle the raster lines constituting the first upper edge correction pattern CP1, the first intermediate correction pattern CP12 and the first lower edge correction pattern CP3 in this correction pattern CPk are formed. It should be noted that the format of FIG. 41A and FIG. 41B is the same as that of FIG. 29A and FIG. 29B shown above. That is to say, the left diagrams show the relative positions of the nozzle rows to the paper in the various passes in each processing mode, and in these nozzle rows, the nozzles marked in black eject ink, whereas the nozzle left white do not eject ink. The right diagrams show how dots are formed by ejecting ink toward the pixels of each raster line constituting the correction patterns CP1, CP12 and CP3. The numbers in the squares indicate the nozzle number ejecting ink toward that pixel, and squares not containing a number indicate pixels onto which no ink is ejected.

As shown in FIG. 40, like the first intermediate correction pattern CP2 of the second reference example shown in FIG. 28, the first intermediate correction pattern CP12 in the correction pattern CPk for black (K) is located between the first upper edge correction pattern CP1 and the first lower edge correction pattern CP3, and is formed in continuation with the lower edge of the first upper edge correction pattern CP1.

However, the correction pattern CP12 according to this first embodiment is made only of eight raster lines for substantially one period, so that between the correction pattern CP12 and the first lower edge correction pattern CP3, there is a blank region BL in which the correction pattern CP is not formed. More specifically, as shown in the right diagram of FIG. 41, the correction pattern CP12 is made of eight raster lines r41, r42, . . . r48 lined up consecutively in the carrying direction, and each of these raster lines is formed by one of the nozzles #2, #4, #6, #1, #3, #5, #7 and #2. Thus, the order of these nozzles is the same as in the above-noted cycle.

Then, the darkness of each of the raster lines r41, r42, r47 is measured with the scanner 100 in Step S122 in FIG. 27, and the measurement values are recorded in the recording table for the first intermediate processing mode. Then, in Step S123, the respective correction values are determined in accordance with these measurement values, and thus seven correction values are stored in the correction value table. More specifically, the correction value determined from the darkness measurement value of the raster line 41 formed by the nozzle #2 is recorded in the first record of the correction value table for the first intermediate processing mode in FIG. 39B, and the correction values determined from the darkness measurement value of the raster lines r42, r43, r44, r45, r46, and r47 formed by the nozzles #4, #6, #1, #3, #5 and #7 are recorded successively in the second to seventh records.

It should be noted that in the first embodiment, even though one set of correction values contains seven correction values, the first intermediate correction pattern CP12 further includes the raster line r48 formed by the nozzle #2 in the next period in addition to the seven raster lines r41, r42, r43, r44, r45, r46 and r47 corresponding to one set. This is because the measurement of the darkness of the raster line 47 formed by the nozzles of the one set is influenced by the spacing to the adjacent raster lines r46 and r48 preceding and following it in the carrying direction. Thus, with this correction pattern CP12 including the raster line r48, the correction value stored in the seventh record can be determined more accurately.

Referring to FIG. 41A and FIG. 41B, the following is an explanation of a process for forming the correction pattern CPk including the first intermediate correction pattern CP12 according to this first embodiment. It should be noted that, as in the second reference example described above, this correction pattern CPk is formed in Step S121 in FIG. 27.

As becomes clear from comparing FIGS. 29A and 29B with FIGS. 41A and 41B, the difference between the correction pattern CPk of the first embodiment and the correction pattern CPk of the second reference example described above is that the region r49 to r85 in the first intermediate correction pattern CP2 in the second reference example is turned into a blank region BL in which no raster lines are formed.

Consequently, the printing operation for forming the correction pattern CPk according to the first embodiment is obtained by adding an operation of not forming any raster lines in the region r49 to r85, to the printing operation for forming the correction pattern CPk described for the second reference example.

That is to say, the nozzles of the passes responsible for the region r49 to r85 serving as the blank region BL are the nozzles #6 and #7 of the second pass, the nozzles #4 to #7 of the third pass, the nozzles #3 to #7 of the fourth pass, all nozzles of the fifth and the sixth pass, the nozzles #1 to #6 of the seventh pass, the nozzles #1 to #4 of the eighth pass and the nozzles #1 and #2 of the ninth pass of the first intermediate processing mode. Consequently, while no ink is ejected from those nozzles in these passes, the nozzles of the other passes carry out the same printing operation as for the correction pattern CPk of the second reference example, thus forming the correction pattern CPk according to this first embodiment.

As explained above, a plurality of raster lines (lines) constituted by a plurality of dots running in the carriage movement direction can be printed in the carrying direction by repeatedly carrying out a dot formation operation of forming dots on the paper S by ejecting ink from a plurality of nozzles moving in the carriage movement direction (predetermined movement direction) onto the paper S (medium) shown in FIG. 40 and a carrying operation of carrying the paper S in a carrying direction (intersecting direction) that intersects with the carriage movement direction, thus forming a first intermediate correction pattern CP12 for determining the correction values for the darkness correction of each of the raster lines that is carried out when printing the image in the first intermediate processing mode (predetermined processing mode) and a blank region BL (blank) adjacent to this correction pattern CP12 in the carrying direction. Here, the first intermediate correction pattern CP12 for the first intermediate processing mode in which printing is performed in such a manner that the nozzles forming the raster lines of the printed image periodically change with respect to the carrying direction includes the raster lines r41, r42, r43, r44, r45, r46 and r47 for at least one period of changing nozzles, as shown in FIG. 41A.

Second Embodiment

FIG. 42A to FIG. 42C show correction value tables according to the second embodiment. In the above-described first embodiment, the darkness correction was carried out by using one set of seven correction values (corresponding to one period) in repetition, as shown in FIG. 39B. The second embodiment differs in that one set of fourteen correction values (corresponding to two periods) is used in repetition, as shown in FIG. 41B. Moreover, this second embodiment can effectively inhibit darkness non-uniformities in the case of so-called bidirectional printing, that is, in the case that dot formation operations are carried out in both the forward pass and the return pass of the carriage movement.

The reason for this is that in the case of bidirectional printing, the spacing between adjacent raster lines is affected not only by the combination of the nozzles forming those adjacent raster lines, but also by whether these raster lines are formed in a forward pass or in a return pass. Consequently, the periodicity of the change in the spacings when differentiating between forward and return passes becomes apparent at twice the aforementioned period. This is explained further below.

Figure 43:
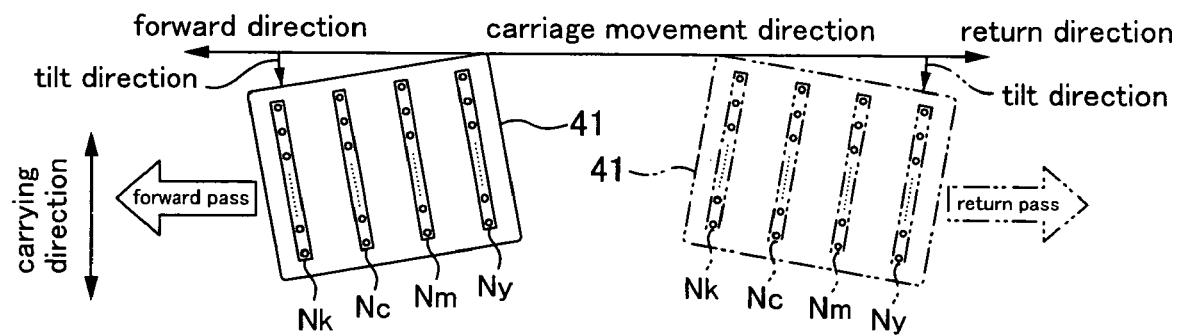
FIG. 43 is a diagram illustrating an example of the reason why the spacing between raster lines differs depending on forward pass and return pass in bidirectional printing.

One example of the factors causing the difference in spacings between forward pass and return pass is that, as shown in FIG. 43, the tilt direction of the carriage 42 with respect to the carriage movement direction differs between forward pass and return pass. In the return pass, even when trying to form raster lines at the same target positions using the same nozzles as in the forward pass, the raster lines are formed at positions that are shifted with respect to the carrying direction, due to differences in the tilt, so that the spacing between adjacent raster lines will not be the same.

Figure 44:
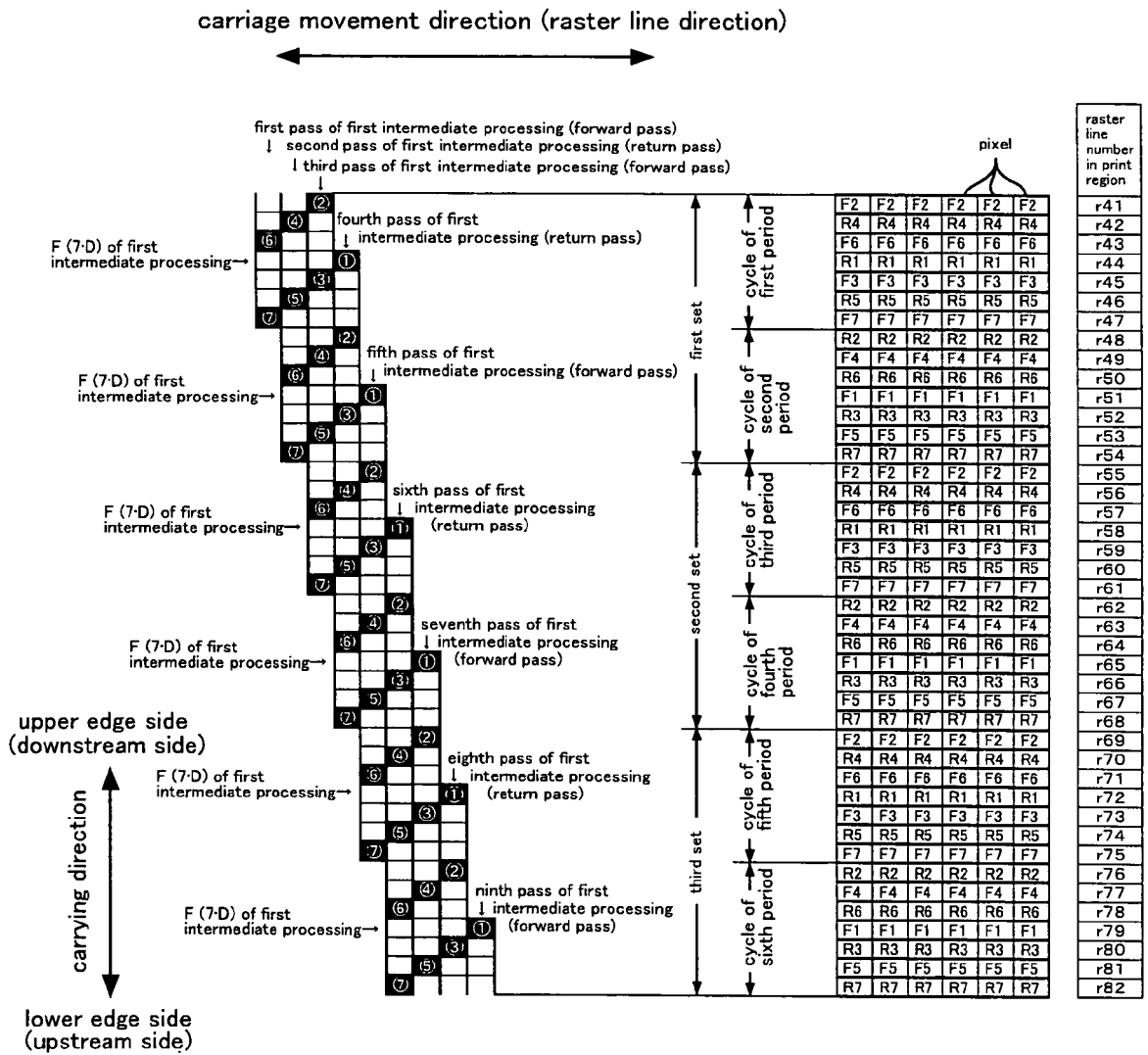
FIG. 44 is an explanatory diagram showing how an image is formed by bidirectional printing.

Referring to FIG. 44, the following is a discussion of the periodicity of the change of the nozzles with consideration to whether the raster lines are formed in the forward pass or in the return pass. It should be noted that FIG. 44 is an explanatory diagram showing how an image is formed in bidirectional printing, and shows the portion of the intermediate-only region r41 to r85 in the same format as FIG. 21A and FIG. 21B above. That is to say, the left diagram shows the relative positions of the nozzle row with respect to the paper in each pass, and the right diagram shows how dots are formed in the pixels constituting each raster line. The square boxes in the right diagram represent pixels, and the letters "F" and "R" in the square boxes indicate whether the dots are formed in a forward pass or a return pass. The numbers next to those letters indicate the nozzle number with which the dot is formed.

As can be seen by comparison with the left diagram, the nozzles ejecting ink in each pass of the first intermediate mode and the carry amount of the carrying operation performed between consecutive passes are the same as in the first embodiment. Consequently, as shown in the right diagram, the combinations of nozzles forming adjacent raster lines are the same as in the first embodiment, and a cycle having #2, #4, #6, #1, #3, #5 and #7 as one period is repeated along the carrying direction.

But as shown in the left diagram, due to the fact that the second embodiment employs bidirectional printing, movements in the forward direction and movements in the return direction are alternated for each pass. For example, as shown in the left diagram, odd-numbered passes such as the first and the third passes of the first intermediate processing mode are forward passes, whereas even-numbered passes such as the second and the fourth passes are return passes. Due to this, the combinations of forward pass and return pass become opposite for a pair of raster lines formed with the same nozzles, depending on whether they are printed in a cycle of an odd-numbered period or in a cycle of an even-numbered period in the intermediate-only region r41 to r85 shown in the right diagram. For example, the first raster line r41 in the cycle of the first period and the first raster line r48 in the cycle of the second period are both formed by the nozzle #2, but the former is formed in a forward pass, whereas the latter is formed in a return pass, so that their formation directions are opposite to each other. This reversal continues to the last raster lines r47 and r53 in these cycles.

That is to say, the cycle of the first period and the cycle of the second period are the same in terms of the combination of nozzles, but are different in terms of the combinations of forward pass and return pass. Therefore, there is the possibility that the state of the spacing between the raster lines is different in these cycles, and it is therefore appropriate to consider them as different cycles. Accordingly, considering the periodicity with regard to the combinations of forward pass and return pass, a cycle of an odd-numbered period should be combined with an adjacent cycle of an even-numbered period to one set. Thus, in the second embodiment, in which bidirectional printing is performed, fourteen correction values for two adjacent periods are used as one set, as shown in the correction value table in FIG. 42B.

Figure 45A:
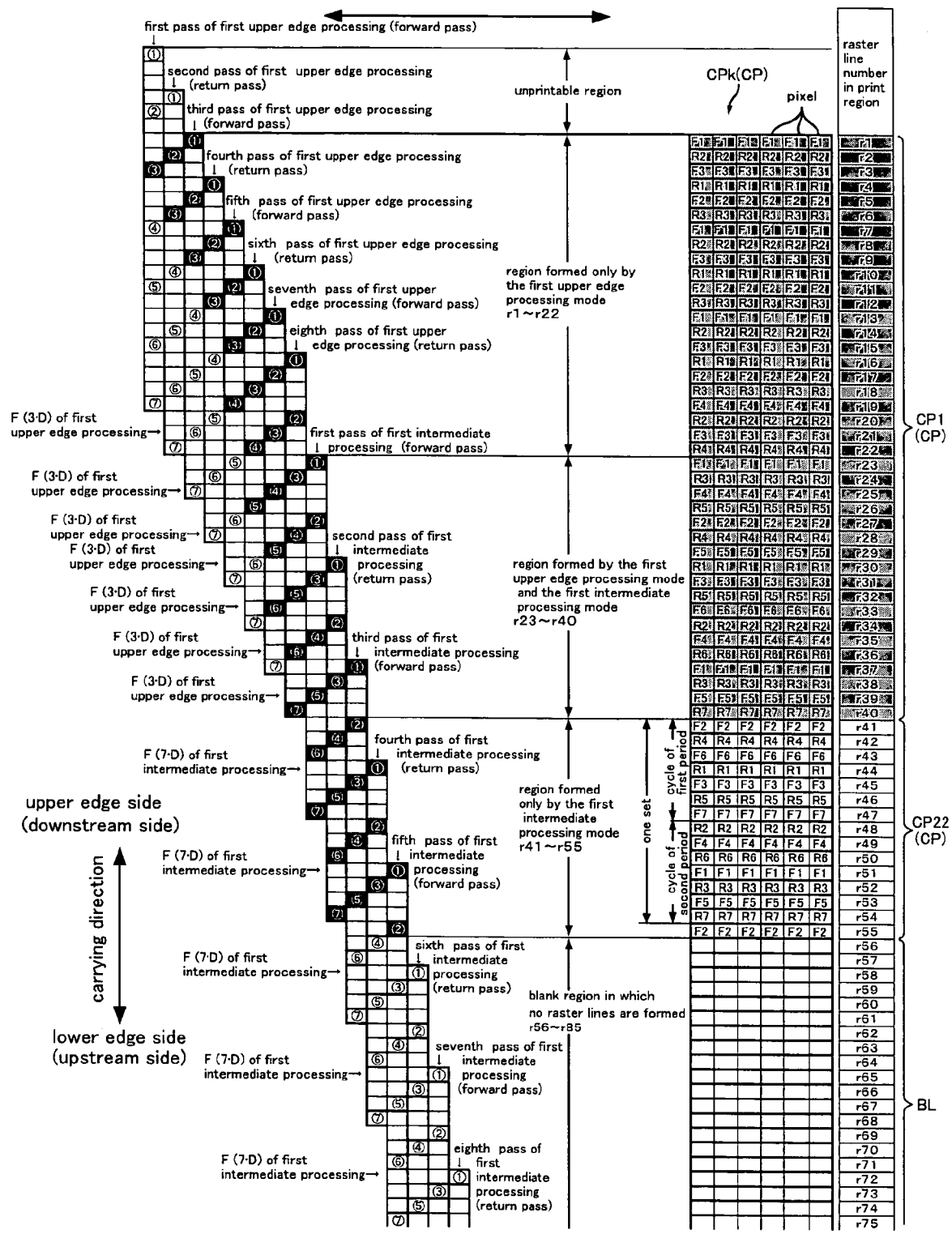
FIG. 45A is a diagram showing by which of the nozzles the raster lines constituting the correction pattern according to the second embodiment are formed.
Figure 45B:
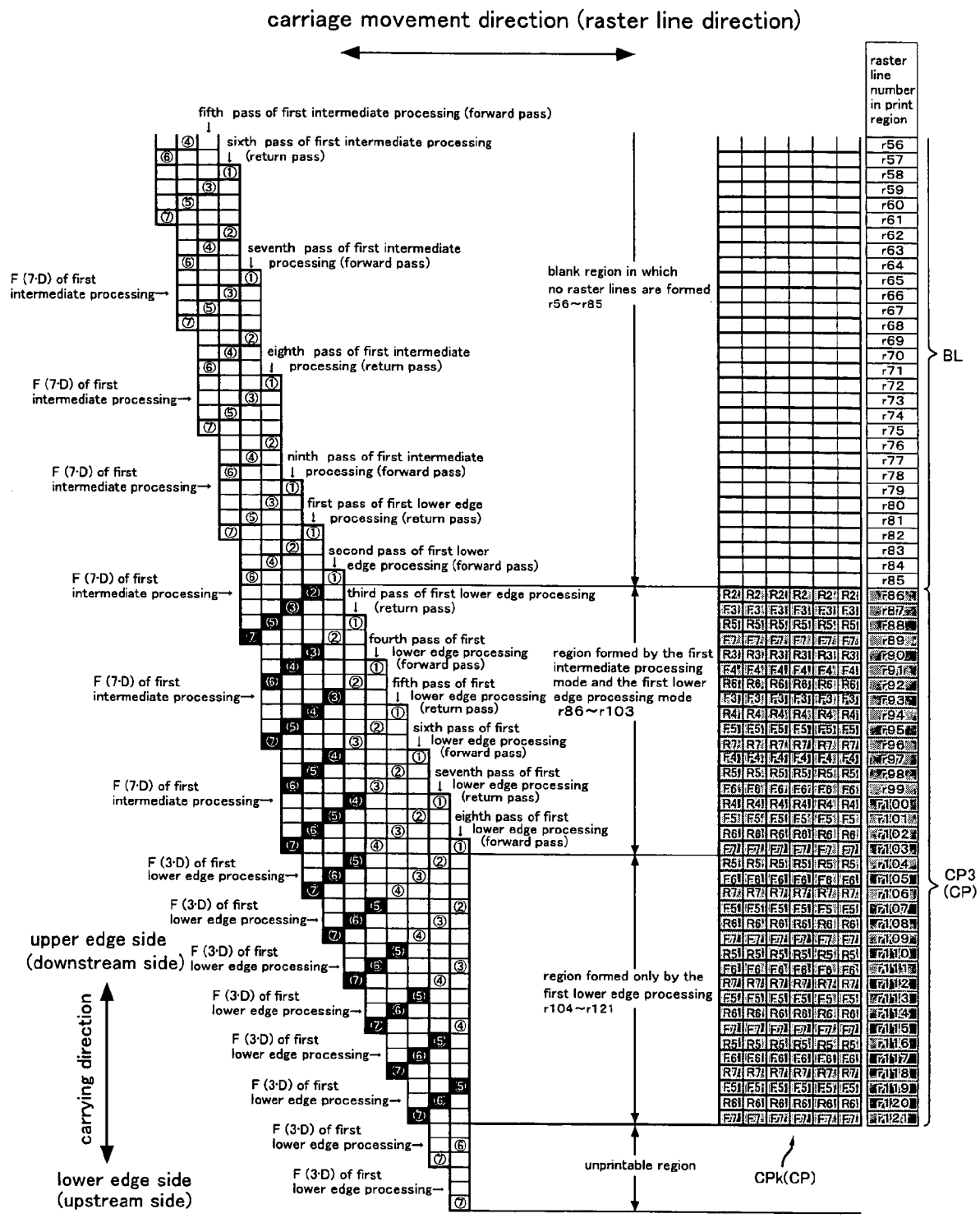
FIG. 45B is a diagram showing by which of the nozzles the raster lines constituting the correction pattern according to the second embodiment are formed.

Referring to FIG. 45A and FIG. 45B, the following is an explanation of a correction pattern CPk according to the second embodiment. It should be noted that FIGS. 45A and 45B are shown in the same format as FIGS. 41A and 41B, but in the grid representing the pixels in the right diagram, the letters "F" and "R" indicate whether the dots are formed in a forward pass or a return pass, and the numbers next to those letters indicate the nozzle number with which the dot is formed.

As noted above, the second embodiment differs from the first embodiment in that the number of correction values in one set for the first intermediate processing mode is fourteen, which corresponds to two cycles. Accordingly, the first intermediate correction pattern CP22 according to the second embodiment differs mainly in that it is made of fifteen raster lines, which correspond to substantially two periods, so that fourteen correction values can be obtained. Thus, the following explanation is mainly regarding this difference, and other aspects are not discussed, since they are the same as for the correction pattern CP of the first embodiment.

As shown in FIG. 45A and FIG. 45B, as in the first embodiment, the first intermediate correction pattern CP22 for the correction pattern CPk for black (K) is formed in continuation with the lower edge of the first upper edge correction pattern CP1, whereas a blank region BL is formed between the first intermediate correction pattern CP22 and the first lower edge correction pattern CP3.

However, it should be noted that due to the fact that the second embodiment employs bidirectional printing, the correction patterns CP1, CP22 and CP3 according to this second embodiment are formed by alternating forward passes and return passes in each pass of the first upper edge processing mode, the first intermediate processing mode and the first lower edge processing mode. Since it is necessary to determine the fourteen correction values, in which the two periods are taken as one set, from the first intermediate correction pattern CP22, the first intermediate correction pattern CP22 is made of the fifteen raster lines r41, r42, . . . r55 lined up consecutively in the carrying direction, in correspondence to this one set. It should be noted that the reason why the raster line r55 is formed, resulting in fifteen and thus one line more than necessary for fourteen correction values, is the same as the reason for forming the raster line r48 in the above-described first embodiment.

Then, the darkness of each of the raster lines r41, r42, r54 is measured with the scanner 100, and the measurement values are recorded in the recording table for the first intermediate processing mode. Then, the respective correction values are determined from these measurement values, and thus fourteen correction values are recorded in the correction value table. More specifically, the correction value determined from the darkness measurement value of the raster line 41 is recorded in the first record of the correction value table for the first intermediate processing mode in FIG. 42B, and the correction values determined from the darkness measurement values of the raster lines r42, r43, . . . r54 are recorded successively in the second to fourteenth record.

Figure 46A:
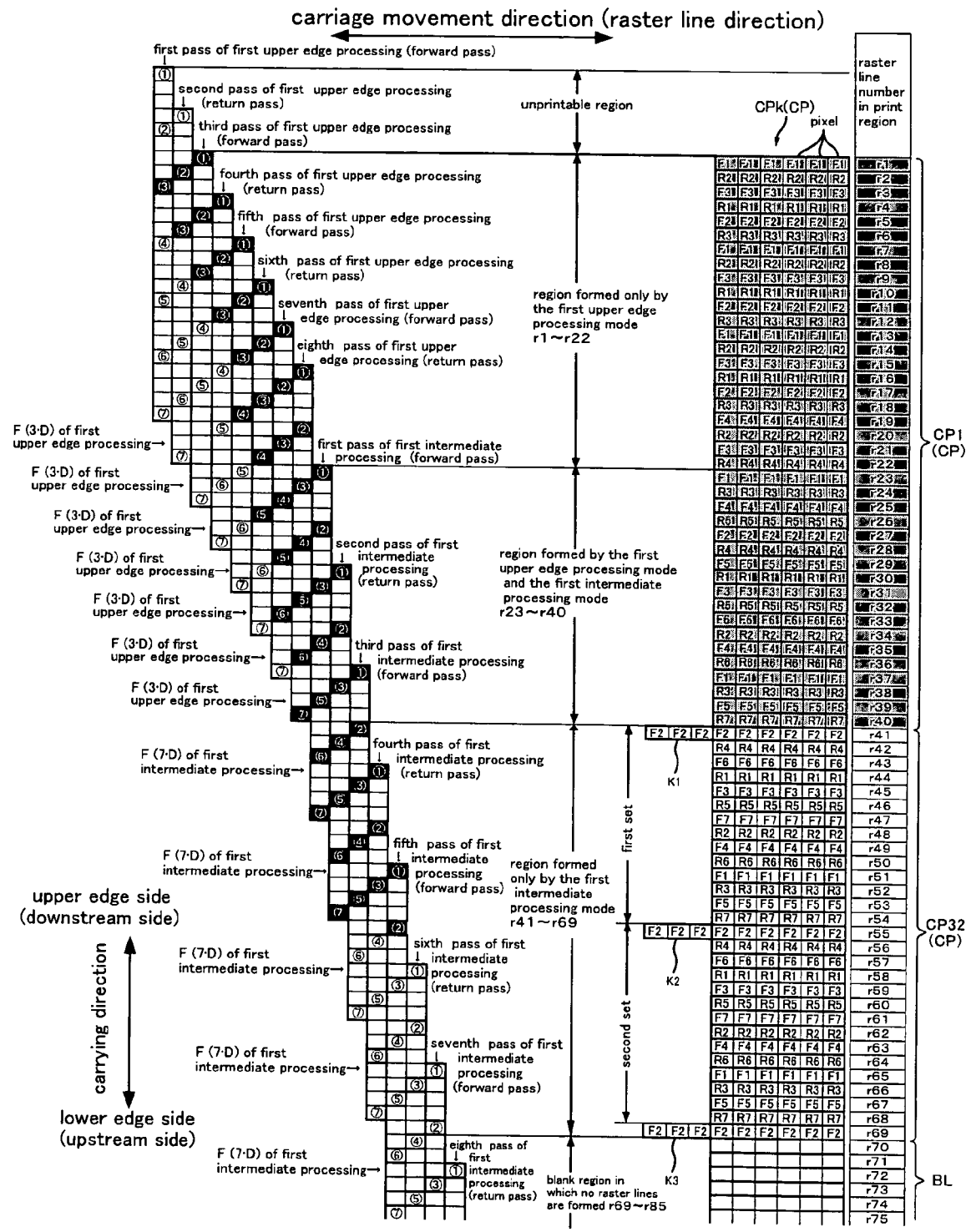
FIG. 46A is a diagram illustrating a modified example of the correction pattern according to the second embodiment and shows by which of the nozzles the raster lines constituting the correction pattern are formed.
Figure 46B:
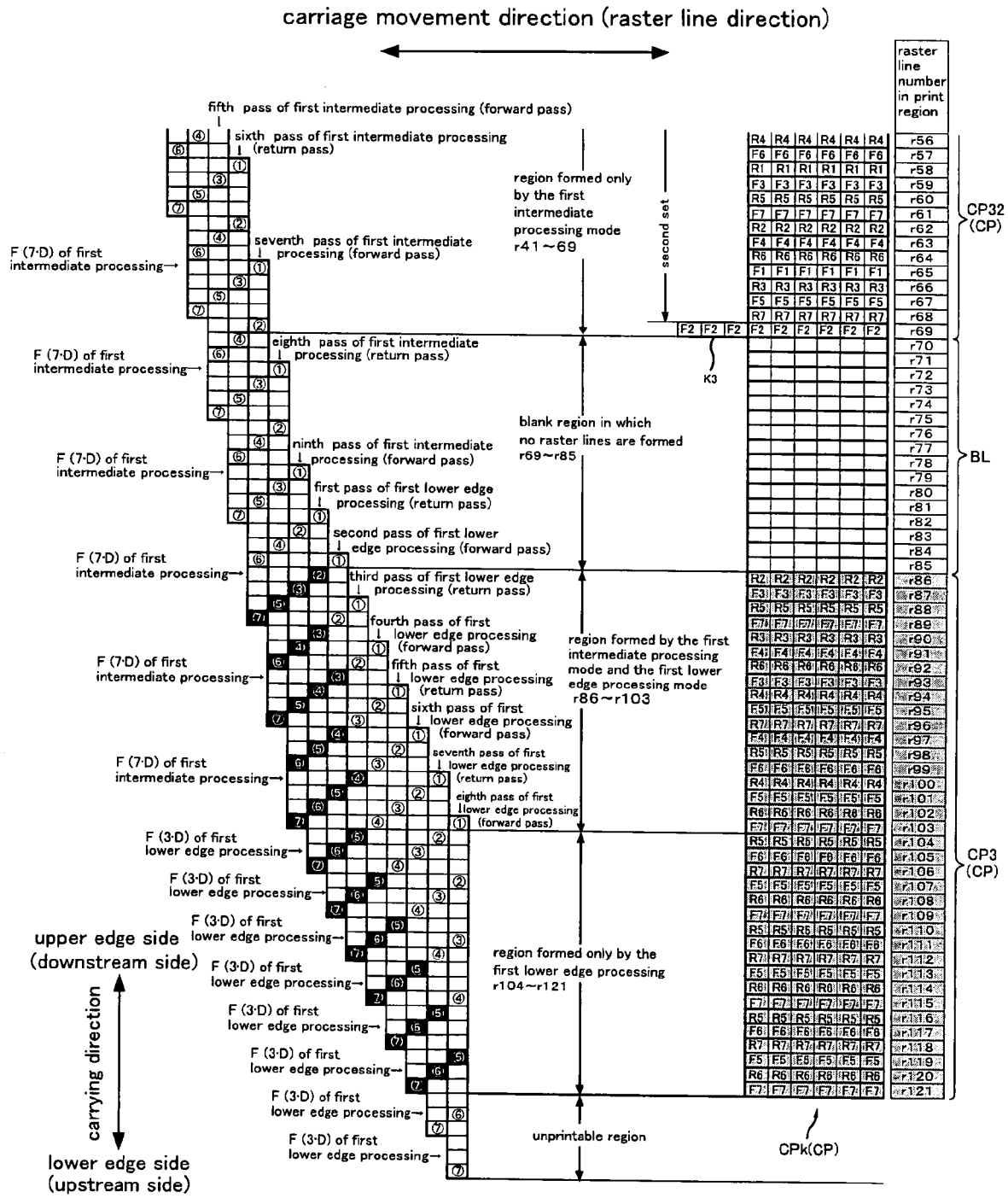
FIG. 46B is a diagram illustrating a modified example of the correction pattern according to the first embodiment and shows by which of the nozzles the raster lines constituting the correction pattern are formed.

FIGS. 46A and 46B show a modified example of the first intermediate correction pattern CP according to the second embodiment. The first intermediate correction pattern CP22 according to the second embodiment is made of fifteen raster lines r41, r42, . . . r55 corresponding to substantially one set, whereas the first intermediate correction pattern CP32 according to this modified example differs in that it is made of 29 raster lines r42, r42, . . . r68 corresponding to substantially two sets. With this modified example, the correction values for one set can be determined by averaging over the raster lines of substantially two sets, so that the accuracy of the correction values of this one set can be increased.

That is to say, as shown in FIG. 46A, the fourteen raster lines of the first set are formed in the region r41 to r54 and the fourteen raster lines of the second set are formed in the subsequent region r55 to r67 of the first intermediate correction pattern CP32, that is, the raster lines for two sets are formed. In the first set and the second set, the raster lines with the same numbers counting from the top of each set correspond to each other, and for these corresponding raster lines, the combination of forward pass and return pass as well as the combination of nozzles are the same.

Consequently, with this correction pattern CP32, it is possible to average the measurement values of the darkness of the corresponding raster lines in the first set and the second set and to determine a correction value for these raster lines from this average value. Thus, it is possible to increase the accuracy of the fourteen correction values, which correspond to one set.

The following is an explanation of the reason why it is preferable to take an average in the manner described above. As shown in FIG. 46A, for example the raster line r41 of the first set and the raster line r55 of the second set which is one set away therefrom are both formed by the nozzle #2 in a forward pass, and also the combination of nozzles forming the adjacent raster lines is the same. Consequently, the same darkness measurement value should be obtained in theory. However, when printing the correction pattern CP32, there is the possibility of discrepancies in the carry amount caused, for example, by eccentricities in the carry roller 23, so that even when the combination of nozzles is the same, the spacing between the raster lines may be different. In this case, also the measurement values deviate from the true values, and an accurate correction value cannot be attained with one darkness measurement value.

To address this problem, this modified example averages the measurement values of the raster lines of the first set and the measurement values of the raster lines of the second set corresponding to these raster lines, thus determining the correction value for each raster line. It should be noted that the number of sets is not limited to two, and with regard to an increased accuracy due to the averaging, a large number is preferable.

Also, as shown in FIG. 46A, it is further preferable to form guide lines K1, K2, . . . Kn extending in the carriage movement direction that correspond to one of the raster lines at either end in the carrying direction of each set in the first intermediate correction pattern CP32. These guide lines K1, K2, . . . Kn serve as a mark indicating the boundary of each set. In the example shown in the drawing, three guide lines K1, K2 and K3 are formed on the side of the correction pattern CP32 by extending in the carriage movement direction the raster lines r41, r55 and r69 at the starting edge of each set.

Using these guide lines K1, K2 and K3, when measuring the darkness of the raster lines with the scanner 100 of FIG. 30A and FIG. 30B, the darkness corresponding to the raster lines can be measured accurately even when there is a discrepancy, with respect to the movement direction of the reading carriage 104, of the position at which its reading carriage 104 measures the darkness. This can be achieved as follows.

The reading carriage 104 monitors its own position in the movement direction through the count value of the position sensor of an encoder or the like. Based on this count value, the reading carriage 104 measures the darkness at a measurement pitch in accordance with the reading resolution.

For example, if the reading resolution is set to the same value as the print resolution of the raster lines, then the measurement pitch should, in theory, be the same as the pitch at which the raster lines are formed. Consequently, the number of measurements for one set is fourteen, just like the number of raster lines in this one set, and each measurement value corresponds precisely to one raster line, so that it should be possible to accurately measure the darkness of each raster line.

However, if there is a discrepancy in the position sensor, the reading carriage 104 will perform measurement at a measurement pitch that is different from the formation pitch, and thus for example eighteen measurements may be performed in one set. In this case, the measurement values will indicate the darkness at positions that deviate from the formation target positions of the raster lines in accordance with the formation pitch, so that they will not accurately indicate the darkness corresponding to the raster lines.

Here, the correction pattern CP32 shown in FIG. 46A includes the guide lines K1, K2 and K3 for example, so that it is possible to ascertain the extent of the discrepancy of the position sensor from the number of darkness measurements performed between detecting a pair of adjacent guide lines and the number of raster lines that are to be measured. For example, if the number of measurements between the guide line K1 and the guide line K2 is eighteen as noted above, then it can be concluded from this that the discrepancy of the position sensor is such that the measurement pitch is by a factor $18/14$ larger than the raster line formation pitch.

Thus, a darkness measurement with accurate correspondence to the raster lines can be carried out by re-measuring the darkness of the raster lines of the first set between the pair of guide lines K1 and K2, and adjusting the measurement pitch by, for example, correcting the output value of the position sensor by multiplying it with a factor of $14/18$ during the re-measurement.

Other Embodiments

The above embodiment was written primarily with regard to a printer, but the above embodiment of course also includes the disclosure of a printing apparatus, a printing method, and a printing system, for example.

Also, a printer, for example, serving as an embodiment was described above. However, the foregoing embodiment is for the purpose of elucidating the present invention and is not to be interpreted as limiting the present invention. The invention can of course be altered and improved without departing from the gist thereof and includes equivalents. In particular, the embodiments mentioned below are also included in the invention.

<Regarding the Printer>

In the above embodiments a printer was described, however, there is no limitation to this. For example, technology like that of the present embodiments can also be adopted for various types of recording apparatuses that use inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices. Also, these methods and manufacturing methods are within the scope of application.

<Regarding the Ink>

Since the foregoing embodiment was an embodiment of a printer, a dye ink or a pigment ink was ejected from the nozzles. However, the ink that is ejected from the nozzles is not limited to such inks.

<Regarding the Nozzles>

In the foregoing embodiment, ink was ejected using piezoelectric elements. However, the mode for ejecting ink is not limited to this. Other methods, such as a method for generating bubbles in the nozzles through heat, may also be employed.

<Regarding the Print Modes>

The interlaced mode was described as an example of the print mode in the above embodiments, but the print mode is not limited to this, and it is also possible to use the overlap mode described using FIG. 16A and FIG. 16B. That is to say, the idea of reducing the number of correction values through utilization of the periodicity of the change of the nozzles as in the first embodiment can also be applied in the case of the overlap mode. Referring to the example in FIG. 47, the following is an explanation of the reason why this idea can be applied.

Figure 47:
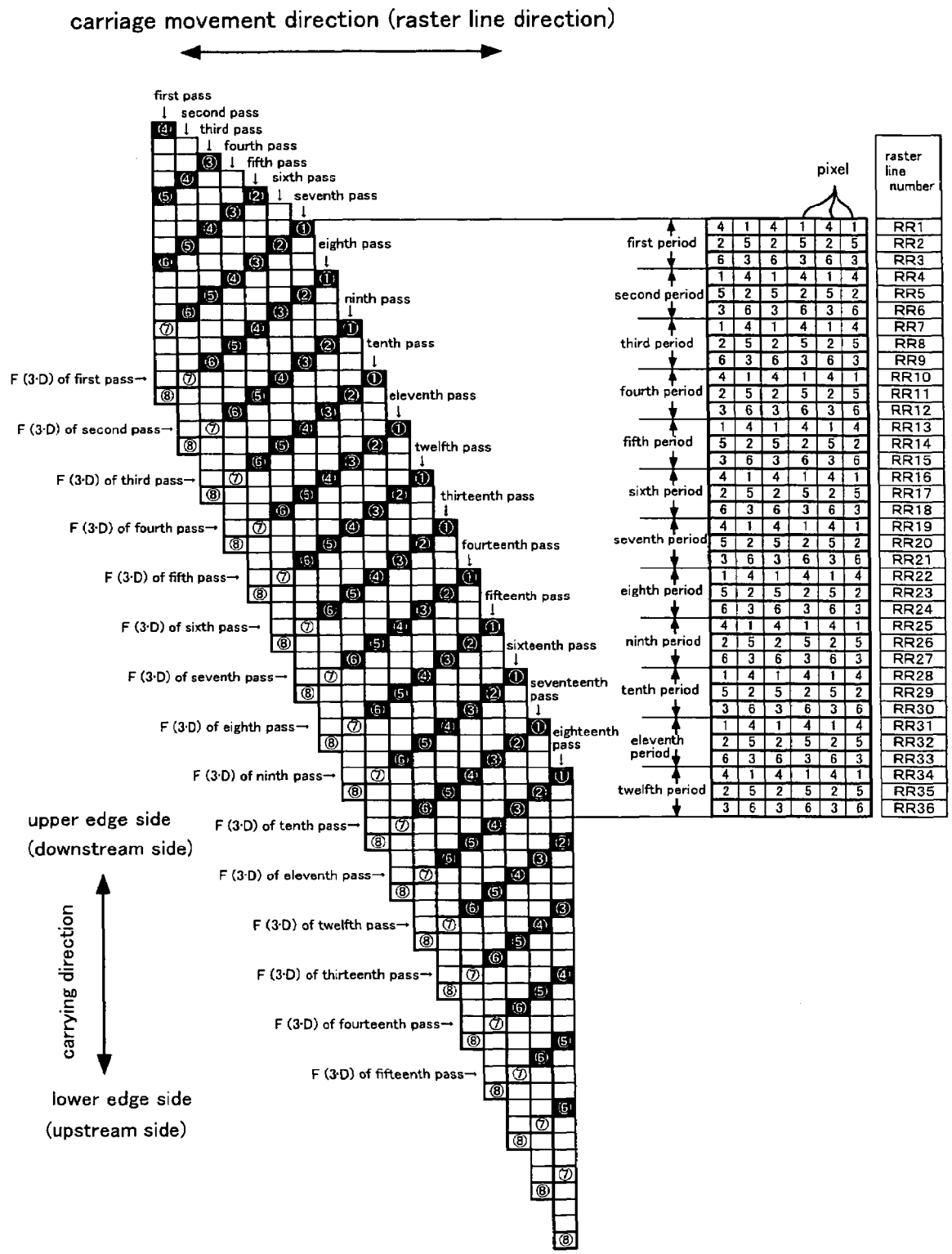
FIG. 47 is a diagram illustrating the process of forming raster lines in the overlap mode.

FIG. 47 is a diagram showing the process of forming raster lines in the overlap mode in the same format as FIG. 44. With the overlap mode, a single raster line is formed with two or more nozzles, as noted above. It should be noted that the conditions for the overlap mode in FIG. 47 are the same as the conditions explained before with reference to FIGS. 16A and 16B, that is, the number of nozzles ejecting ink droplets is N=6, the nozzle pitch is k·D=4·D, the overlap number is M=2, and the carry amount is F (=(N/M)·D)=3·D (constant).

First, a simple explanation of the process for forming raster lines in this overlap mode is given with reference to FIG. 47: Since the overlap number M in this embodiment is 2, the raster lines are formed by ejecting ink droplets from different nozzles in different passes onto the even-numbered pixels and the odd-numbered pixels of each raster line.

For example, the first raster line RR1 is formed by the nozzle #4 in the third pass and the nozzle #1 in the seventh pass, the second raster line RR2 is formed by the nozzle #5 in the second pass and the nozzle #2 in the sixth pass, the third raster line RR3 is formed by the nozzle #6 in the first pass and the nozzle #3 in the fifth pass, and the fourth raster line RR4 is formed by the nozzle #4 in the fourth pass and the nozzle #1 in the eighth pass, thus forming consecutive raster lines.

That is to say, in order to form consecutive raster lines from the first to the fourth raster line, eight passes from the first pass to the eighth pass are required, and raster lines are formed consecutively in the carrying direction by repeating these eight passes.

Looking in particular at the raster lines RR1, RR2, ... RR6 of the raster lines that are formed by repeating these eight passes, it can be seen that the first raster line RR1 and the fourth raster line RR4, which is three lines away from this first raster line RR1, are both formed by the nozzle combination #1 and #4. The second raster line RR2 and the fifth raster line RR5, which is three lines away from this second raster line RR2, are both formed by the nozzle combination #2 and #5. And the third raster line RR3 and the sixth raster line RR6, which is three lines away from this third raster line RR3, are both formed by the nozzle combination #3 and #6. These combinations of nozzles continue in this manner from the seventh raster line RR7 onward.

That is to say, the order of the nozzle combinations forming one raster lines forms a cycle in which one period is given by #1-#4, #2-#5 and #3-#6, and this cycle is repeated in the carrying direction.

Consequently, it can be seen that the idea of reducing the number of correction values by utilizing the periodicity of the change of the nozzles that was used for the interlaced mode of the first embodiment can also be applied to the overlap mode.

It should be noted that the above example of the overlap mode was for the case of recording with a constant carry amount F, but there is no limitation to this. That is to say, as long as the combinations of nozzles forming one raster lines change periodically with respect to the carrying direction, then the above-described idea can of course be applied, but it can also be applied in the case that recording is performed with irregular carrying in which the carry amount F of the paper changes periodically.

Figure 48:
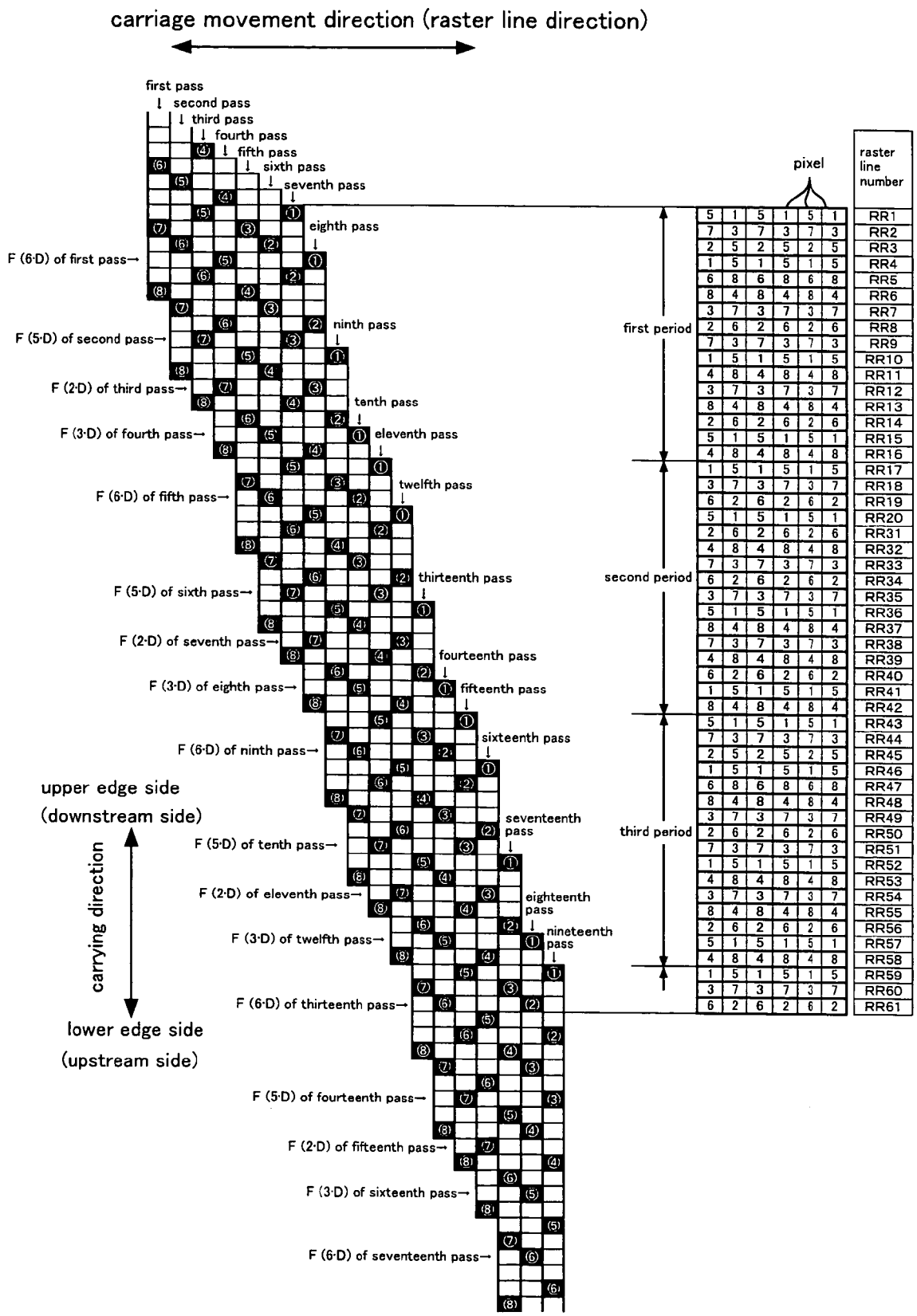
FIG. 48 is a diagram illustrating the process of forming raster lines in the overlap mode with irregular carrying.

FIG. 48 shows an example of such irregular carrying. As shown in the left diagram, in this irregular carrying, a cycle of carrying operations in which one period of carry amounts F is given by 5D, 2D, 3D and 6D is repeated in the carrying direction. Dot formation operations are performed (N=8) by using all nozzles #1 to #8 in between these carrying operations and thus raster lines with an overlap number of M=2 are formed over the carrying direction. It should be noted that the nozzle pitch k·D is 4·D.

The following is a discussion of the periodicity in the carrying direction of the combination of nozzles forming one raster line. The right diagram, which shows the combination of nozzles, shows that the raster lines formed by irregular carrying form a cycle having a period of sixteen raster lines lined up in the carrying direction.

More specifically, this cycle is made of a raster line formed by the nozzle combination of #1 and #5, a raster line formed by the nozzle combination of #3 and #7, a raster line formed by the nozzle combination of #2 and #6, a raster line formed by the nozzle combination of #1 and #5, a raster line formed by the nozzle combination of #2 and #6, a raster line formed by the nozzle combination of #4 and #8, a raster line formed by the nozzle combination of #3 and #7, a raster line formed by the nozzle combination of #2 and #6, a raster line formed by the nozzle combination of #3 and #7, a raster line formed by the nozzle combination of #1 and #5, a raster line formed by the nozzle combination of #4 and #8, a raster line formed by the nozzle combination of #3 and #7, a raster line formed by the nozzle combination of #4 and #8, a raster line formed by the nozzle combination of #2 and #6, a raster line formed by the nozzle combination of #1 and #5, and a raster line formed by the nozzle combination of #4 and #8.

Consequently, the order, in the carrying direction, of combinations of nozzles forming one raster lines is a cycle in which one period is given by the combination #1 and #5, the combination #3 and #7, the combination #2 and #6, the combination #1 and #5, the combination #2 and #6, the combination #4 and #8, the combination #3 and #7, the combination #2 and #6, the combination #3 and #7, the combination #1 and #5, the combination #4 and #8, the combination #3 and #7, the combination #4 and #8, the combination #2 and #6, the combination #1 and #5, and the combination #4 and #8. Thus, there is a periodicity in the carrying direction for the combination of nozzles. Therefore, the above-described idea of reducing the number of correction values by utilizing the periodicity of the change of nozzles can also be applied to irregular carrying.

<Regarding the Carriage Movement Direction in which Ink is Ejected>

In the foregoing embodiments, only in the explanations of the second embodiment it was stated that the carriage movement directions during which ink is ejected include both the forward pass and the return pass (bidirectional printing), whereas in the other embodiments, it was not mentioned whether the carriage movement direction during which ink is ejected is bidirectional or only a single direction of the forward pass (unidirectional printing), but in the foregoing embodiments, both bidirectional printing and unidirectional printing are possible.

<Regarding the Color Inks Used for Printing>

In the foregoing embodiments, examples of multicolor printing are described in which the four color inks cyan (C), magenta (M), yellow (Y), and black (K) are ejected onto the paper S to form dots, but the ink colors are not limited to these. For example, it is also possible to use other inks in addition to these, such as light cyan (pale cyan, LC) and light magenta (pale magenta, LM).

Alternatively, it is also possible to perform single-color printing using only one of the above-mentioned four colors.

<Other Considerations>

In the foregoing embodiments, the case of borderless printing, that is, the case of printing without a margin at the upper edge and the lower edge in the carrying direction of the paper has been explained as an example of upper edge and lower edge processing, but in the widest sense, upper edge and lower edge processing simply means processing that is applicable for printing an image at the upper edge and the lower edge. Consequently, it is also possible to carry out bordered printing with a margin at the upper edge and the lower edge, using this upper edge processing and lower edge processing. It should be noted that in this case, compared to the case that the upper edge processing and the lower edge processing shown in FIGS. 22A and 22B are not performed, it is possible to attain the operational effect that the non-printable region can be reduced, as shown in FIGS. 21A and 21B.

In the foregoing embodiments, the upper edge processing was explained as including a process of printing using only the nozzles #1 to #3 arranged in opposition to the groove 24a and a process of transitioning from this process to the intermediate process, but in the most narrow sense, each of these two processes can be defined as upper edge processing.

For example, in the example of borderless printing shown in FIG. 21A, it is possible to define only the process of the first four passes (first pass to fourth pass) of printing using only the nozzles #1 to #3 arranged in opposition to the groove 24a as upper edge processing in a narrow sense and to define the process of the last four passes (fifth to eighth passes) of transitioning from the upper edge processing to the intermediate processing while gradually increasing the number of nozzles used to #1 to #7 as upper edge transition processing.

Furthermore, in the case of bordered printing, it is possible to start printing without performing the processing of the first four passes and performing only the upper edge transition processing of the last four passes, and in this case, the upper edge transition processing can also be defined as upper edge processing in the narrow sense. With this upper edge processing, the operational effect of reducing the non-printable region can be attained. It should be noted that if the upper edge transition processing is defined as upper edge processing in the narrow sense, then the upper edge processing of the foregoing embodiments as shown in FIG. 21A can also be taken to include both upper edge processing for printing an image without margin (the processing of the first four passes) and upper edge processing for printing an image with a margin (the processing of the latter four passes).

Needless to say, these definitions can also be applied mutatis mutandis to the lower edge processing. That is to say, the lower edge processing of the foregoing embodiments was explained as including a process of printing using only the nozzles #5 to #7 arranged in opposition to the groove 24b and a process of transitioning to this process from the intermediate process, but in the most narrow sense, each of these two processes can be defined as lower edge processing.

For example, in the example of borderless printing shown in FIG. 21B, it is possible to define only the process of the last five passes (fourth pass to eighth pass) of printing using only the nozzles #5 to #7 arranged in opposition to the groove 24b as lower edge processing in the narrow sense and to define the process of the first three passes (first to third pass) of transitioning to the lower edge processing from the intermediate processing while gradually decreasing the number of nozzles used from #1 to #7 as lower edge transition processing.

Furthermore, in the case of bordered printing, it is possible to stop printing without performing the last five passes mentioned above and performing only the lower edge transition processing of the first three passes, and in this case, the lower edge transition processing can also be defined as lower edge processing in the narrow sense. With this lower edge processing, the operational effect of reducing the non-printable region can be attained. It should be noted that if the lower edge transition processing is defined as lower edge processing in the narrow sense, then the lower edge processing of the foregoing embodiments as shown in FIG. 21B can also be taken to include both lower edge processing for printing an image with margin (the processing of the first three passes) and lower edge processing for printing an image without margin (the processing of the latter five passes).

In the foregoing embodiments, the correction patterns CP were formed for all processing modes, namely the first upper edge processing mode, the first intermediate processing mode, the first lower edge processing mode, the second upper edge processing mode, the second intermediate processing mode, and the second lower edge processing mode to record the correction values in the correction value table, but there is no limitation to this.

For example, it is also possible not to form a correction pattern CP for the second upper edge processing mode, the second intermediate processing mode, and the second lower edge processing mode, in which images are printed at a lower print resolution, that is, not to record correction values in the corresponding correction value tables. It should be noted that, in this case, since there are no corresponding correction values, the actual printing is carried out without the above-describe darkness correction, so that the actual printing can be carried out faster as this correction is not carried out.

In the foregoing embodiments, the method for correcting the pixel data in the halftone processing has been explained to be a method of using an existing dot creation ratio table and reading out the level data while shifting their gradation values by the correction values when reading the level data corresponding to the gradation values of the pixel data from this creation ratio table, but there is no limitation to this.

For example, it is also possible to provide a plurality of dot creation ratio tables, for each of a plurality of predetermined correction values, in which the level data are changed in advance by an amount corresponding to the correction value, and to correct the pixel data by directly reading out the level data corresponding to the gradation value of the pixel data from those creation ratio tables. With this configuration, it is only necessary to simply read out the level data corresponding to the gradation values of the pixel data from the dot creation ratio tables, so that the time required for the correction of the pixel data can be shortened.

What is claimed is:

1. A printing method for printing an image by repeating a dot formation operation of forming dots on a medium by ejecting ink from a plurality of nozzles moving in a predetermined movement direction and a carrying operation of carrying said medium in an intersecting direction that intersects with said movement direction, thus forming in said intersecting direction a plurality of lines each being made of a plurality of dots lined up in said movement direction, the printing method comprising:

printing a correction pattern using a processing mode in which an image is printed so that the nozzles forming said lines change periodically with respect to said intersecting direction;

measuring a darkness of said correction pattern, line by line, for at least one set of lines, wherein an integer multiple of the number of lines formed in a single period is taken as one set;

generating correction values for said at least one set of lines based on measurement values obtained by measuring the darkness line by line, and storing said correction values; and carrying out darkness correction through repetitive, sequential correlation of each of said correction values in said at least one set when printing an image using said processing mode.

2. A printing method according to claim 1,
wherein, when printing said image using said processing mode, said darkness correction is carried out through repetitive, sequential correlation of each of said correction values in said at least one set for all lines constituting that image.

3. A printing method according to claim 2,
wherein said processing mode is a processing mode for printing an image in a section between an edge on an upstream side and an edge on a downstream side of said medium in said intersecting direction.

4. A printing method according to claim 2,
wherein a guide line extending in said movement direction is formed in correspondence with one of the two lines at either end in said intersecting direction of each set in said correction pattern.

5. A printing method according to claim 2,
wherein image data for printing said image is provided;
wherein said image data includes gradation values of said darkness, each gradation value being provided for each formation unit corresponding to each dot formed on said medium;
wherein, if said correction value is not correlated with said formation unit, then a creation ratio corresponding to the gradation value of said formation unit is read from a creation ratio table in which the gradation values are correlated with the dot creation ratios, and a dot is formed in the formation unit on said medium in accordance with the creation ratio that has been read; and
wherein, if said correction value is correlated with said formation unit, then when reading said creation ratio corresponding to said gradation value from said creation ratio table, a creation ratio corresponding to a value that is obtained by changing said gradation value by said correction value is read, and a dot is formed in the formation unit on said medium in accordance with the creation ratio that has been read.

6. A printing method according to claim 1,
wherein, when using a processing mode in which an image is printed by carrying out said dot formation operation in both a forward movement and a return movement in said movement direction,
said darkness correction is carried out using correction values of at least one set, wherein twice the number of lines in said single period is taken as one set.

7. A printing method according to claim 1,
wherein lines for at least a plurality of sets are printed as said correction pattern; and
wherein the correction value of lines that are formed by the same nozzle is obtained by averaging among said plurality of sets.

8. A printing method according to claim 1,
wherein said plurality of nozzles are lined up in said intersecting direction, constituting a nozzle row.

9. A printing method according to claim 5,
wherein said nozzle row is provided for each color of ink; and
wherein said correction values are provided for each said color.

10. A printing method according to claim 1,
wherein said processing mode is a processing mode for printing an image in a section between an edge on an upstream side and an edge on a downstream side of said medium in said intersecting direction.

11. A printing method according to claim 1,
wherein a guide line extending in said movement direction is formed in correspondence with one of the two lines at either end in said intersecting direction of each set in said correction pattern.

12. A printing method according to claim 1,
wherein image data for printing said image is provided;
wherein said image data includes gradation values of said darkness, each gradation value being provided for each formation unit corresponding to each dot formed on said medium;
wherein, if said correction value is not correlated with said formation unit, then a creation ratio corresponding to the gradation value of said formation unit is read from a creation ratio table in which the gradation values are correlated with the dot creation ratios, and a dot is formed in the formation unit on said medium in accordance with the creation ratio that has been read; and
wherein, if said correction value is correlated with said formation unit, then when reading said creation ratio corresponding to said gradation value from said creation ratio table, a creation ratio corresponding to a value that is obtained by changing said gradation value by said correction value is read, and a dot is formed in the formation unit on said medium in accordance with the creation ratio that has been read.

13. A printing method according to claim 12,
wherein, assuming that dots are formed in a region provided with a predetermined number of said formation units having the same gradation value, said dot creation ratio represents a ratio of the number of dots formed in said region to said predetermined number.

14. A printing method according to claim 12,
wherein all lines of said correction pattern are printed in accordance with the same gradation value.

15. A printing method according to claim 14,
wherein an average value, among all lines, of the measurement values obtained by measuring the darkness line by line is taken as a target darkness value, and a correction ratio obtained by dividing the deviation of the measurement value of the darkness of each line from said target value by said target value is taken as said correction value.

16. A printing method according to claim 12,
wherein said nozzles are configured to form dots of a plurality of sizes, and said creation ratio table defines the relation between said gradation values and said creation ratios for each of said sizes.

17. A printing method according to claim 1,
wherein image data for printing said image is provided;
wherein said image data includes gradation values of said darkness, each gradation value being provided for each formation unit corresponding to each dot formed on said medium;
wherein, if said correction value is not correlated with said formation unit, then a creation ratio corresponding to the gradation value of said formation unit is read from a creation ratio table in which the gradation values are correlated with the dot creation ratios, and a dot is formed in the formation unit on said medium in accordance with the creation ratio that has been read; and
wherein, if said correction value is correlated with said formation unit, then a dot creation ratio corresponding to the gradation value of said formation unit is read from a creation ratio table in which the creation ratio in said creation ratio table has been changed by said correction value, and a dot is formed in the formation unit on said medium in accordance with the creation ratio that has been read.

18. A printing apparatus comprising:

nozzles for ejecting ink;

a carry unit for carrying a medium; and a controller for printing an image by repeating a dot formation operation of forming dots on said medium by ejecting ink from a plurality of said nozzles moving in a predetermined movement direction and a carrying operation of carrying with said carry unit said medium in an intersecting direction that intersects with said movement direction, thus forming in said intersecting direction a plurality of lines each being made of a plurality of dots lined up in said movement direction;

wherein said controller is provided with a processing mode in which an image is printed so that the nozzles forming said lines change periodically with respect to said intersecting direction, and carries out darkness correction for each line in accordance with darkness correction values when printing an image using said processing mode;

wherein said controller stores at least one set of correction values that have been determined based on measurement values obtained by measuring the darkness of lines of a correction pattern printed using said processing mode, wherein an integer multiple of the number of lines formed in a single period is taken as one set; and wherein said controller carries out said darkness correction through repetitive, sequential correlation of each of said correction values in said at least one set when printing an image using said processing mode.

19. A printing system comprising:

a computer; and a printing apparatus communicably connected to said computer;

wherein said printing apparatus is provided with nozzles for ejecting ink and a carry unit for carrying a medium, prints an image by repeating a dot formation operation of forming dots on said medium by ejecting ink from a plurality of said nozzles moving in a predetermined movement direction and a carrying operation of carrying with said carry unit said medium in an intersecting direction that intersects with said movement direction to thus form in said intersecting direction a plurality of lines each being made of a plurality of dots lined up in said movement direction, and is provided with a processing mode in which an image is printed so that the nozzles forming said lines change with a predetermined period with respect to said intersecting direction;

wherein said computer carries out darkness correction for each line in accordance with darkness correction values when printing an image using said processing mode;

wherein said printing apparatus stores at least one set of correction values that have been determined based on measurement values obtained by measuring the darkness of lines of a correction pattern printed using said processing mode, wherein an integer multiple of the number of lines formed in a single period is taken as one set; and wherein said computer carries out said darkness correction through repetitive, sequential correlation of each of said correction values in said at least one set.

\* \* \* \* \*